United States Patent
Papasakellariou

(10) Patent No.: US 11,737,117 B2
(45) Date of Patent: Aug. 22, 2023

(54) ADJUSTING PARAMETERS OF A TRANSMISSION IN RESPONSE TO INTERFERENCE

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/807,122

(22) Filed: Jun. 15, 2022

(65) Prior Publication Data
US 2022/0322416 A1    Oct. 6, 2022

Related U.S. Application Data

(63) Continuation of application No. 16/797,815, filed on Feb. 21, 2020, now Pat. No. 11,395,322.
(Continued)

(51) Int. Cl.
*H04W 72/00*    (2023.01)
*H04W 72/23*    (2023.01)
(Continued)

(52) U.S. Cl.
CPC ........... *H04W 72/23* (2023.01); *H04L 1/0003* (2013.01); *H04L 1/0009* (2013.01);
(Continued)

(58) Field of Classification Search
CPC . H04W 72/02; H04W 72/04; H04W 72/1278; H04W 72/1289; H04W 72/1284;
(Continued)

(56) References Cited

U.S. PATENT DOCUMENTS

| 2010/0111107 A1 | 5/2010 | Han et al. |
| 2011/0188462 A1 | 8/2011 | Yoo et al. |

(Continued)

FOREIGN PATENT DOCUMENTS

| CN | 104604195 A | 5/2015 |
| CN | 104885502 A | 9/2015 |

(Continued)

OTHER PUBLICATIONS

International Search Report regarding Application No. PCT/KR2020/003702, dated Jun. 24, 2020, 3 pages.
(Continued)

*Primary Examiner* — Warner Wong

(57) ABSTRACT

Methods and apparatuses for determining whether to perform transmissions or receptions. A method for a user equipment (UE) to determine whether to perform the transmissions includes receiving a n for a search space set for receptions of physical downlink control channels (PDCCHs) according to a common search space (CSS) and receiving a PDCCH that includes a downlink control information (DCI) format. The method includes determining a set of time resources and a set of frequency resources based on an indication in the DCI format and canceling a transmission of a sounding reference signal (SRS) in time resources from the set of time resources based on determining that the SRS transmission would include frequency resources from the set of frequency resources. The method includes transmitting a physical uplink control channel in time resources from the set of time resources and in frequency resources from the set of frequency resources.

20 Claims, 19 Drawing Sheets

Related U.S. Application Data

(60) Provisional application No. 62/839,859, filed on Apr. 29, 2019, provisional application No. 62/838,450, filed on Apr. 25, 2019, provisional application No. 62/822,244, filed on Mar. 22, 2019.

(51) Int. Cl.

| | |
|---|---|
| *H04L 1/00* | (2006.01) |
| *H04W 52/14* | (2009.01) |
| *H04W 74/08* | (2009.01) |
| *H04W 72/21* | (2023.01) |
| *H04W 80/00* | (2009.01) |
| *H04W 28/02* | (2009.01) |
| *H04L 12/70* | (2013.01) |
| *H04L 67/1074* | (2022.01) |
| *H04L 1/1829* | (2023.01) |

(52) U.S. Cl.
CPC ......... *H04W 52/146* (2013.01); *H04W 72/21* (2023.01); *H04W 74/0833* (2013.01); *H04L 1/1854* (2013.01); *H04L 67/1076* (2013.01); *H04L 2012/5631* (2013.01); *H04W 28/0273* (2013.01); *H04W 80/00* (2013.01)

(58) Field of Classification Search
CPC ... H04W 52/06; H04W 52/14; H04W 52/146; H04W 74/08; H04W 74/0833; H04W 28/0273; H04W 80/00; H04W 72/00; H04W 72/044–0473; H04W 63/10; H04W 67/1076; H04W 28/06; H04L 1/0009; H04L 1/0001; H04L 1/001; H04L 1/0003; H04L 1/0004; H04L 2025/03681; H04L 29/06183; H04L 29/08459; H04L 65/10; H04L 65/1069; H04L 1/003; H04L 1/0006; H04L 2025/03592; H04L 2025/03783; H04L 2012/563; H04L 2012/5631; H04L 29/06102; H04L 69/1612; H04L 25/03114
See application file for complete search history.

(56) References Cited

U.S. PATENT DOCUMENTS

| | | |
|---|---|---|
| 2012/0106407 A1 | 5/2012 | Papasakellariou et al. |
| 2013/0010659 A1 | 1/2013 | Chen et al. |
| 2014/0293843 A1 | 10/2014 | Papasakellariou et al. |
| 2015/0036601 A1 | 2/2015 | Kim et al. |
| 2015/0195077 A1 | 7/2015 | Kim et al. |
| 2015/0319636 A1 | 11/2015 | Lee et al. |
| 2015/0358998 A1 | 12/2015 | Golitschek Edler Von Elbwart et al. |
| 2017/0374675 A1 | 12/2017 | Hwang et al. |
| 2018/0070378 A1 | 3/2018 | Quan et al. |
| 2018/0323917 A1 | 11/2018 | Um et al. |
| 2019/0082449 A1* | 3/2019 | Kim ................... H04W 72/0473 |
| 2019/0223197 A1 | 7/2019 | Shin et al. |
| 2019/0342769 A1 | 11/2019 | Li et al. |
| 2020/0169377 A1 | 5/2020 | Lee et al. |
| 2020/0214006 A1 | 7/2020 | Choi et al. |
| 2020/0305145 A1 | 9/2020 | Li et al. |
| 2020/0305169 A1 | 9/2020 | Loehr et al. |
| 2020/0383089 A1 | 12/2020 | Goto et al. |
| 2021/0006376 A1 | 1/2021 | Cirik et al. |
| 2021/0022006 A1 | 1/2021 | Sun et al. |
| 2021/0022158 A1* | 1/2021 | Wei ....................... H04W 76/27 |
| 2021/0084622 A1* | 3/2021 | Choi .................... H04W 72/23 |
| 2021/0168815 A1 | 6/2021 | Kim et al. |
| 2021/0185614 A1 | 6/2021 | Zhou et al. |
| 2021/0259010 A1 | 8/2021 | Yang et al. |
| 2021/0400706 A1 | 12/2021 | Aiba et al. |
| 2022/0007410 A1 | 1/2022 | Cirik et al. |
| 2022/0030567 A1 | 1/2022 | Papasakellariou et al. |
| 2022/0183078 A1* | 6/2022 | Lin ........................ H04W 24/08 |
| 2022/0240281 A1* | 7/2022 | Wang .................... H04L 5/0053 |
| 2022/0279551 A1* | 9/2022 | Liu ...................... H04W 72/0446 |
| 2022/0322358 A1* | 10/2022 | Zhou ..................... H04W 72/21 |
| 2023/0050714 A1* | 2/2023 | Lin .................... H04W 72/1268 |
| 2023/0085338 A1* | 3/2023 | Lin .................... H04W 72/0453 |
| 2023/0085703 A1* | 3/2023 | Park ..................... H04W 72/21 |
| 2023/0085896 A1* | 3/2023 | Takeda ............. H04W 72/1263 |

FOREIGN PATENT DOCUMENTS

| | | | | |
|---|---|---|---|---|
| CN | 105264995 A | | 1/2016 | |
| CN | 110266439 A | | 9/2019 | |
| CN | 114946228 | * | 11/2020 | ............ H04W 52/24 |
| CN | WO 2020/221327 | * | 11/2020 | ............ H04W 74/08 |
| EP | 3267608 A1 | | 1/2018 | |
| JP | WO 2016/039183 | * | 3/2016 | ............ H04W 72/04 |
| JP | WO 2016/060242 | * | 4/2016 | ............ H04W 72/12 |
| JP | WO 2017135297 | * | 8/2017 | ............ H04W 72/04 |
| JP | WO 2018/064073 | * | 4/2018 | ............ H04W 52/54 |
| KR | 20210039378 | * | 4/2021 | ............ H04W 72/04 |
| WO | 2018032001 A1 | | 2/2018 | |
| WO | WO 2018/085204 | * | 5/2018 | ............ H04W 52/14 |
| WO | 2019050381 A1 | | 3/2019 | |
| WO | WO 2020032587 | * | 2/2020 | ............... H04L 1/18 |

OTHER PUBLICATIONS

Samsung, "Uplink inter UE multiplexing/prioritization for enhanced URLLC", 3GPP TSG RAN WG1 #96, R1-1902300, Feb. 2019, 3 pages.
Intel Corporation, "On inter-UE UL Multiplexing for eURLLC", 3GPP TSG RAN WG1 Meeting #96, R1-1902497, Feb. 2019, 12 pages.
Samsung, "Multiplexing of UL Transmissions with Different Reliability Requirements", 3GPP TSG RAN WG1 Meeting #92bis, R1-1804392, Apr. 2018, 4 pages.
Wilus, Inc., "On UL inter-UE multiplexing for NR URLLC", 3GPP TSG RAN WG1 #96, R1-1902875, Feb. 2019, 4 pages.
"5G; NR; Physical channels and modulation (3GPP TS 38.211 version 15.5.0 Release 15)", ETSI TS 138 211 V15.5.0, Apr. 2019, 98 Pages.
"5G; NR; Multiplexing and channel coding (3GPP TS 38.212 version 15.5.0 Release 15)", ETSI TS 138 212 V15.5.0, May 2019, 104 pages.
"5G; NR; Physical layer procedures for control (3GPP TS 38.213 version 15.5.0 Release 15)", ETSI TS 138 213 V15.5.0, May 2019, 106 pages.
"5G; NR; Physical layer procedures for data (3GPP TS 38.214 version 15.5.0 Release 15)", ETSI TS 138 214 V15.5.0, May 2019, 105 pages.
"5G; NR; Medium Access Control (MAC) protocol specification (3GPP TS 38.321 version 15.5.0 Release 15)", ETSI TS 138 321 V15.5.0, May 2019, 80 pages.
"5G; NR; Radio Resource Control (RRC); Protocol specification (3GPP TS 38.331 version 15.5.1 Release 15)", ETSI TS 138 331 V15.5.1, May 2019, 488 pages.
Chinese National Intellectual Property Administration, First Office Action regarding Application No. 202080006779.1, dated Nov. 17, 2021, 15 pages.
"3rd Generation Partnership Project; Technical Specification Group RAN WG5; Permanent Reference Document (PRD); Guidance to Work Item Codes (Release X)", 3GPP RAN5 PRD 17 V3.13, Sep. 2018, 92 pages.
Chinese National Intellectual Property Administration, Notification to Grant Patent Right for Invention dated Feb. 23, 2022 regarding Application No. 202080006779.1, 8 pages.
Ericsson, "On PUCCH Resource Allocation and Control", 3GPP TSG RAN WG1 Meeting#90, R1-1714426, Aug. 2017, 7 pages.
Korean Intellectual Property Office, Office Action dated Jan. 26, 2023 regarding Application No. 10-2021-7034223, 7 pages.

* cited by examiner

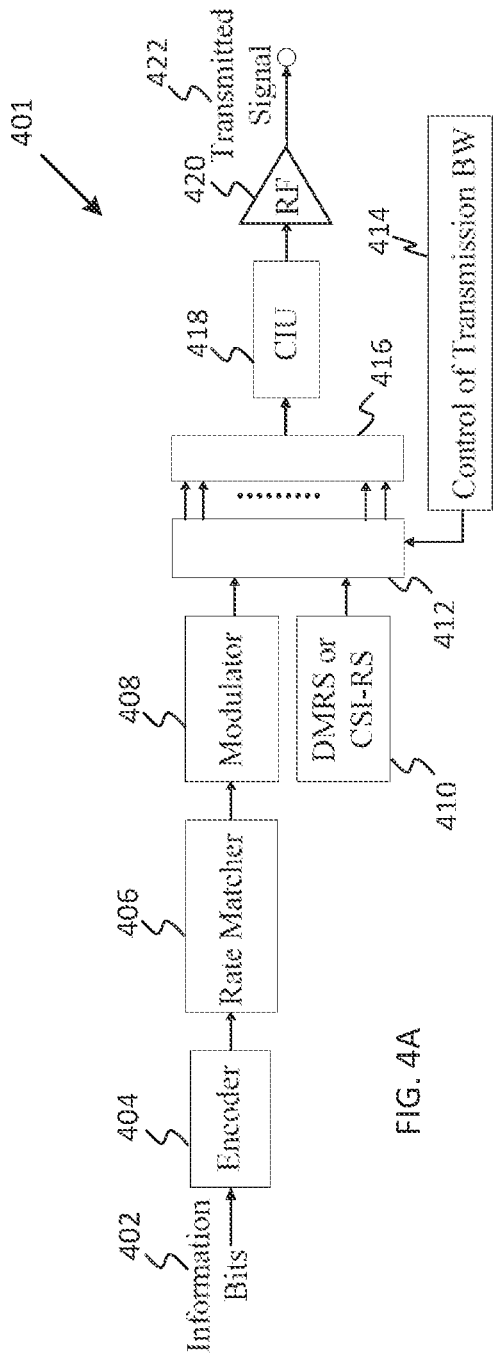
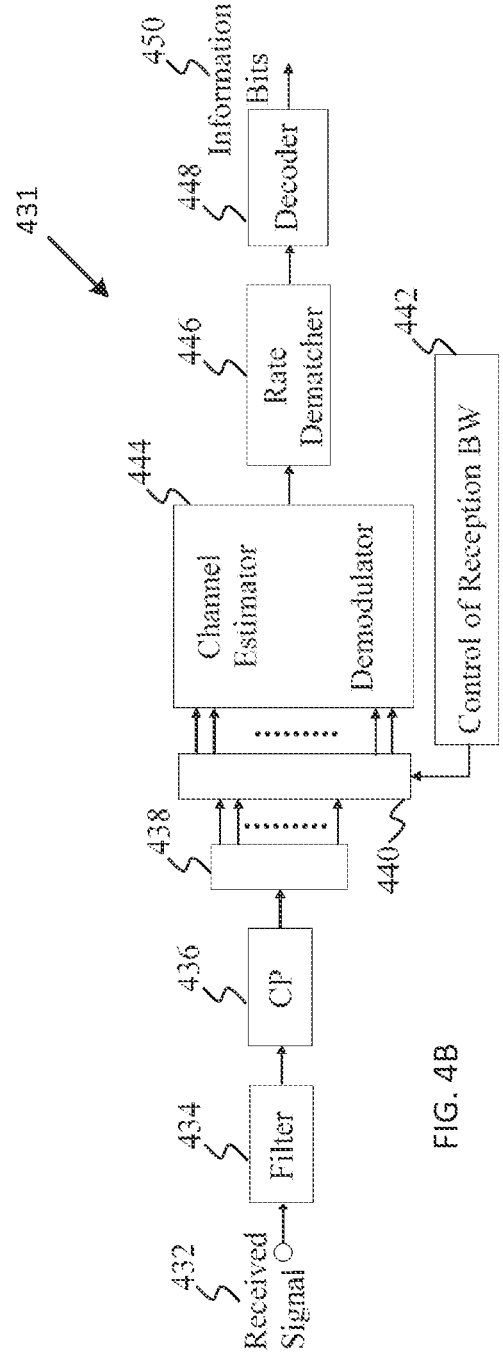
FIG. 4A
FIG. 4B

ADJUSTING PARAMETERS OF A TRANSMISSION IN RESPONSE TO INTERFERENCE

CROSS-REFERENCE TO RELATED APPLICATIONS AND CLAIM OF PRIORITY

This application is a continuation of U.S. patent application Ser. No. 16/797,815, filed Feb. 21, 2020, which claims priority to U.S. Provisional Patent Application No. 62/822,244 filed Mar. 22, 2019; U.S. Provisional Patent Application No. 62/838,450 filed Apr. 25, 2019; and U.S. Provisional Patent Application No. 62/839,859 filed Apr. 29, 2019, the disclosures of which are incorporated herein by reference in their entireties.

TECHNICAL FIELD

The present disclosure relates generally to wireless communication systems. More particularly, the present disclosure relates to adjusting parameters of a transmission in response to interference.

BACKGROUND

There is a demand for an improved 5G communication system. A 5G communication system can be implemented in higher frequency (mmWave) bands, for example 28 GHz bands or 60 GHz bands, to enable higher data rates or in lower frequency bands, such as below 6 GHz, to enable robust coverage and mobility support. User equipments (UEs) and base station (BSs) operating in 5G systems flexibly support multiple service/priority types associated with different reliability or latency requirements in a same downlink or uplink bandwidth part. 5G communication systems also support different transmission types, with corresponding different requirements for latency and reception reliability, and interference avoidance or compensation can be a critical component in achieving such requirements.

SUMMARY

The present disclosure relates to a method and apparatus for adjust parameters for of a transmission in communication systems that have multiple service/priority types.

In one embodiment, a method for a UE to determine whether to perform transmissions is provided. The method includes receiving a configuration for a search space set for receptions of physical downlink control channels (PDCCHs) according to a common search space (CSS) and receiving a PDCCH, of the PDCCHs, that includes a downlink control information (DCI) format. The method includes determining a set of time resources and a set of frequency resources based on an indication in the DCI format and canceling a transmission of a sounding reference signal (SRS) in time resources from the set of time resources based on determining that the SRS transmission would include frequency resources from the set of frequency resources. The method further includes transmitting a physical uplink control channel (PUCCH) in time resources from the set of time resources and in frequency resources from the set of frequency resources.

In another embodiment, a UE is provided. The UE includes a receiver configured to receive a configuration for a search space set for receptions of PDCCHs according to a CSS, and a PDCCH, of the PDCCHs, that includes a DCI format. The UE includes a processor configured to determine a set of time resources and a set of frequency resources based on an indication in the DCI format and cancel a transmission of a SRS in time resources from the set of time resources if the SRS transmission would include frequency resources from the set of frequency resources. The UE further includes a transmitter configured to transmit a PUCCH in time resources from the set of time resources and in frequency resources from the set of frequency resources.

In yet another embodiment, a BS is provided. The BS includes a transmitter configured to transmit a configuration for a search space set for receptions of PDCCHs according to a CSS, and a PDCCH, of the PDCCHs, that includes a DCI format. The BS includes a processor configured to determine a set of time resources and a set of frequency resources based on an indication by the DCI format and cancel a reception of a SRS in time resources from the set of time resources if the SRS reception would include frequency resources from the set of frequency resources. The BS further includes a receiver configured to receive a PUCCH in time resources from the set of time resources and in frequency resources from the set of frequency resources.

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4A illustrates an example transmitter structure according to various embodiments of the present disclosure;

FIG. 4B illustrates an example receiver structure according to various embodiments of the present disclosure;

DETAILED DESCRIPTION

FIGS. 1 through 25, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

Depending on the network type, the term 'base station' can refer to any component (or collection of components) configured to provide wireless access to a network, such as transmit point (TP), transmit-receive point (TRP), a gNB, a macrocell, a femtocell, a WiFi access point (AP), or other wirelessly enabled devices. Base stations can provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. The terms 'gNB' and 'TRP' can be used interchangeably in this disclosure to refer to network infrastructure components that provide wireless access to remote terminals. Also, depending on the network type, the term UE can refer to any component such as mobile station, subscriber station, remote terminal, wireless terminal, receive point, or user device. A UE can be a mobile device or a stationary device.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

A 5G communication system can be implemented in higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancelation and the like.

Figure 1:
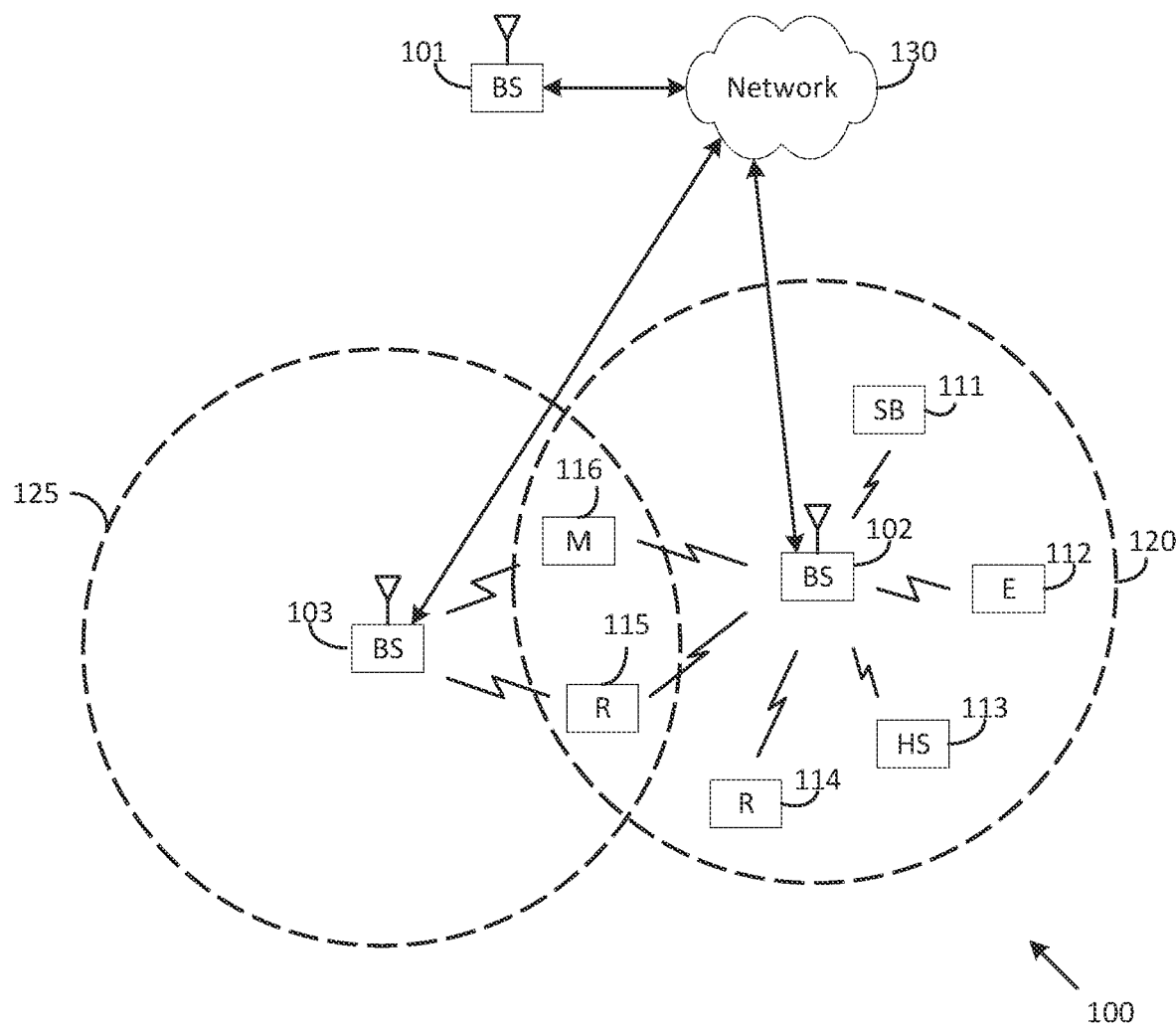
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in the present disclosure to refer to network infrastructure components that provide wireless access to remote terminals. Depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in the present disclosure to refer to remote wireless equipment that wirelessly accesses a gNB, whether the UE is a mobile device (such as a mobile telephone or smartphone) or is normally considered a stationary device (such as a desktop computer or vending machine).

The gNB 102 provides wireless broadband access to the network 130 for a first plurality of UEs within a coverage area 120 of the gNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 can adjust parameters of a transmission to UEs 111-116 in response to interference as described in embodiments of the present disclosure. In various embodiments, one or more of UEs 111-116 can adjust parameters of a transmission to a gNB 101-103 in response to interference as described in embodiments of the present disclosure.

As described in greater detail below, transmissions between one or more of the UEs 111-116 and the gNBs 101-103 operating in 5G systems can encounter interference. Accordingly, various embodiments of the present disclosure enable UEs 111-116 and gNBs 101-13 to adjust parameters of one or more transmissions in response to interference in communication systems that have multiple service/priority types.

Although FIG. 1 illustrates one example of a wireless network 100, various changes can be made to FIG. 1. For example, the wireless network 100 can include any number of gNBs and any number of UEs in any suitable arrangement. The gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as other types of data networks.

Figure 2A:
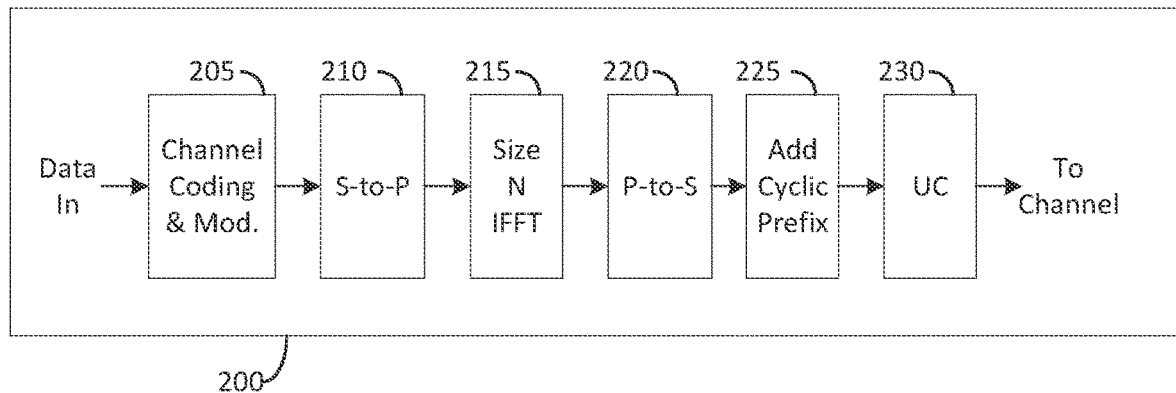
FIGS. 2A and 2B illustrate example wireless transmit and receive paths, respectively, according to various embodiments of the present disclosure.
Figure 2B:
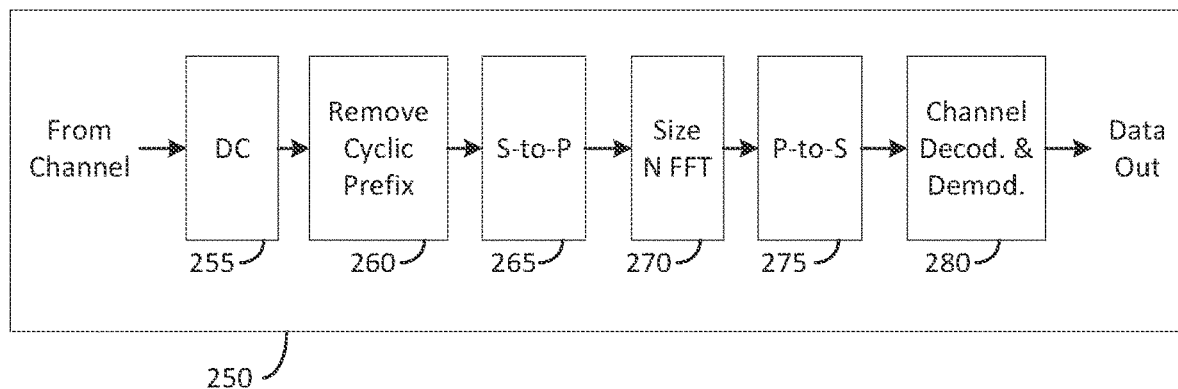

FIGS. 2A and 2B illustrate example wireless transmit and receive paths, respectively, according to the present disclosure. In the following description, a transmit path 200 can be described as being implemented in a gNB (such as gNB 102), while a receive path 250 can be described as being implemented in a UE (such as UE 116). However, it will be understood that the receive path 250 can be implemented in a gNB (such as gNB 102) and that the transmit path 200 can be implemented in a UE (such as UE 116). In some embodiments, the receive path 250 is configured to receive channel and interference measurement information as described in various embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can adjust parameters of a transmission in response to interference. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the size N FFT block 270 and the size N IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B can be combined, further subdivided, or omitted and additional components can be added according to particular needs. FIGS. 2A and 2B are meant to illustrate examples of the types of transmit and receive paths that can be used in a wireless network. Other suitable architectures can be used to support wireless communications in a wireless network.

Figure 3A:
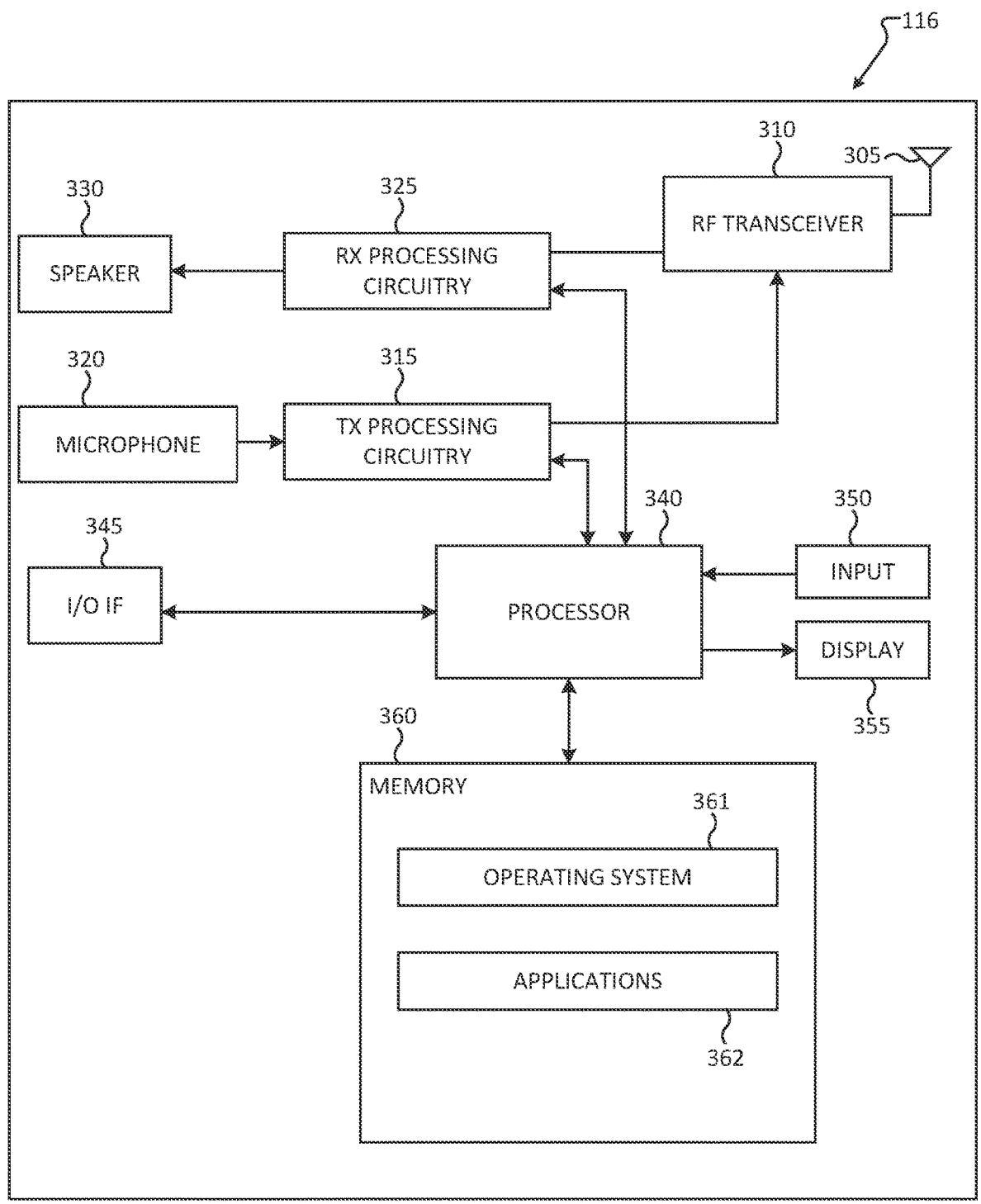
FIG. 3A illustrates an example user equipment (UE) according to various embodiments of the present disclosure.

FIG. 3A illustrates an example UE according to the present disclosure. The embodiment of the UE 116 illustrated in FIG. 3A is for illustration only, and the UEs 111-115 of FIG. 1 can have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB, such as the gNB 102, of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is then transmitted via the antenna 305.

The processor 340 can include one or more processors or other processing devices and execute the OS program 361 stored in the memory 360 in order to control the overall operation of the UE 116. For example, the processor 340 can control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 can execute other processes and programs resident in the memory 360, such as operations for adjusting parameters of a transmission in response to interference described in embodiments of the present disclosure. The processor 340 can move data into or out of the memory 360 as part of an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., a keypad, touchscreen, button, etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. The memory 360 can include at least one of a random-access memory (RAM), Flash memory, or other read-only memory (ROM).

As described in more detail below, various embodiments of the present disclosure enable the UE 116 to adjust parameters for of a transmission in communication systems that have multiple service/priority types. Although FIG. 3A illustrates one example of UE 116, various changes can be made to FIG. 3A. For example, various components in FIG. 3A can be combined, further subdivided, or omitted and additional components can be added according to particular needs. As a particular example, the processor 340 can be divided into multiple processors, such as one or more central processing units (CPUs) and one or more graphics processing units (GPUs). Although FIG. 3A illustrates the UE 116 as a mobile telephone or smartphone, UEs can be configured to operate as other types of mobile or stationary devices.

Figure 3B:
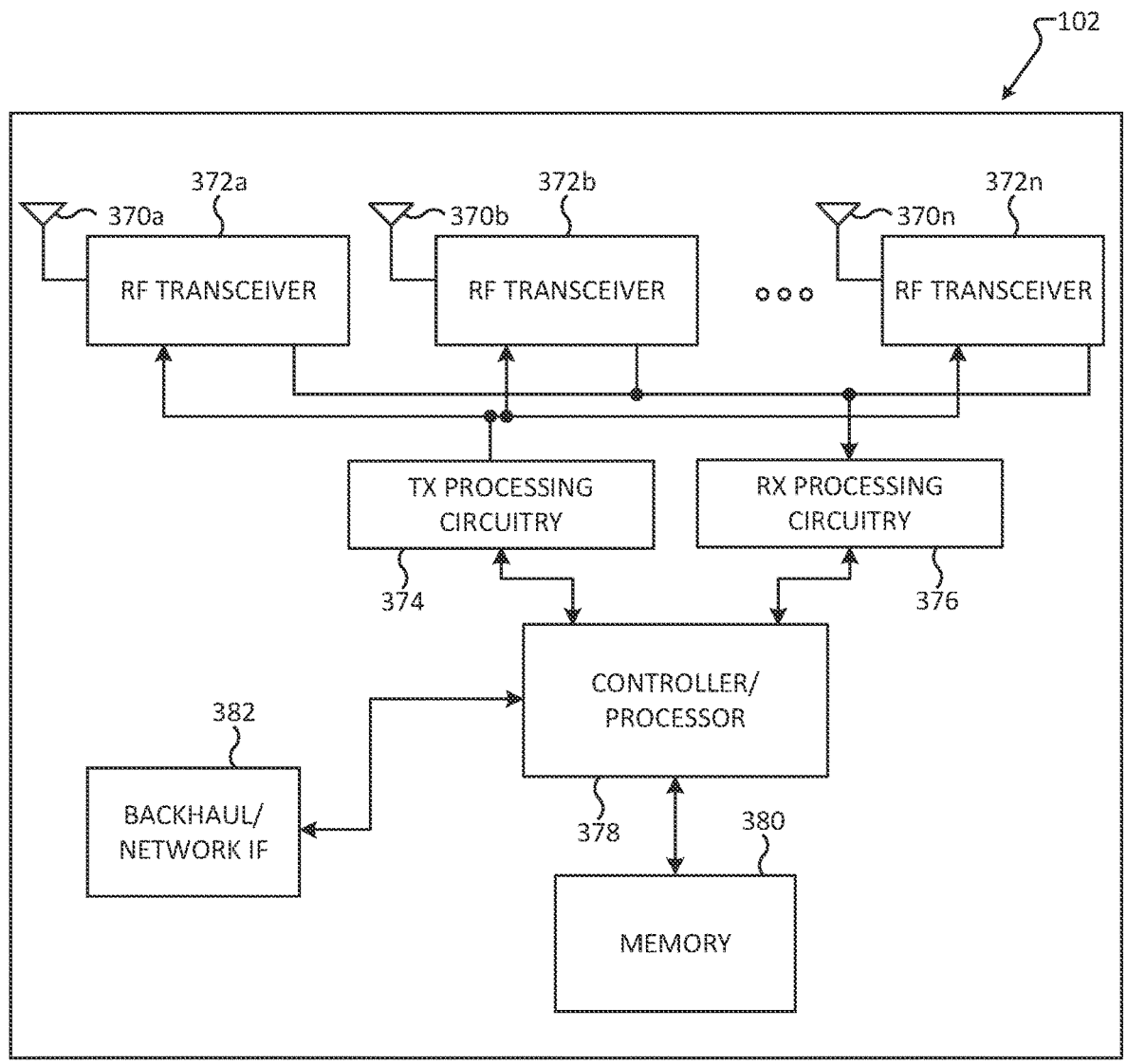
FIG. 3B illustrates an example base station (BS) according to various embodiments of the present disclosure.

FIG. 3B illustrates an example gNB according to the present disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. In some embodiments, the controller/processor 378 includes at least one microprocessor or microcontroller.

The controller/processor 378 can execute programs and other processes resident in the memory 380, such as an OS. The controller/processor 378 can support adjusting parameters of a transmission in response to interference as described in embodiments of the present disclosure. In some embodiments, the controller/processor 378 supports communications between entities, such as web RTC. The controller/processor 378 can move data into or out of the memory 380 as part of an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as part of a cellular communication system (such as one supporting 5G or new radio access technology or NR, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. The memory 380 can include at least one of RAM, a Flash memory, or other ROM. In certain embodiments, a plurality of instructions, such as a BIS algorithm, is stored in memory. The plurality of instructions, when executed, can cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) adjust parameters of a transmission in response to interference.

As described in more detail below, various embodiments of the present disclosure enable the gNB 102 to work with the UE 116 to adjust parameters for of a transmission in communication systems that have multiple service/priority types. Although FIG. 3B illustrates one example of a gNB 102, various changes can be made to FIG. 3B. For example, the gNB 102 can include any number of each component shown in FIG. 3A. As a particular example, an access point can include a number of backhaul or network interfaces 382, and the controller/processor 378 can support routing functions to route data between different network addresses. As another example, while shown as including a single instance of TX processing circuitry 374 and a single instance of RX processing circuitry 376, the gNB 102 can include multiple instances of each (such as one per RF transceiver).

A time unit for DL signaling or for UL signaling on a cell is one symbol. A symbol belongs to a slot that includes a number of symbols such as 14 symbols and is referred to as DL symbol if used for DL signaling, UL symbol if used for UL signaling, or flexible symbol if it can be used for either DL signaling or UL signaling. The slot can also be a time unit for DL or UL signaling on a cell.

A bandwidth (BW) unit is referred to as a resource block (RB). One RB includes a number of sub-carriers (SCs), such as 12 subcarriers. An RB in one symbol of a slot is referred to as physical RB (PRB) and includes a number of resource elements (REs). For example, a slot can have a duration of 1 millisecond and include 14 symbols and an RB can have a BW of 180 kHz and include 12 SCs with SC spacing of 15 kHz. As another example, a slot can have a duration of 0.25 milliseconds and include 14 symbols and an RB can have a BW of 720 kHz and include 12 SCs with SC spacing of 60 kHz.

DL signals include data signals conveying information content, control signals conveying DL control information (DCI), and reference signals (RS) that are also known as pilot signals. A gNB, for example the gNB 102, can transmit data information or DCI through respective physical DL shared channels (PDSCHs) or physical DL control channels (PDCCHs). The gNB can transmit one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources can be used. For interference measurement reports (IMRs), CSI interference measurement (CSI-IM) resources associated with a zero power CSI-RS (ZP CSI-RS) configuration can be used.

A CSI process can include NZP CSI-RS and CSI-IM resources. A UE, for example the UE 116, can determine CSI-RS transmission parameters through DL control signaling or higher layer signaling, such as radio resource control (RRC) signaling from a gNB. Transmission instances of a CSI-RS can be indicated by DL control signaling at the physical layer or configured by higher layer signaling. A DMRS is typically received by a UE, such as the UE 116, only in the BW of a respective PDCCH or PDSCH reception and the UE can use the DMRS to demodulate data or control information.

Rel-13 LTE supports up to 16 CSI-RS antenna ports that can enable a gNB to be equipped with a large number of antenna elements (such as 64 or 128). In this case, a plurality of antenna elements is mapped onto one CSI-RS port. Furthermore, up to 32 CSI-RS ports are supported in Rel-14 LTE. For next generation cellular systems such as 5G, a maximum number of CSI-RS ports can further increase for example to 64.

For mmWave bands, although a number of antenna elements can be larger for a given form factor, the number of CSI-RS ports—which can correspond to the number of digitally precoded ports—tends to be limited due to hardware constraints. For example, hardware constraints can include the feasibility to install a large number of ADCs/DACs at mmWave frequencies.

FIG. 4A illustrates an example transmitter structure according to various embodiments of the present disclosure. The example transmitter structure 401 illustrated in FIG. 4A is for illustration only and should not be construed as limiting. FIG. 4A does not limit the scope of the present disclosure to any particular transmitter structure. One or more of the components illustrated in FIG. 4A can be implemented in specialized circuitry configured to perform the noted functions or one or more of the components can be implemented by one or more processors executing instructions to perform the noted functions. For example, the transmitter structure 401 can be implemented in a UE 111-116 or a gNB 101-103 that implements the transmit path 200. Other embodiments can be used without departing from the scope of the present disclosure.

As shown in FIG. 4A, information bits, such as DCI bits or data information bits 402, are encoded by encoder 404, rate matched to assigned time/frequency resources by rate matcher 406 and modulated by modulator 408. Subsequently, modulated encoded symbols and DMRS or CSI-RS 410 are mapped to SCs 412 by SC mapping unit 414, an inverse fast Fourier transform (IFFT) is performed by a filter 416, a cyclic prefix (CP) is added by CP insertion unit 418, and a resulting signal 422 is filtered by a filter and then transmitted by a radio frequency (RF) unit 420.

FIG. 4B illustrates example receiver structure using OFDM according to various embodiments of the present disclosure. The example receiver structure 431 illustrated in FIG. 4B is for illustration only and should not be construed as limiting. FIG. 4B does not limit the scope of the present disclosure to any particular receiver structure. One or more of the components illustrated in FIG. 4B can be implemented in specialized circuitry configured to perform the noted functions or one or more of the components can be implemented by one or more processors executing instructions to perform the noted functions. For example, the receiver structure 431 can be implemented in a UE 111-116 or a gNB 101-103 that implements the receive path 250. Other embodiments can be used without departing from the scope of the present disclosure.

As illustrated in FIG. 4B, a received signal 432 is filtered by filter 434, a CP removal unit 436 removes a CP, a filter 438 applies a fast Fourier transform (FFT), SCs de-mapping unit 440 de-maps SCs selected by BW selector unit 442, received symbols are demodulated by a channel estimator and a demodulator unit 444, a rate de-matcher 446 restores a rate matching, and a decoder 448 decodes the resulting bits to provide information bits 450.

A UE typically monitors multiple candidate locations for respective potential PDCCH receptions to decode multiple DCI formats in a slot. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) or MCS-C-RNTI and serves as a UE identifier. For a DCI format scheduling a PDSCH conveying system information (SI), the RNTI can be a system information RNTI (SI-RNTI). For a DCI format scheduling a PDSCH providing a random access response (RAR), the RNTI can be a random access RNTI (RA-RNTI). For a DCI format providing transmission power control (TPC) commands to a group of UEs, the RNTI can be a transmission power control RNTI (TPC-RNTI). For a DCI format indicating discontinuous transmission from a gNB in a previous slot, the RNTI can be an interruption RNTI (INT-RNTI). Each RNTI type can be configured to a UE through higher-layer signaling such as RRC signaling. A DCI format scheduling PDSCH reception to a UE is also referred to as DL DCI format or DL assignment while a DCI format scheduling PUSCH transmission from a UE is also referred to as UL DCI format or UL grant.

A PDCCH reception can be within a set of PRBs. A gNB can configure a UE one or more sets of PRB sets, also referred to as control resource sets (CORESETs), for PDCCH receptions. A PDCCH reception can be in control channel elements (CCEs) that are included in a CORESET. A UE determines CCEs for decoding a PDCCH candidate based on a search space. A set of PDCCH candidates for a DCI format with a C-RNTI, a CS-RNTI, or an MCS-C-RNTI defines a corresponding UE-specific search space set (USS set) for the DCI format where a UE, such as the UE 116, determines PDCCH candidate locations according to a USS, while a set of PDCCH candidates for a DCI format with a non-UE-specific RNTI defines a common search space set (CSS set) where a UE, such as the UE 116, determines PDCCH candidate locations according to a CSS. A search space set is associated with a CORESET where a UE, such as the UE 116, monitors PDCCH candidates for the search space set where monitoring means reception of a PDCCH candidate and decoding of a DCI format associated with the PDCCH candidate by the UE. A UE expects to monitor PDCCH candidates for up to 4 sizes of DCI formats that include up to 3 sizes of DCI formats with CRC scrambled by C-RNTI or MCS-C-RNTI per serving cell. The UE counts a number of sizes for DCI formats per serving cell based on a number of configured PDCCH candidates in respective search space sets for the corresponding active DL BWP.

A UE, such as the UE 116, determines a PDCCH monitoring occasion on an active DL BWP from a PDCCH monitoring periodicity of $k_s$ slots, a PDCCH monitoring offset of $o_s$ slots, and a PDCCH monitoring pattern within a slot indicating first symbol(s) of a CORESET within a slot for PDCCH monitoring. For search space set s, the UE determines that a PDCCH monitoring occasion(s) exists in a slot with number $n_{s,f}^\mu$ in a frame with number $n_f$ if $(n_f \cdot N_{slot}^{frame,\mu} + n_{s,f}^\mu - o_s) \bmod k_s = 0$ where $N_{slot}^{frame,\mu}$ is a number of slots per frame for subcarrier spacing (SCS) configuration μ. The UE monitors PDCCH for search space set s for $T_s$ consecutive slots, starting from slot $n_{s,f}^\mu$, and does not monitor PDCCH for search space set s for the next $k_s - T_s$ consecutive slots. If the PDCCH monitoring pattern indicates to the UE to monitor PDCCH in a subset of up to three consecutive symbols that are same in every slot where the UE monitors PDCCH for all search space sets, the UE does not expect to be configured with a PDCCH SCS other than 15 kHz if the subset includes at least one symbol after the third symbol.

In various embodiments, for example, the UE can be configured with parameters for a search space set for monitoring PDCCHs to decode a DCI format 0_0 that schedules a PUSCH transmission or to decode a DCI format 1_0 that schedules a PDSCH reception. The UE can also be configured with parameters for a search space set for monitoring PDCCHs to decode a DCI format 0_1 that schedules a PUSCH transmission or to decode a DCI format 1_1 that schedules a PDSCH reception.

Figure 5A:
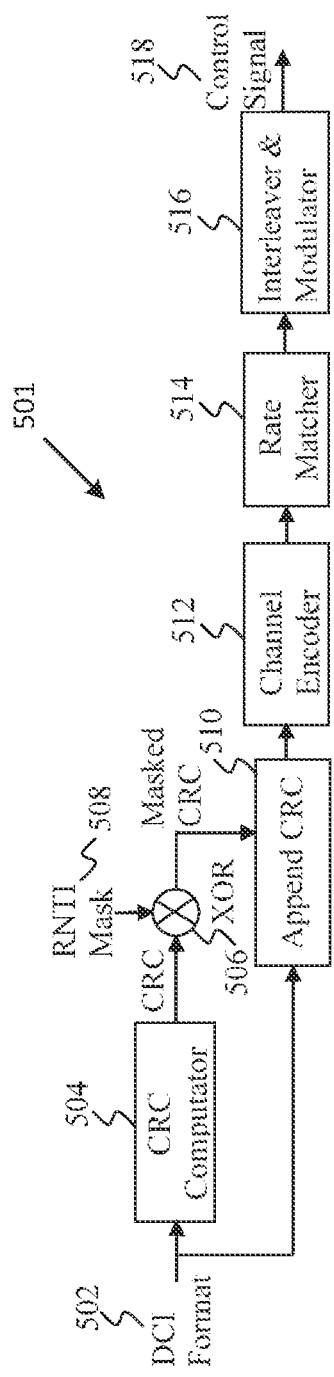
FIG. 5A illustrates an example encoding process for a downlink control information (DCI) format according to various embodiments of the present disclosure.

For example, FIG. 5A illustrates an example encoding process according to various embodiments of the present disclosure. More particularly, FIG. 5A illustrates an encoding process for a DCI format according to various embodiments of the present disclosure. The embodiment of the encoding process shown in FIG. 5A is for illustration only and should not be construed as limiting. FIG. 5A does not limit the scope of the present disclosure to any particular encoding process. One or more of the steps illustrated in FIG. 5A can be implemented in specialized circuitry configured to perform the noted functions or one or more of the components can be implemented by one or more processors executing instructions to perform the noted functions. For example, the encoding process 501 can be implemented in a UE 111-116 or a gNB 101-103 that implements the encoding process 501. Other embodiments can be used without departing from the scope of the present disclosure.

A gNB, such as the gNB 102, separately encodes and modulates each DCI format in a respective PDCCH. When applicable, a RNTI for a UE, such as the UE 116, that a DCI format is intended for masks a CRC of the DCI format codeword in order to enable the UE 116 to identify the DCI format. For example, the CRC can include 16 bits or 24 bits and the RNTI can include 16 bits or 24 bits. Otherwise, when a RNTI is not included in a DCI format, a DCI format type indicator field can be included in the DCI format. The CRC of (non-coded) DCI format bits 502 is determined using a CRC computation unit 504, and the CRC is masked using an exclusive OR (XOR) operation unit 506 between CRC bits and RNTI bits 508. The XOR operation is defined as XOR(0,0)=0, XOR(0,1)=1, XOR(1,0)=1, XOR(1,1)=0. The masked CRC bits are appended to DCI format information bits using a CRC append unit 510. An encoder 512 performs channel coding (such as tail-biting convolutional coding or polar coding), followed by rate matching to allocated resources by rate matcher 514. Interleaving and modulation units 516 apply interleaving and modulation, such as QPSK, and the output control signal 518 is transmitted.

Figure 5B:
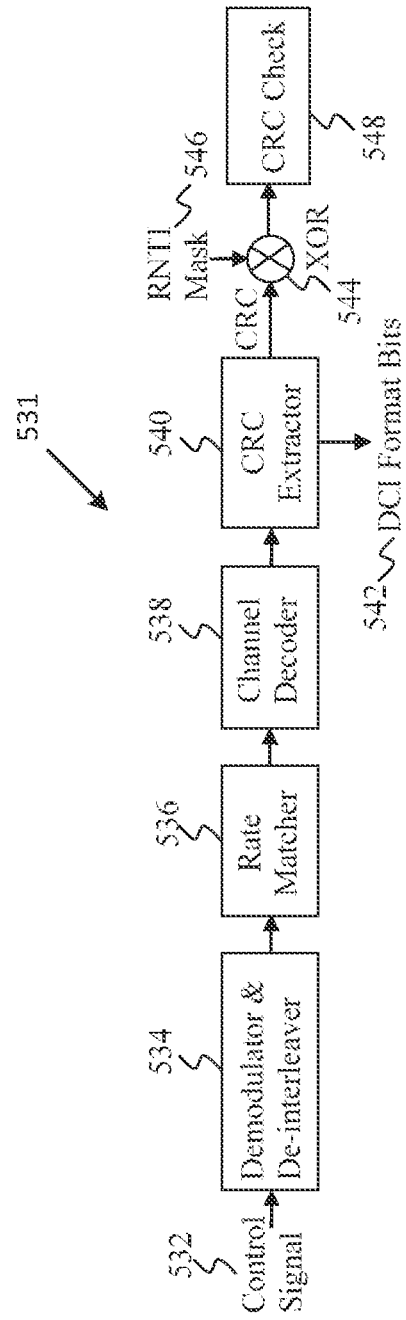
FIG. 5B illustrates an example decoding process for a DCI format according to various embodiments of the present disclosure.

FIG. 5B illustrates an example decoding process according to various embodiments of the present disclosure. More particularly, FIG. 5B illustrates an example decoding process for a DCI format for use with a UE according to various embodiments of the present disclosure. The embodiment of the decoding process shown in FIG. 5B is for illustration only and should not be construed as limiting. FIG. 5B does not limit the scope of the present disclosure to any particular decoding process. One or more of the steps illustrated in FIG. 5B can be implemented in specialized circuitry configured to perform the noted functions or one or more of the components can be implemented by one or more processors executing instructions to perform the noted functions. For example, the decoding process 531 can be implemented in a UE 111-116 or a gNB 101-103 that implements the decoding process 531. Other embodiments can be used without departing from the scope of the present disclosure. In various embodiments, the decoding process 531 can be a complementary process to the encoding process 501 illustrated in FIG. 5A.

A received control signal 532 is demodulated and de-interleaved by a demodulator and a de-interleaver 534. A rate matching applied at a gNB, such as the gNB 102, transmitter is restored by rate matcher 536, and resulting bits are decoded by decoder 538. After decoding, a CRC extractor 540 extracts CRC bits and provides DCI format information bits 542. The DCI format information bits are de-masked 544 by an XOR operation with a RNTI 546 (when applicable) and a CRC check is performed by unit 548. When the CRC check succeeds (check-sum is zero), the DCI format information bits are considered to be valid. When the CRC check does not succeed, the DCI format information bits are considered to be invalid.

UL signals also include data signals conveying information content, control signals conveying UL control information (UCI), DMRS associated with data or UCI demodulation, sounding RS (SRS) enabling the gNB 102 to perform UL channel measurement, and a random access (RA) preamble enabling a UE to perform random access. The transceiver 310 of the UE 116 transmits data information or UCI through a respective physical UL shared channel (PUSCH) or a physical UL control channel (PUCCH). When the UE 116 simultaneously transmits data information and UCI, the UE can multiplex both in a PUSCH. UCI includes hybrid automatic repeat request acknowledgement (HARQ-ACK)

information, indicating correct or incorrect detection of transport blocks (TBs) with data information in a PDSCH, scheduling request (SR) indicating whether the UE 116 has data in its buffer, and CSI reports enabling a gNB to select appropriate parameters for PDSCH or PDCCH transmissions to the UE 116. For UCI multiplexing is a PUSCH, the UE 116 can determine a number of REs according to a UCI type. For systems operating with hybrid beamforming, UCI can also include beam information such as an index for a set of quasi-collocation parameters, from multiple sets of quasi-collocation parameters, for a received signal and a corresponding reference signal received power (RSRP) value.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH.

UL RS includes DMRS, SRS, and phase tracking RS (PTRS). In some embodiments, DMRS can be transmitted only in a BW of a respective PUSCH or PUCCH transmission. A gNB can use a DMRS to demodulate information in a respective PUSCH or PUCCH. SRS is transmitted by the transceiver 310 of the UE 116 to provide a gNB with an UL CSI and, for a TDD system, an SRS transmission can also provide a PMI for DL transmissions by the gNB. PTRS is transmitted in PUSCH REs in order to enable a gNB, such as the gNB 102, receiver to obtain a track a phase of the received signal. Additionally, in order to establish synchronization or an initial RRC connection with the gNB 102, the UE 116 can transmit a physical random access channel (PRACH).

A UE, such as the UE 116, sets a power for a transmission of channel or signal, such as PUSCH, PUCCH, or SRS, with an objective to achieve a corresponding reliability target by achieving a respective target received single-to-interference and noise ratio (SINR) or a target block error rate (BLER) at a cell of a gNB while controlling interference to neighboring cells. UL power control (PC) includes open-loop PC (OLPC) with cell-specific and UE-specific parameters and closed-loop PC (CLPC) corrections (see also REF 3) provided to the UE by a gNB, such as the gNB 102, through transmission PC (TPC) commands. When a PUSCH transmission is scheduled by a PDCCH, a TPC command is included in a respective DCI format.

In various embodiments, 5G systems can flexibly support multiple service types in a same DL BWP or UL BWP that require BLER targets for data or control information that are different by orders of magnitude and require widely different latencies for a successful delivery of a transport block (TB). For PDSCH reception by a UE that provides a TB requiring low latency and high reliability, a serving gNB, such as gNB 102, can suspend any ongoing transmission that would interfere (use same resources in the time/frequency/spatial domains) with the PDSCH reception of the TB by the UE, such as the UE 116. Such interference avoidance is a more difficult task for a PUSCH transmission from a UE that provides a TB requiring low latency and high reliability.

For a PUSCH transmission from a UE, such as the UE 116, that is scheduled by an UL DCI format by a gNB, such as the gNB 102, the gNB has flexibility to avoid ongoing or future transmissions from other UEs that would interfere with the PUSCH transmission through a resource assignment that would avoid such interference. However, because previously scheduled transmissions, such as SRS transmissions, can occupy a substantial part of an active UL BWP, interference avoidance through scheduling is not always possible. Accordingly, various approaches can be implemented to ensure the reliability of the PUSCH transmission.

In some embodiments, to ensure the reliability of a PUSCH transmission from a UE that would be interfered by transmissions from other UEs, a gNB can instruct the other UEs to cancel their transmissions at least in time/frequency/spatial resources that would interfere with the PUSCH transmission from the UE. For example, the gNB can provide an indication to the other UEs to cancel their transmissions through a PDCCH transmission that includes a DCI format that can be detected by all UEs and informs of a set of time resources and a set of frequency resources, referred to as time-frequency resources for brevity, where transmissions from the other UEs need to be canceled. In some embodiment, the DCI format can be referred to as DCI format 2_4.

A UE monitors PDCCH in multiple occasions within a slot. In addition, when a TB included in a PUSCH transmission from the UE requires high reception reliability at the gNB, all interfering UEs need to detect the DCI format provided by a PDCCH with at least similar reception reliability as the one for the TB at the gNB. Accordingly, this approach requires use of a large CCE aggregation level for the PDCCH transmission by the gNB. The combination of a short monitoring periodicity (frequent PDCCH transmissions) and a large number of CCEs for each PDCCH transmission providing a DCI format indicating time and/or frequency resources where transmissions from UEs need to be suspended, increases an implementation complexity for a UE in terms of a number of non-overlapping CCEs that the UE needs to perform channel estimation within a time period such as a slot or a fraction of a slot. Therefore, various embodiments of the present disclosure recognize the benefits of providing mechanisms for a UE to monitor PDCCH that includes a DCI format indicating to a UE time-frequency resources where the UE shall suspend a transmission, while mitigating an increase in a number of non-overlapping CCEs where the UE needs to perform channel estimation in a slot. CCEs for PDCCH candidates are non-overlapped if they correspond to different CORESET indexes or to different first symbols for the reception of the respective PDCCH candidates.

In another embodiment, to ensure the reliability of a PUSCH transmission from a UE that would be interfered by transmissions from other UEs, a gNB can indicate an increase in a PUSCH transmission power from the UE. The gNB can additionally employ interference cancelation such as serial interference cancelation. This embodiment can be limited to UEs that can increase a PUSCH transmission power.

In some embodiments, a PUSCH transmission from a UE, such as the UE 116, can be autonomous, without an associated UL DCI format from a gNB 102, on resources from a set of resources that is provided to the UE 116 from the gNB 102 by higher layers. The PUSCH transmission can be referred to as grant-free PUSCH transmission (GF-PUSCH) or configured-grant PUSCH transmission (CG-PUSCH). For a CG-PUSCH transmission from the UE 116, the gNB 102 does not indicate, to any interfering UEs, to cancel their transmissions because the gNB 102 is unaware of the CG-PUSCH transmission from the UE 116 in advance.

One approach for the gNB 102 to avoid or mitigate the impact of intra-cell interference to a CG-PUSCH transmission is to indicate, for example at the beginning of each slot where a CG-PUSCH transmission can occur, time-frequency resources (or frequency resources if all symbols of the slot are used) with transmissions from other UEs. The UE 116 with the CG-PUSCH transmission can then select a resource from the set of resources that is least impacted by intra-cell interference for the CG-PUSCH transmission. For example, that resource can be the one with the smallest number of RBs used for transmissions by other UEs. In addition, or if no such resources are available, the UE 116 can also be configured with a set of transmission power control parameters to use for example when a CG-PUSCH transmission includes RBs, indicated by the gNB 102, includes or does not include intra-cell interference from other UEs communicating with the gNB 102.

Similar to a PUSCH transmission that is scheduled by an UL DCI format, the UE 116 may not always be capable of increasing a PUSCH transmission power to circumvent interference. Further, when the UE 116 is capable of increasing a PUSCH transmission power, an amount of increase depends on the amount of interference. Therefore, various embodiments of the present disclosure recognize the benefits of enabling a UE with a CG-PUSCH transmission that experiences intra-cell interference to improve a reception reliability for an associated TB without having to increase a CG-PUSCH transmission power. Various embodiments of the present disclosure recognize the benefits of enabling a UE with a CG-PUSCH transmission that experiences intra-cell interference to adjust a CG-PUSCH transmission power according to a level of intra-cell interference. Various embodiments of the present disclosure recognize the benefits of minimizing a probability that a CG-PUSCH transmission from a UE is interfered by transmissions from other UEs on a same bandwidth part of a same serving cell.

Although described herein as enabling a PUSCH transmission from a UE, the same or similar principles can apply to a PUCCH transmission from a UE in resources indicated by a DL DCI format.

Therefore, various embodiments of the present disclosure provide a UE that determines a power adjustment or an MCS adjustment for a CG-PUSCH transmission depending on an amount of interference the CG-PUSCH transmission experiences by transmissions from other UEs on a same serving cell. Various embodiments of the present disclosure further provide a UE that determines resources, from a configured set of resources, for a CG-PUSCH transmission depending on an amount of interference the CG-PUSCH transmission experiences by transmissions from other UEs on a same serving cell. Various embodiments of the present disclosure further provide a UE that minimizes a probability that a CG-PUSCH transmission from the UE experiences interference by transmissions from other UEs on a same serving cell when the UE includes CG-PUSCH resources on multiple cells.

In various embodiments, a UE, such as the UE 116, can support different service/priority types such as mobile broadband (MBB), for example for internet access, and ultra-reliable low latency communications (URLLC), for example from augmented/virtual reality (AR/VR). As communication requirements for different service types can be different, DCI formats used for scheduling PDSCH receptions or PUSCH transmissions to the UE 116 for one service type can be different than DCI formats for another service type and corresponding PDCCH transmissions can require different CCE aggregation levels to accommodate different reliability requirements. To simplify a UE implementation, a number of sizes for DCI formats scheduling UE-specific PDSCH receptions or PUSCH transmissions, such as DCI formats with CRC scrambled by a C-RNTI or an MCS-C-RNTI, can be limited, for example, to three.

Therefore, various embodiments of the present disclosure recognize that when a UE monitors a number of DCI formats, a corresponding number of DCI format sizes does not exceed a limit of DCI format sizes that can be either predetermined in a system operation or indicated by the UE as part of a UE capability. Accordingly, various embodiments of the present disclosure provide a UE that monitors DCI formats corresponding to different service types. In these embodiments, the sizes of DCI formats scheduling UE-specific PDSCH receptions or PUSCH transmissions can be limited to three.

An embodiment of the present disclosure enables the adaptation for a power of a CG-PUSCH transmission from a UE, such as the UE 116, depending on an amount of interference on the CG-PUSCH transmission due to transmissions from other UEs, such as UEs 111-115, to a same serving gNB, such as the gNB 102. The UE 116 can be provided an indication by a DCI format of time-frequency resources that are used for transmissions by other UEs 111-115 in a slot. The DCI format can be referred to as DCI format 2_5. In some embodiments, DCI format 2_5 can provide an indication of time-frequency resources that are not used for transmissions by the other UEs 111-115 in a slot. A search space for a PDCCH with DCI format 2_5 can be a CSS.

For example, a serving gNB 102 can transmit a PDCCH providing DCI format 2_5 at a beginning of each slot where there are resources for CG-PUSCH transmissions. The UE 116 can be provided a corresponding search space set to monitor PDCCH candidates for DCI format 2_5. The PDCCH candidates can be restricted, for example to one or two. When the UE 116 is configured with additional search space sets for monitoring PDCCH according to a CSS in a same CORESET, the PDCCH candidate(s) for DCI format 2_5 can precede or follow the PDCCH candidate(s) for other search space sets. For example, when the UE 116 monitors PDCCH candidates for a DCI format 2_0 and DCI format 2_5 in a same CORESET and the UE 116 is configured with two PDCCH candidates for the DCI format 2_0 and two PDCCH candidates for DCI format 2_5, the CCEs of the two candidates for DCI format 2_5 can be after a last CCE for the two candidates for DCI format 2_0. In some embodiments, a CSS for a PDCCH with a DCI format can be configured to start with an offset $O_{DCI}$ for the DCI format and be determined by Equation 1:

$$L \cdot \left\{ \left[ \frac{m_{s,n_{CI}} \cdot N_{CCE,p}}{L \cdot M_{s,0}^{(L)}} \right] \mod \lfloor N_{CCE,p}/L \rfloor \right\} + i + O_{DCI} \quad \text{Equation 1}$$

In another embodiment, a CSS for a PDCCH with a DCI format can start with an offset $O_{DCI}$ for the DCI format and be determined by Equation 2:

$$L \cdot \left\{ \left( O_{DCI} + \left\lfloor \frac{m_{s,n_{CI}} \cdot N_{CCE,p}}{L \cdot M_{s,0}^{(L)}} \right\rfloor \right) \mod \lfloor N_{CCE,p}/L \rfloor \right\} + i \quad \text{Equation 2}$$

In some embodiments, the offset $O_{DCI}$ can be provided to the UE 116 from the serving gNB 102 by higher layers, for example as part of the search space set configuration for the associated DCI format. In other embodiments, the offset $O_{DCI}$ can be determined by the UE according to a specified rule, such as for example $O_{DCI}=0$ for DCI format 2_0 and $O_{DCI}=16$ for DCI format 2_5 when for example DCI format 2_0 is configured with two candidates of CCE aggregation level 8, and stored in the memory 360. The use of the offset $O_{DCI}$ can be limited to CSS for DCI formats with a predetermined number of candidates. The aforementioned aspects for a transmission of a PDCCH with DCI format 2_5 are also applicable for a transmission of a PDCCH with DCI format 2_4 and, in general, for any DCI format associated with a CSS. For example, a UE can be provided one or more search space sets to monitor PDCCH for detection of DCI format 2_4 according to a CSS and the DCI format 2_4 may also be associated with a small number of PDCCH candidates, such as 1, 2, or 4. Further DCI format 2_4 and DCI format 2_5 can be a same DCI format.

Figure 6:
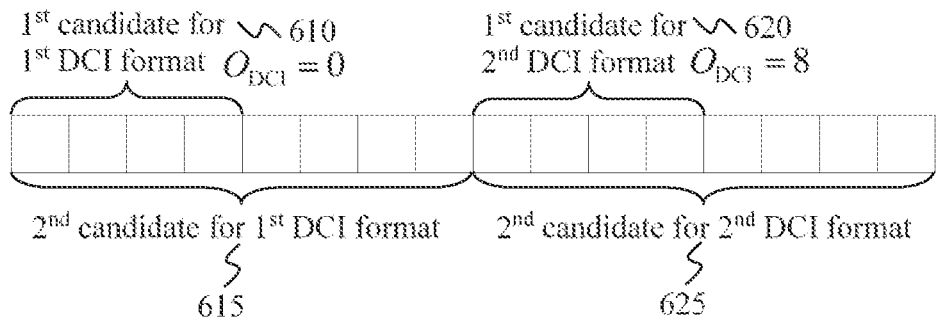
FIG. 6 illustrates a determination of CCEs for PDCCH candidates of DCI formats in respective CSS according to various embodiments of the present disclosure.

FIG. 6 illustrates a determination of CCEs for PDCCH candidates of DCI formats in respective CSS according to various embodiments of the present disclosure. The embodiment of a determination of CCEs for PDCCH candidates of DCI formats in respective CSS shown in FIG. 6 is for illustration only and should not be construed as limiting. FIG. 6 does not limit the scope of the present disclosure to any particular determination of CCEs for PDCCH candidates of DCI formats in respective CSS.

As shown in FIG. 6, for a first DCI format, a UE, such as the UE 116, is provided a search space set with two PDCCH candidates and respective CCE aggregation levels of four CCEs 610 and eight CCEs 615. The UE 116 is also provided with an offset of $O_{DCI}=0$ for a location of a first CCE for PDCCH candidates for the first DCI format or $O_{DCI}=0$ by default for the first DCI format. For a second DCI format, the UE 116 is provided a search space set with two PDCCH candidates and respective CCE aggregation levels of four CCEs 620 and eight CCEs 625. The UE 116 is also provided with an offset of $O_{DCI}=8$ for a location of a first CCE for PDCCH candidates for the second DCI format.

The UE 116 can be provided a set with multiple configured grant resources for a CG-PUSCH transmission. Based on an indication for unavailable (or available) sets of time resources (symbols of one or more slots) and sets of frequency resources (RBs), referred to as time-frequency resources for brevity, by DCI format 2_4 or by DCI format 2_5, the UE 116 can determine a resource to use for a CG-PUSCH transmission where the resource does not include unavailable time-frequency resources. When no such resource exists, the UE 116 can select a resource that has a smallest number of REs that are indicated to be part of unavailable time-frequency resources or the UE 116 can apply other criteria as described in other embodiments of this disclosure. To achieve a target reception reliability (BLER) for the CG-PUSCH transmission, the UE 116 can increase an associated transmission power. Although described herein as considering a CG-PUSCH transmission, the same principle can apply to a PUSCH transmission scheduled by a DCI format in case indicated resources for the PUSCH transmission include unavailable resources.

In one embodiment, the UE 116 determines the increase in the CG-PUSCH transmission power based on a number of CG-PUSCH REs that experience interference from other transmissions to a same serving gNB, such as the gNB 102 (intra-cell interference). The UE 116 adjusts a power of a PUSCH transmission power on active UL BWP b of carrier f on serving cell c, for example by a factor of $\Delta_{TF,b,f,c}=10\log_{10}((2^{BPRE \cdot K_s}-1)\cdot\beta_{offset}^{PUSCH})$ where $$BPRE = \sum_{r=0}^{C-1} K_r/N_{RE}$$

for PUSCH with UL-SCH data, $\beta_{offset}^{PUSCH}=1$, $K_s=1.25$, C is a number of transmitted code blocks, $K_r$ is a size for code block r, and $N_{RE}$ is a number of REs available for data/UCI transmission. As the gNB 102 is aware of the PUSCH REs that experience interference, the gNB 102 can exclude corresponding modulated (or demodulated) symbols from reception or can apply a different (smaller) weight to corresponding modulated (or demodulated) symbols in obtaining a likelihood metric prior to decoding of a TB, or can apply interference cancelation. Depending on the gNB reception approach, the UE 116 may increase by a different amount the PUSCH transmission power.

For example, when the gNB 102 punctures/discards the interfered REs of the PUSCH reception and when $N_{RE,int}$ REs from the $N_{RE}$ REs experience interference, the UE 116 replaces $N_{RE}$ by $N_{RE}-N_{RE,int}$ and uses $$BPRE = \sum_{r=0}^{C-1} K_r/(N_{RE} - N_{RE,int})$$

to determine the PUSCH transmission power adjustment $\Delta_{TF,b,f,c}$. As another example, when the gNB 102 scales the interfered REs of the PUSCH reception, the gNB 102 can provide to the UE 116 a weight factor $w_{RE}$ for the UE 116 to scale a number of interfered REs and subtract $W_{RE} \cdot N_{RE,int}$ from $N_{RE}$ to obtain BPRE as $$BPRE = \sum_{r=0}^{C-1} K_r/(N_{RE} - w_{RE} \cdot N_{RE,int}).$$

In another embodiment, the gNB 102 can provide to the UE 116 by higher layer signaling, a set of power increase values for a respective set of percentages of interfered REs of a PUSCH transmission. For example, the gNB 102 can configure the UE 116 to increase a PUSCH transmission power by [1, 3, 4.5, 6] dB when a percentage of interfered REs is between 0% and 25%, between 25% and 50%, between 50% and 75%, and between 75% and 100%, respectively.

Figure 7:
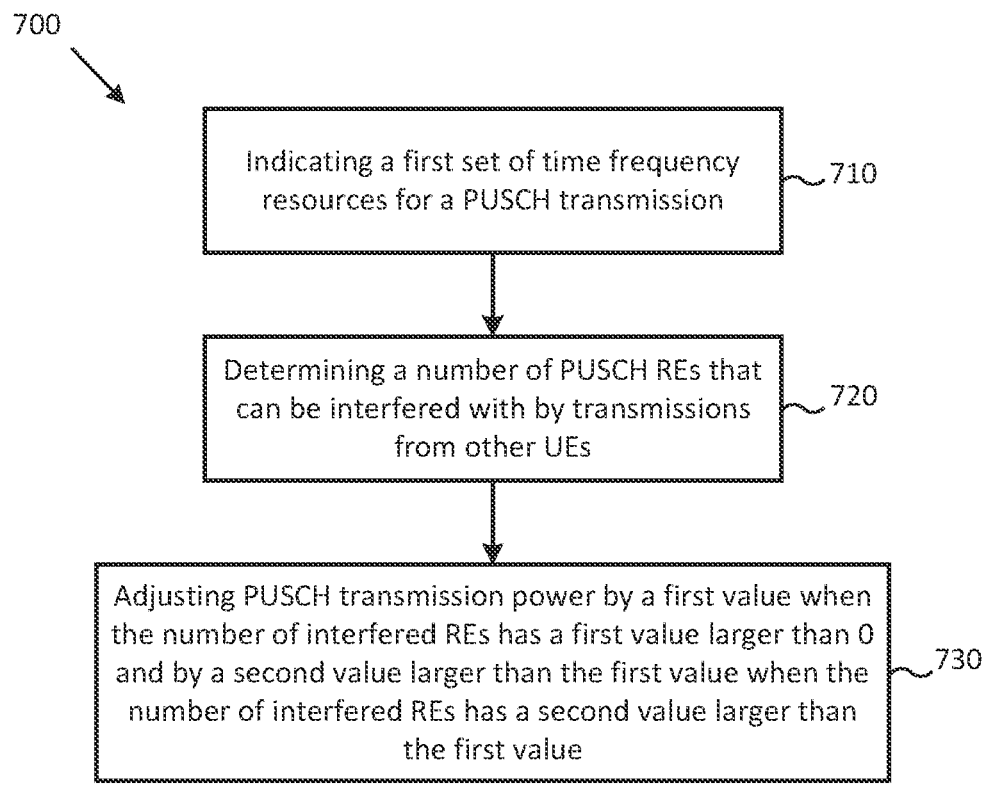
FIG. 7 illustrates a method of determining a power for a PUSCH transmission according to various embodiments of the present disclosure.

For example, FIG. 7 illustrates a method of determining a power for a PUSCH transmission to various embodiments of the present disclosure. More particularly, FIG. 7 illustrates a method 700, performed by a UE 116, of determining determine a power for a PUSCH transmission based on a number of interfered REs for the PUSCH transmission according to various embodiments of the present disclosure. Although described herein as being implemented by the UE 116, the method illustrated in FIG. 7 can be implemented in one or more of the UEs 111-116 and a corresponding method can be performed by one or more of the gNBs 101-103 described in FIG. 1. Other embodiments can be used without departing from the scope of the present disclosure.

In operation 710, the UE 116 is indicated a first set of time-frequency resources for a PUSCH transmission to a serving gNB 102. The indication can be performed by a DCI format or by higher layer signaling.

In operation 720, the UE 116 determines a number of REs for the PUSCH transmission that can be interfered by transmissions from other UEs 111-115 to the serving gNB 102. The number of REs for the PUSCH transmission that can be interfered with by transmissions from other UEs 111-115 can be referred to as interfered REs. In some embodiments, the UE 116 can determine the number of interfered REs based on a DCI format detection by the UE 116 wherein the DCI format indicates a second set of time-frequency resources. Based on the determined number of interfered REs, the UE 116 can determine a power for the PUSCH transmission.

In operation 730, the UE 116 adjusts a power for the PUSCH transmission. When the number of interfered REs has a first value larger than 0, the UE 116 adjusts a PUSCH transmission power by the first value. When the number of interfered REs has a second value larger than the first value, the UE 116 adjusts a PUSCH transmission power by the second value that is larger than the first value.

An embodiment of the present disclosure enables the adaptation of a modulation and coding scheme (MCS) of a CG-PUSCH transmission from a UE, such as the UE 116, that depends on an amount of interference on the CG-PUSCH transmission due to transmissions from other UEs, such as the UEs 111-115, to a same serving gNB, such as the gNB 102. The adaptation of the MCS can apply to power limited UEs or can be combined with a power increase as described in above in the descriptions of FIGS. 6 and 7.

In some embodiments, the gNB 102 is aware of which CG-PUSCH REs experience interference. In these embodiments, the gNB 102 can exclude corresponding modulated (or demodulated) symbols from reception or can apply a different (smaller) weight to corresponding modulated (or demodulated) symbols in obtaining a likelihood metric prior to decoding. Depending on the gNB reception approach, the UE 116 may decrease, by a different amount, an MCS for the CG-PUSCH transmission.

For example, when the gNB 102 punctures/discards the interfered REs of the CG-PUSCH reception and $N_{RE,int}$ REs from the $N_{RE}$ REs experience interference, the UE 116 scales the configured MCS of the CG-PUSCH by a factor of $(N_{RE}-N_{RE,int})/N_{RE}$ and transmits the PUSCH, using the largest MCS, from a MCS table that is smaller than the scaled MCS. The MCS table can be stored in the operating system 361 of the memory 360.

In another example, when the gNB 102 scales the interfered REs of the PUSCH reception, the gNB 102 can provide to the UE 116 a weight factor $w_{MCS} \leq 1$, or an offset factor $w_{MCS} \geq 0$, for the UE 116 to scale, or offset, a configured MCS of the CG-PUSCH transmission.

As yet another example, the gNB 102 can provide, to the UE 116 by higher layer signaling, a set of MCS weight factors for a respective set of percentages of interfered REs of a PUSCH transmission. For example, the gNB 102 can configure the UE 116 to scale the configured MCS of the CG-PUSCH transmission by [0.8, 0.6, 0.45, 0.3] dB when a percentage of interfered REs is between 0% and 25%, between 25% and 50%, between 50% and 75%, and between 75% and 100%, respectively.

Figure 8:
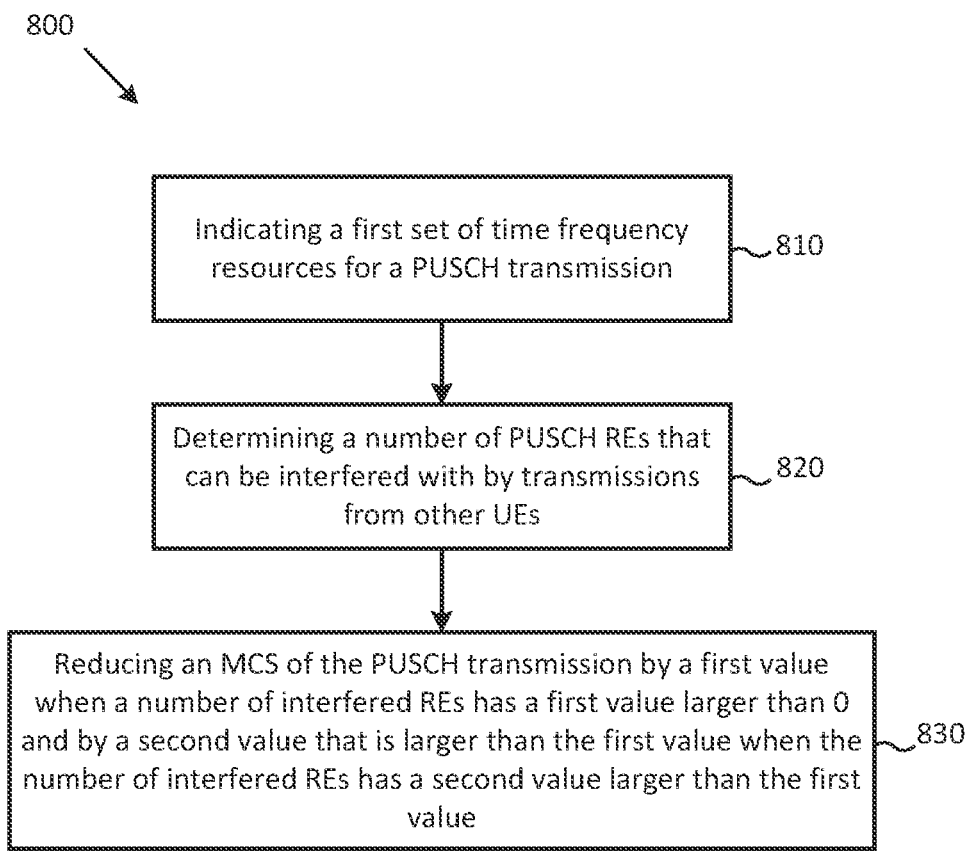
FIG. 8 illustrates a method of determining an MCS for a PUSCH transmission according to various embodiments of the present disclosure.

FIG. 8 illustrates a method of determining an MCS for a PUSCH transmission according to various embodiments of the present disclosure. More particularly, FIG. 8 illustrates a method 800, performed by the UE 116, of determining an MCS for a PUSCH transmission based on a number of interfered REs for the PUSCH transmission according to various embodiments of the present disclosure. Although described herein as being implemented by the UE 116, the method illustrated in FIG. 8 can be implemented in one or more of the UEs 111-116 and a corresponding method can be performed by one or more of the gNBs 101-103 described in FIG. 1. Other embodiments can be used without departing from the scope of the present disclosure.

In operation 810, a first set of time-frequency resources for a PUSCH transmission are indicated to the UE 116. The UE 116 can use the time-frequency resources for a PUSCH transmission to the gNB 102. In some embodiments, the indication can be provided to the UE 116 by a DCI format or by higher layer signaling.

In operation 820, the UE 116 determines a number of REs for the PUSCH transmission that can be interfered with by transmissions from the other UEs 111-115 to the serving gNB 102. The REs for the PUSCH transmission that can be interfered with can be referred to as interfered REs. In some embodiments, the UE 116 can determine the number of interfered REs based on a DCI format detection, performed by the UE 116, when the DCI format indicates a second set of time-frequency resources. Based on the number of interfered REs, the UE 116 can determine an MCS for the PUSCH transmission.

In operation 830, the UE 116 reduces the MCS of the PUSCH transmission. When the number of interfered REs has a first value larger than zero, the UE 116 reduces the MCS by the first value. When the number of interfered REs has a second value that is larger than the first value, the UE 116 reduces the MCS by the second value that is larger than the first value.

Various embodiments of the present disclosure provide the selection of a cell, or of both a cell and an UL BWP, from a UE, such as the UE 116, for a CG-PUSCH transmission. In some embodiments, one or both of DCI format 2_4 and DCI format 2_5 can include multiple fields that provide respective multiple indications for used (or not used) time-frequency resources for transmissions from UEs on respective multiple UL cells, or on respective multiple UL BWPs and multiple UL cells. A UE can be configured a location of a field in DCI format 2_4 or in DCI format 2_5 that provides an indication for a corresponding UL cell, or for a corresponding UL BWP and UL cell. Each field can have a same size or a different size.

In some embodiments, the multiple UL cells can have a same SCS configuration for corresponding UL BWPs. A separate DCI format 2_4 or DCI format 2_5 can be used for UL cells having different SCS configuration for corresponding UL BWPs or an indication of time-frequency resources by a DCI format can be adjusted according to a SCS configuration for a corresponding UL BWP. When there are multiple UL BWPs with same SCS configuration for an UL cell, DCI format 2_4 or DCI format 2_5 can include a field of each UL BWP. For example, for a serving gNB 102 having a PCell and a SCell each with two UL BWPs, the first and second fields can correspond to the first and second UL BWPs of the PCell and the third and fourth fields can correspond to the third and fourth UL BWPs. Therefore, in some embodiments, fields in DCI format 2_4 or DCI format 2_5 can be located first in ascending order of UL BWPs starting from a cell with a lowest index (PCell) and then in ascending order of a cell index. In other embodiments, the fields can be arranged first in ascending order of the cell index starting from the UL BWP with the lowest index and then in ascending order of the UL BWP index.

For example, DCI format 2_4 can include a first field for a UE, such as the UE 116, to obtain an indication for time-frequency resources in one or more slots where the UE 116 shall suspend or cancel previously scheduled/configured transmissions for a PCell. The DCI format 2_4 can further include second and third fields for the UE 116 to obtain an indication for time-frequency resources in a slot where the UE 116 shall suspend or cancel previously scheduled/configured transmissions for a SCell with a lowest index and a SCell with a second lowest index for the UE 116.

In some embodiments, the UE 116 configured with multiple CG-PUSCH resources can choose a CG-PUSCH resource that includes a smallest number of REs, including zero REs, from the REs indicated by DCI format 2_4 for suspension or cancelation of scheduled/configured transmissions. The serving gNB 102 can use at least some of the REs for scheduling other transmissions from other UEs 111-115. When the UE 116 has configured CG-PUSCH resources on multiple cells that do not include any of the REs indicated by DCI format 2_4 for suspension/cancelation of transmissions, the UE 116 can use the CG-PUSCH resources on the cell with the smallest index to transmit a CG-PUSCH.

For example, for DCI format 2_5, the UE 116 can be configured with a first field to obtain an indication for time-frequency resources in a slot where the UE 116 has scheduled/configured transmissions for a PCell. The UE 116 can be further configured with second and third fields to obtain an indication for time-frequency resources in a slot where the UE 116 has scheduled/configured transmissions for a SCell with a lowest index and a SCell with a second lowest index for the UE 116.

In addition, when the UE 116 is configured with multiple CG-PUSCH resources, the UE 116 can choose a CG-PUSCH resource that includes a smallest number of REs, including zero REs, from the REs that are indicated by DCI format 2_5 for scheduled/configured transmissions. When the UE 116 has configured CG-PUSCH resources on multiple cells that do not include any of the REs indicated by DCI format 2_5 for scheduled/configured transmissions, the UE 116 can use the CG-PUSCH resources on the cell with the smallest index to transmit a CG-PUSCH.

Figure 9:
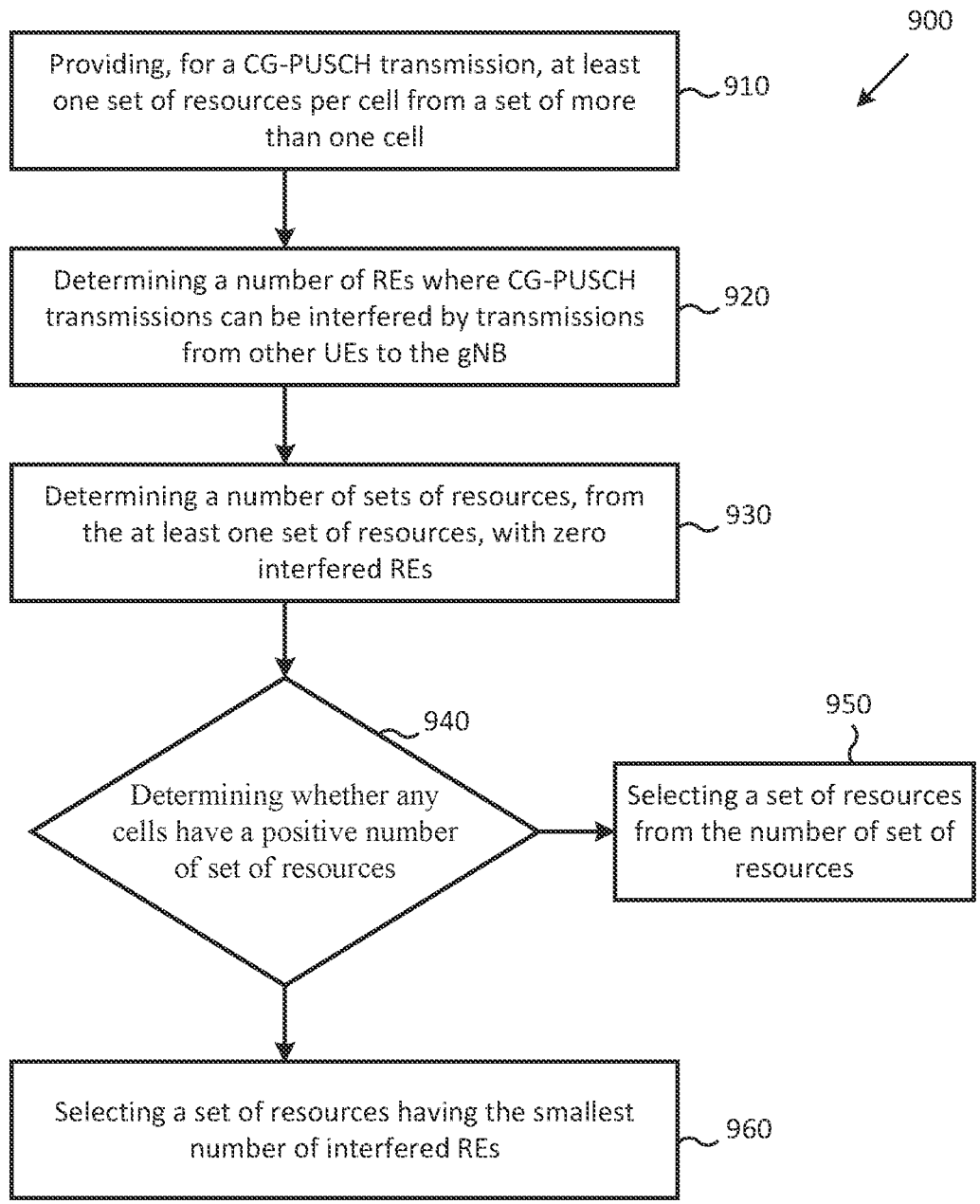
FIG. 9 illustrates a method for determining a cell for a CG-PUSCH transmission according to various embodiments of the present disclosure.

For example, FIG. 9 illustrates a method for determining a cell for a CG-PUSCH transmission according to various embodiments of the present disclosure. Although described herein as being implemented by the UE 116, the method 900 illustrated in FIG. 9 can be implemented in one or more of the UEs 111-116 and a corresponding method can be performed by one or more of the gNBs 101-103 described in FIG. 1. Other embodiments can be used without departing from the scope of the present disclosure.

In operation 910, the UE 116 is provided, by a gNB such as the gNB 102, at least one set of time-frequency resources per cell from a set of more than one cells. The at least one set of time-frequency resources per cell can be provided for a CG-PUSCH transmission to the gNB 102.

In operation 920, the UE 116 determines a number of REs where the CG-PUSCH transmission can be interfered by transmissions from other UEs, such as the UEs 111-115, to the gNB 102, for each set of resources from the at least one set of resources for each cell from the set of more than one cells. The determined number of REs where the CG-PUSCH transmission can be interfered by transmissions from other UEs 111-115 can be referred to as interfered REs. In some embodiments, the UE 116 can determine the interfered REs based on a DCI format detected by the UE 116. The DCI format can indicate a set of time-frequency resources for each cell from the set of more than one cells.

In operation 930, the UE 116 determines, for each cell from the set of more than one cell, a number of sets of resources, from the at least one set of resources, with zero interfered REs. In operation 940, the UE 116 determines whether there are any cells that have a positive number. If the UE 116 determines there are cells that have a positive number, the UE 116 proceeds to operation 950. If the UE 116 determines none of the cells have a positive number of set of resources, the UE 116 proceeds to operation 960.

In operation 950, based on the UE 116 determining the number is positive for at least one cell from the set of more than one cells, the UE selects a set of resources from the number of sets of resources. For example, the UE 116 can select the set of resources associated with a cell having the smallest index.

In operation 960, based on the UE 116 determining none of the cells have a positive number of set of resources, the UE 116 selects the set of resources having the smallest number of interfered REs. In embodiments where there is more than one set of resources having the smallest number of interfered REs, the UE 116 can select the one for the cell with the smallest index.

DCI format 2_4 and DCI format 2_5 can be a same DCI format where, depending on a particular transmission, a UE can perform a different action based on the indication by the DCI format. For example, a UE with a PUSCH transmission with lower priority can cancel the PUSCH transmission when corresponding time resources and frequency resources are respectively included in a set of time resources and in a set of frequency resources indicated by the DCI format while a UE with a PUSCH transmission of higher priority can transmit the PUSCH by increasing a PUSCH transmission power, or by using a smaller MCS for the data information, or by selecting a cell with the least amount of interference for the PUSCH transmission, when corresponding time resources and frequency resources are respectively included in a set of time resources and in a set of frequency resources indicated by the DCI format.

As described herein, UL signals include signals related to initial access and scheduling requests. A UE, such as the UE 116, can transmit a physical random access channel (PRACH) for initial access to a serving gNB, such as the gNB 102, after the UE 116 establishes synchronization and obtains system information from the serving gNB 102. When the UE 116 does not detect a random access response (RAR) in response to a previous PRACH transmission, the UE 116 can transmit another PRACH with increased power for example according to a power ramping procedure.

The UE 116 can transmit a scheduling request (SR) to indicate to the serving gNB 102 that the UE 116 has data in its buffer for transmission to the gNB 102. The UE 116 transmits the SR with parameters the UE 116 is provided by the gNB 102, such as a PUCCH resource configuration or a time periodicity for PUCCH transmissions providing a SR. In some embodiments, the parameters can be unique for each UE 116. Upon detecting an SR, the gNB 102 can identify which UE, for example which UE of the UEs 111-116, has transmitted the SR and subsequently schedule the UE 116 for a PUSCH transmission where the UE 116 can provide more information for the buffer status of the UE 116 through a buffer status report (BSR). As described herein, the UE 116 can determine a PUSCH transmission power. For a PUSCH transmission on an active UL BWP b of carrier f of serving cell c, the UE 116 can determine a PUSCH transmission power $P_{PUSCH,b,f,c}(i, j, q_d, l)$ in PUSCH transmission occasion i using parameter set configuration with index j and PUSCH power control adjustment state with index l, as in Equation 3:

$$P_{PUSCH,b,f,c}(i, j, q_d, l) = \min\left\{\begin{array}{l}P_{CMAX,f,c}(i),\\P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l)\end{array}\right\} \quad \text{Equation 3}$$

The UE 116 can determine a PUCCH transmission power $P_{PUCCH,b,f,c}(i, q_u, q_d, l)$ using Equation 4:

$$P_{PUCCH,b,f,c}(i, q_u, q_d, l) = \min\left\{\begin{array}{l}P_{CMAX,f,c}(i),\\P_{O\_PUCCH,b,f,c}(q_u) + 10\log_{10}(2^\mu \cdot M_{RB,b,f,c}^{PUCCH}(i)) + PL_{b,f,c}(q_d) + \Delta_{F\_PUCCH}(F) + \Delta_{TF,b,f,c}(i) + g_{b,f,c}(i, l)\end{array}\right\}[dBm] \quad \text{Equation 4}$$

The UE can determine an SRS transmission power $P_{SRS,b,f,c}(i, q_s, l)$ using Equation 5:

$$P_{SRS,b,f,c}(i, q_s, l) = \min\left\{\begin{array}{l}P_{CMAX,f,c}(i),\\P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + f_{b,f,c}(i, l)\end{array}\right\}[dBm] \quad \text{Equation 5}$$

In Equations 4 and 5, $P_{O\_PUSCH,b,f,c}(j)$ and $\alpha_{b,f,c}(j)$ are referred to as open loop power control (OL PC) parameters for the PUSCH transmission power from the UE 116 (similar for the PUCCH and SRS transmission power), $PL_{b,f,c}(q_d)$ is a path-loss measurement by the UE that can be obtained by measuring a reference signal received power (RSRP), and $f_{b,f,c}(i, l)$ ($g_{b,f,c}(i, l)$ for the PUCCH and $h_{b,f,c}(i, l)$ for the SRS) is a closed loop power control (CL PC) parameter that is obtained by the UE 116, for example, by accumulating transmit power control (TPC) command values for a PUSCH transmission (or for a PUCCH transmission in case of $g_{b,f,c}(i, l)$ or for a SRS transmission in case of $h_{b,f,c}(i, l)$).

As described herein, 5G systems are able to support multiple service/priority types, for a same UE or for different UEs, requiring BLER targets for data or control information that are different by orders of magnitude and requiring widely different latencies for a successful delivery of a transport block. A service type can be for mobile broadband (MBB) or for ultra-reliable low latency communication (URLLC).

URLLC services can be sporadic and require lower latency than MBB services. A UE, such as the UE 116, may not transmit or receive any signaling for a long time period prior to the UE 116 transmitting or receiving data with low latency. Data reception can be accompanied by a subsequent transmission of HARQ-ACK information in a PUCCH from the UE 116 to indicate whether or not the UE 116 correctly detected an associated transport block (TB). Data transmission can be enabled by an SR transmission from the UE 116 and a subsequent detection of an UL DCI format (UL grant) scheduling an associated PUSCH transmission from the UE 116 (grant-based PUSCH or GB-PUSCH) or can be enabled by a configured grant (CG-PUSCH) where the UE 116 can transmit a PUSCH using one from a set of one or more resource configurations that were previously provided to the UE 116 by the gNB 102.

When the UE 116 has not received TPC commands from the serving gNB 102 in a time period that is long enough for channel medium characteristics to have substantially changed, for example due to short-term fading that can cause signal-to-interference and noise ratio (SINR) variations as much as 10 decibels (dB), the gNB 102 cannot determine a proper power setting for a transmission by the UE 116. For example, for a transmission of a PUCCH with HARQ-ACK information, in response to a TB reception in a PDSCH that is scheduled by a DCI format that includes an indication for TPC command value or an indication for values of open loop power control parameters, the gNB 102 may not have information for selecting a TPC command value or open loop power control parameter values. A similar situation can be present for a transmission of a PUSCH that is scheduled by a DCI format in a PDCCH. In addition, for an SR transmission in a PUCCH or for a CG-PUSCH transmission, the gNB 102 may have no prior knowledge of the transmission. Accordingly, various embodiments recognize that a transmission power is determined by the UE 116.

Different UCI types can have different reception reliability requirements, or a different coding gain, that affect a corresponding reception reliability. The serving gNB 102 can provide, to the UE 116, a different value for at least one parameter of an open loop power control component for the UE 116 to use in determining a power for a PUCCH transmission that includes the UCI type. When a PUCCH transmission includes multiple UCI types, a power for the PUCCH transmission by the UE 116 allows a reception reliability for each of the multiple UCI types.

Accordingly, various embodiments of the present disclosure recognize the potential benefits of a UE autonomously determining a transmission power. Various embodiments of the present disclosure further recognize the potential benefits of an SR transmission or CG-PUSCH transmission from a UE to be correctly decoded by a serving gNB. Various embodiments of the present disclosure further recognize the potential benefits of using a TPC command value to increase a power for a PUSCH transmission from a UE on a serving cell in order to suppress interference to the PUSCH transmission from other transmissions on the serving cell without the TPC command increasing a power for a PUSCH transmission from the UE that is not subject to interference from other transmission on the serving cell. Finally, various embodiments of the present disclosure recognize the potential benefits of determining a power for a PUCCH transmission that includes multiple UCI types having different reception reliability requirements.

An embodiment of the present disclosure provides means for a UE, such as the UE 116, to determine a transmission power adjustment for at least one of a PUSCH, PUCCH, or SRS transmission. In a flexible duplex system, where transmissions from a gNB, such as the gNB 102, to the UE 116 (DL) and transmissions from the UE 116 to the gNB 102 (UL) are in a same carrier frequency, the channel fading characteristics are same in the DL and in the UL. As a consequence, the UE 116 can estimate a SINR change for a reception by the serving gNB 102 of a channel/signal transmission by the UE 116 by measuring a SINR change for a reception by the UE 116 of a channel/signal transmission by the gNB 102. This can be beneficial when the gNB 102 has not received signaling from the UE 116 for a time period that is long enough for characteristics of the channel medium, such as the channel fading characteristics, to have materially changed.

For example, the serving gNB 102 can configure the UE 116 whether or not the UE 116 can autonomously determine a power adjustment for a PUSCH, or PUCCH, or SRS transmission. The UE 116 can measure a received power or SINR of a signal, such as a CSI-RS or a SS/PBCH block, that is transmitted periodically by the gNB 102. In some cases, such as for example for a PUCCH transmission with HARQ-ACK information from the UE 116 in response to a PDSCH reception by the UE 116, the UE 116 can measure a received power or SINR using a DMRS in the PDSCH reception. Although described herein as a CSI-RS, various embodiments can also apply regarding other signals that are transmitted by the gNB 102.

In some embodiments, a transmission power for a CSI-RS can be informed to the UE 116 by the serving gNB 102. In other embodiments, the gNB 102 does not inform the UE 116 of the transmission power for the CSI-RS. The gNB 102 can provide the UE 116 a target received power, or a target received SINR, for the CSI-RS as a function of a RSRP (or path-loss) where the RSRP is measured by the UE 116. For example, the gNB 102 can provide the UE 116 with one or more reference CSI-RS reception power values for corresponding one or more RSRP values. When the UE 116 measures an RSRP of Y dBm that is associated with a CSI-RS reception power of X dBm, and the UE 116 measures a CSI-RS reception power of Y+$\Delta_{RSRP}$ dBm, the UE 116 can determine to increase a signal transmission power by −$\Delta_{RSRP}$ dBm (where $\Delta_{RSRP}$ can be positive, zero, or negative). For example, when the UE 116 is provided a reference RSRP value of Y dBm and an associated reference CSI-RS reception power of X dBm, and the UE 116 measures a RSRP value of (Y+Y1) dBm and a CSI-RS reception power of (X+X1) dBm, the UE 116 determines a power adjustment $\Delta_{RSRP}$=(X+X1−Y−Y1) dBm. Following the determined power adjustment, using a PUSCH for reference, the UE 116 can determine a power for a PUSCH transmission as in Equation 6:

In operation 1020, the UE 116 measures an RSRP value of (Y+Y1) dBm and a CSI-RS reception power of (X+X1) dBm. In operation 1030, the UE 116 determines a transmission power adjustment $\Delta_{RSRP}$. The UE 116 can determine the transmission power adjustment $\Delta_{RSRP}$ by $\Delta_{RSRP}$=(X+X1−Y−Y1).

In operation 1040, the UE 116 adds the determined transmission power adjustment $\Delta_{RSRP}$ to adjust a transmission power. In various embodiments, following the adjustment of the transmission power, the transceiver 310 can send a transmission using the adjusted transmission power.

In some embodiments, the UE 116 can maintain two RSRP measurements. The UE 116 obtains a first RSRP measurement, $RSRP_1$, by filtering a first number of first RS measurements over a first time period. The UE 116 obtains a second RSRP measurement, $RSRP_2$, by filtering a second number of second RS measurements over a second time period, which is smaller than the first time period. The first and second measurements can be based on receptions of different signals, such as SS/PBCH blocks for the first RS measurements and CSI-RS for the second RS measurements. For example, a second number of CSI-RS receptions for determining the second RSRP measurement can be provided to the UE 116 by the gNB 102. For example, the second number of CSI-RS receptions for determining the second RSRP measurement can be predetermined in a system operation as a function of the CSI-RS reception periodicity. For example, for CSI-RS reception periodicity of 10 msec, the second number can be 2 while for CSI-RS reception periodicity of 40 msec, the second number can be 1. The UE 116 can use a difference between the second RSRP and the first RSRP, $\Delta_{RSRP}$=$RSRP_2$−$RSRP_1$ (in dBm) to adjust a transmission power.

In another embodiment, as further described below in FIG. 11, the UE 116 can reset a closed loop power control value of a power control process if the UE 116 has not received a TPC command from the serving gNB 102 for a time period. In particular, the UE 116 can reset the closed loop power control value to zero or to a value predetermined and saved in an operating system 361 or provided to the UE 116 by the serving gNB 102 through higher layer signaling. For example, for a PUSCH transmission, the UE 116 can reset to zero the value of $f_{b,f,c}(i, l)$. The time period can be provided to the UE 116 by the gNB 102, for example $$P_{PUSCH,b,f,c}(i, j, q_d, l) = \min\left\{\begin{array}{l}P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) + \Delta_{RSRP}\end{array}\right\}[dBm] \quad \text{Equation 6}$$

Figure 10:
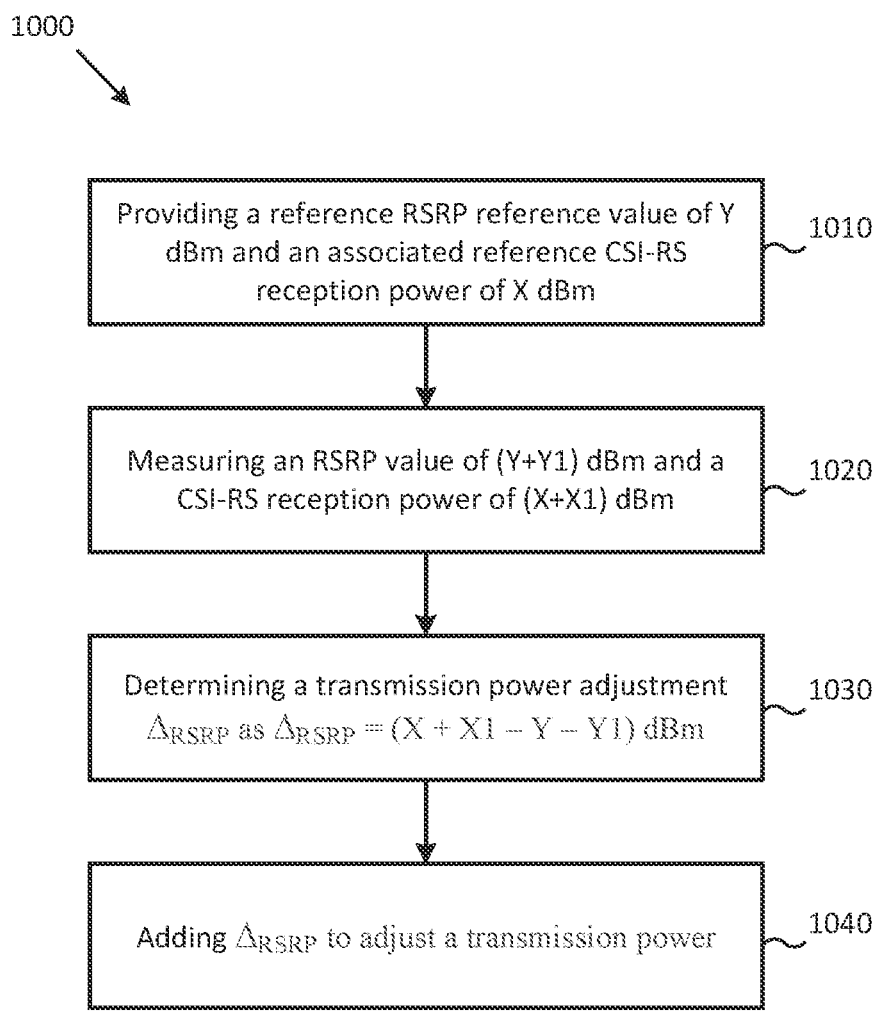
FIG. 10 illustrates a method of determining a transmission power according to various embodiments of the present disclosure.

For example, FIG. 10 illustrates a method of determining a transmission power according to various embodiments of the present disclosure. Although described herein as being implemented by the UE 116, the method 1000 illustrated in FIG. 10 can be implemented in one or more of the UEs 111-116 and a corresponding method can be performed by one or more of the gNBs 101-103 described in FIG. 1. Other embodiments can be used without departing from the scope of the present disclosure.

In operation 1010, the UE 116 is provided a reference RSRP value of Y dBm and an associated reference CSI-RS reception power of X dBm. In some embodiments, the transceiver 310 can receive the reference RSRP value from the gNB 102, for example through a system information block. The reference RSRP value can be stored in the memory 360.

through higher layer signaling, and can be stored in the memory 360. The UE 116 starts a timer each time the UE 116 receives a TPC command and increases the timer in predetermined or configured time intervals such as a number of symbols or a number of slots or a number of msec. While the closed loop power control value remains reset, such as while the UE 116 has not received any TPC command, the UE 116 determines a transmission power for a channel or signal based only on open loop power control parameters and parameters related to the channel/signal transmission for example as in Equation 3, Equation 4, or Equation 5. In some embodiments, the closed loop power control component value can always be disabled, for example by a gNB configuration.

In one example, each closed loop power control component for the PUSCH, PUCCH, or SRS transmission has a separate timer. When each closed loop power control component has a separate timer, a TPC command can be applicable to only one of a PUSCH, PUCCH or SRS transmission. In another example, a timer is common to the closed loop power control component for the PUSCH, PUCCH, or SRS transmission and the timer is jointly reset, by the UE 116 receiving a TPC command for any of a PUSCH, PUCCH, or SRS transmission, and jointly expires, by each closed loop power control component for a PUSCH, PUCCH, or SRS transmission being set to zero at a same time. When the timer is common to the closed loop power control component, a TPC command can also be applicable to all PUSCH, PUCCH and SRS transmissions. In some embodiments, a timer can be jointly set for some transmissions and separately set for some other transmissions. For example, a timer can be jointly set for PUSCH transmissions and SRS transmissions and separately set for PUCCH transmissions.

Figure 11:
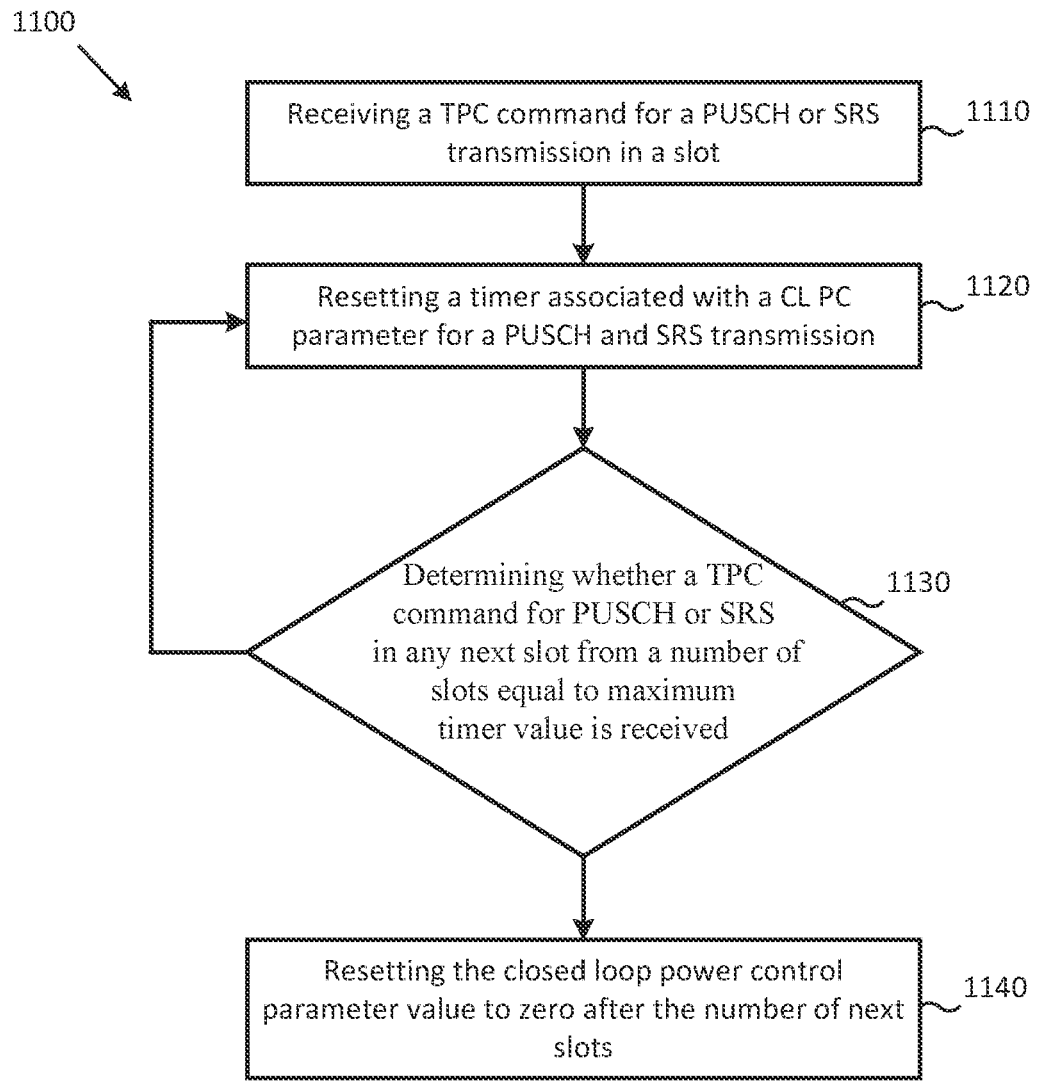
FIG. 11 illustrates a method of resetting a value of a closed loop power control (CL PC) parameter according to various embodiments of the present disclosure.

FIG. 11 illustrates a method of resetting a value of a closed loop power control (CL PC) parameter according to various embodiments of the present disclosure. Although described herein as being implemented by the UE 116, the method illustrated in FIG. 11 can be implemented in one or more of the UEs 111-116 and a corresponding method can be performed by one or more of the gNBs 101-103 described in FIG. 1. Other embodiments can be used without departing from the scope of the present disclosure.

In operation 1110, the transceiver 310 receives a TPC command for a PUSCH or SRS transmission in a slot. For example, the transceiver 310 can receive the TPC command from the gNB 102.

In operation 1120, following the reception of the TPC command, the UE 116 resets a timer associated with a CL PC parameter for PUSCH and SRS transmissions. In operation 1130, for each of a number of next slots equal to a maximum timer value, the UE 116 determines whether the TPC command for a PUSCH or SRS transmission is received. The transceiver 310 can receive the maximum timer value from the gNB 102 through higher layer signaling or the maximum timer value can be stored in the memory 360.

If the UE 116 receives the TPC command for the PUSCH or the SRS transmission in a slot from the number of next slots, the UE 116 returns to operation 1120 and resets the timer at the slot. If the UE 116 has not received the TPC command for the PUSCH or the SRS transmission in a slot from the number of next slots, the UE 116 increments the timer after each slot from the number of next slots and resets the closed loop power control parameter value to zero, or to a value provided by the serving gNB 102, after the number of next slots.

Throughout the method 1100, the UE 116 maintains a current timer value until a TPC command for a PUSCH or SRS transmission is received. In response to the TPC command being received, the UE 116 resets the time value to zero.

Figure 12:
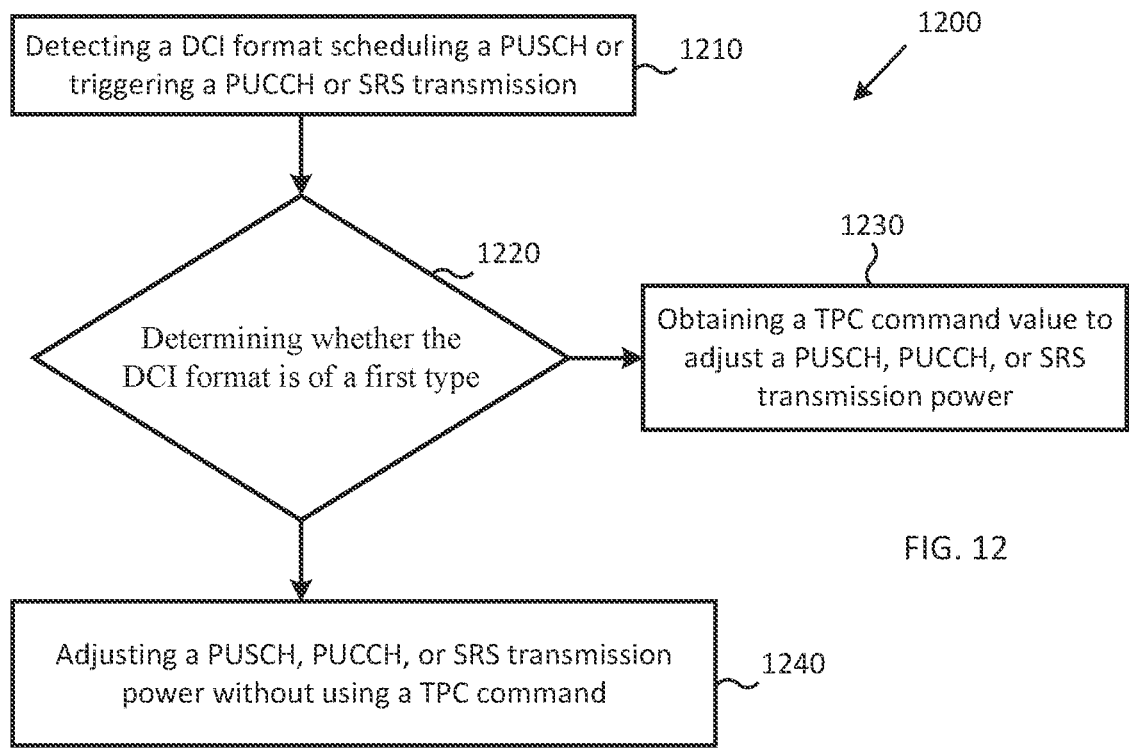
FIG. 12 illustrates a method of determining whether to use a closed loop power control parameter value to adjust a power of a transmission according to various embodiments of the present disclosure.

In another embodiment, as further described in FIG. 12, the UE 116 can include different power control processes for a same channel/signal type depending on an associated DCI format, when the channel/signal transmission is associated with a DCI format, or depending on an indication in a set of parameters when the channel/signal transmission is configured by higher layer signaling.

For example, when a PUCCH transmission with HARQ-ACK information is transmitted in response to a PDSCH reception that is scheduled by a first DCI format, the UE 116 can use a first power control process to determine a PUCCH transmission power. When a PUCCH transmission with HARQ-ACK information is transmitted in response to a PDSCH reception that is scheduled by a second DCI format, the UE 116 can use a second power control process to determine a PUCCH transmission power. The first power control process and second power control process can have different values for open loop power control parameters or can have different closed loop power control processes, including an absence of a closed loop power control process for the second power control process. For example, the second closed loop power control process may not use TPC commands provided by a UE-group common DCI format, such as DCI format 2_2, for example because a target BLER can be larger than required for the reliability of channel/signal receptions associated with the second power control process. The UE 116 can identify the first DCI format and second DCI format based on various parameters such as a corresponding RNTI, size, or identification field value associating the first and second DCI format with the first and second power control processes, respectively.

FIG. 12 illustrates a method of determining whether to use a closed loop power control parameter value to adjust a power of a transmission according to various embodiments of the present disclosure. Although described herein as being implemented by the UE 116, the method 1200 illustrated in FIG. 12 can be implemented in one or more of the UEs 111-116 and a corresponding method can be performed by one or more of the gNBs 101-103 described in FIG. 1. Other embodiments can be used without departing from the scope of the present disclosure.

In operation 1210, the UE 116 detects a DCI format scheduling a PUSCH transmission or triggering a PUCCH or SRS transmission. In operation 1220, the UE 116 determines whether the DCI format is of a first priority type. In some embodiments, the UE 116 further determines whether the DCI format is of a second priority type. If the UE 116 determines the DCI format is of a first priority type, the UE 116 proceeds to operation 1230. If the UE 116 determines the DCI format is not of a first priority type, the UE 116 proceeds to operation 1240.

In operation 1230, based on the UE 116 determining the DCI format is of a first priority type, the UE 116 obtains a TPC command field value in the first DCI format to adjust a PUSCH, PUCCH, or SRS transmission power through an associated update of a closed loop power control component value.

In operation 1240, the UE 116 does not use a closed loop power control component value to adjust a PUSCH, PUCCH, or SRS transmission power. In various embodiments, operation 1240 can be performed based on the UE 116 determining the DCI format is not of a first priority type or based on the UE 116 determining the DCI format is of a second priority type. In some embodiments, the second DCI format does not include a TPC command field.

Various embodiments of the present disclosure enable power ramping for configured transmission from a UE, such as a PUCCH transmission with a SR or a CG-PUSCH transmission. For SR transmissions associated with MBB services, a UE, such as the UE 116, has regular transmission to or receptions from a gNB, such as the gNB 102, during a communication session to exchange large files. In contrast, for URLLC services, an SR transmission can occur without any prior reception from or transmission to the gNB 102 for a time period that is long enough for the UE 116 power control settings to be outdated. Similar, a CG-PUSCH transmission can occur without any prior reception from or transmission to the gNB 102 for a time period that is long enough for the UE 116 power control settings to be outdated.

When the UE 116 transmits a PUCCH that provides an SR associated with a service where the UE 116 has regular transmissions to or receptions from the gNB 102 and the UE 116 does not detect a DCI format scheduling a PUSCH transmission after the PUCCH transmission with the SR, the UE 116 retransmits the PUCCH that provides the SR at a next SR transmission occasion without any UE-initiated power adjustment. However, when the UE 116 transmits a PUCCH with an SR for a PUSCH scheduling, a corresponding PUCCH transmission power setting can be outdated. The UE 116 may not detect a subsequent DCI format scheduling the PUSCH transmission because the gNB 102 did not detect the SR due to inadequate reception power for the PUCCH. Therefore, various embodiments of the present disclosure recognize the benefits of the UE 116 applying power ramping for a next PUCCH transmission with an SR.

A power ramping step for the PUCCH transmission with an SR can be provided to the UE 116 using, for example, UT-specific higher layer signaling separately from a power ramping step for a PRACH transmission using system information higher layer signaling. The UE 116 can apply the power ramping at the next SR transmission occasion, for example when the UE 116 retransmits the SR, or after a number of SR transmissions occasions that the UE 116 is provided by the gNB 102 through higher layer signaling. In some embodiments, if the SR is multiplexed with other UCI in a PUCCH, the UE 116 can also apply the power ramping step for the PUCCH transmission. In other embodiments, the UE 116 can drop the other UCI and transmit a PUCCH that included only the positive SR.

In some embodiments, power ramping for retransmissions can also apply to a CB-PUSCH transmission when the UE 116 does not detect signaling from the gNB 102 that provides HARQ-ACK information in response to a TB reception associated with a HARQ process in the CB-PUSCH. The HARQ-ACK information can be provided either through explicit signaling or through implicit signaling, for example, when the UE 116 detects a DCI format scheduling a retransmission for the same TB (for the HARQ process) or when the UE 116 detects a DCI format scheduling a transmission of a new TB for the HARQ process. The power ramping step for a CG-PUSCH transmission can be the step provided to the UE 116, for example, for a PUCCH transmission with an SR or for a PRACH transmission or can be separately provided to the UE 116. The UE 116 can apply the power ramping step at a next CG-PUSCH transmission occasion or, if provided, after a number of CG-PUSCH transmissions occasions indicated to the UE 116 by the gNB 102.

Figure 13:
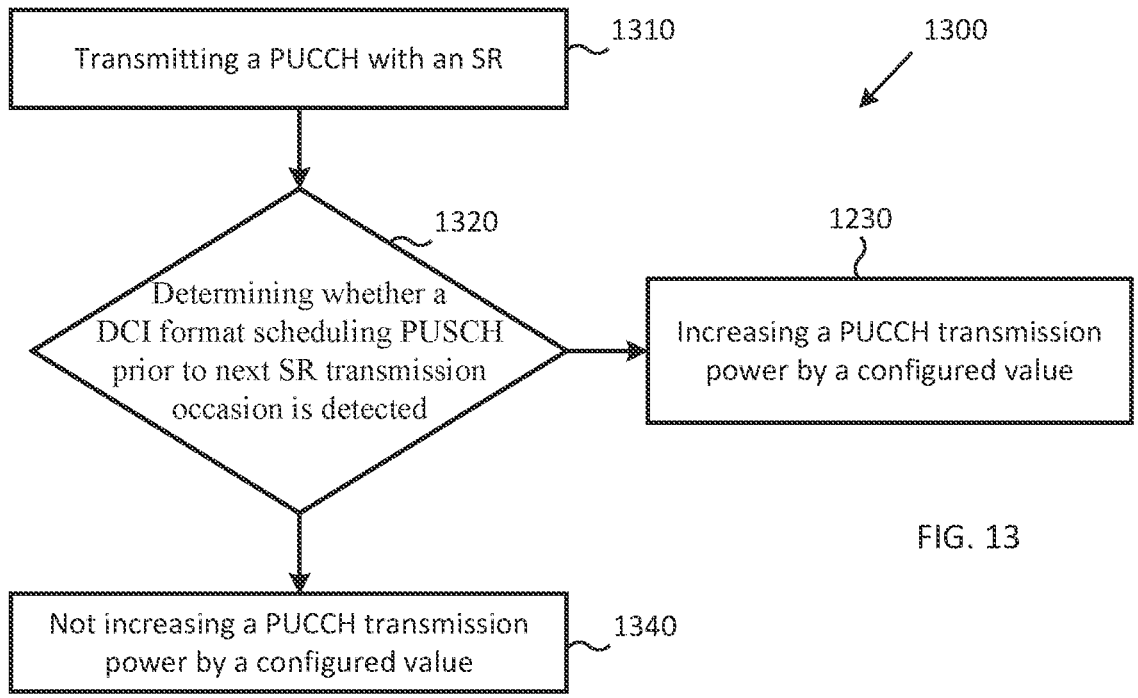
FIG. 13 illustrates a method for transmitting a scheduling request (SR) according to various embodiments of the present disclosure.

For example, FIG. 13 illustrates a method for transmitting an SR according to various embodiments of the present disclosure. Although described herein as being implemented by the UE 116, the method 1300 illustrated in FIG. 13 can be implemented in one or more of the UEs 111-116 and a corresponding method can be performed by one or more of the gNBs 101-103 described in FIG. 1. Other embodiments can be used without departing from the scope of the present disclosure.

In operation 1310, the transceiver 310 transmits a PUCCH with a positive SR. The UE 116 can determine a power for the PUCCH transmission by using a power control formula, such as Equation 4 or Equation 6.

In operation 1320, the UE 116 determines whether a DCI format scheduling a PUSCH transmission prior to a next SR transmission is detected. If the DCI format scheduling the PUSCH transmission is not detected, the UE 116 proceeds to operation 1330. If the DCI format scheduling the PUSCH transmission is detected, the UE 116 proceeds to operation 1340.

In operation 1330, based on the UE 116 not detecting the DCI format scheduling a PUSCH transmission prior to a next SR transmission occasion, the transceiver 310 retransmits the SR in the next SR transmission occasion by increasing a corresponding PUCCH transmission power by a value provided in advance by the gNB 102. For example, the value can be provided by the gNB 102 through a higher layer parameter powerRampingStep_SR.

In operation 1340, based on the UE 116 detecting the DCI format scheduling a PUSCH transmission prior to a next SR transmission occasion, the UE 116 does not increase a corresponding PUCCH transmission power by a value provided by the gNB 102. Accordingly, the transceiver 310 does not retransmit the SR by an increased transmission power.

In various embodiments, the UE 116 can maintain a same closed-loop power control component value for PUSCH and PUCCH transmissions on a same serving cell. For example, as described above in Equation 3 and Equation 4, $f_{b,f,c}(i, 1)$ can be same as $g_{b,f,c}(i, 1)$. Then, when the UE 116 detects a first DCI format that schedules a PDSCH reception and includes a TPC command field with a value that adjusts a power for a PUCCH transmission with HARQ-ACK information in response to a TB in the PDSCH, the UE 116 also applies the TPC command value for a PUSCH transmission. The PUSCH transmission can be configured by an RRC, such as a CG-PUSCH, or scheduled by a second DCI format. When the PUSCH transmission is configured/scheduled by a second DCI format, the second DCI format can include a TPC command field with a value that adjusts a power for the PUSCH transmission. The UE 116 applies both the value of the TPC command in the first DCI format and the value of the TPC command in the second DCI format for adjusting a power of the PUSCH transmission that is scheduled by the second DCI format. The UE 116 can also be configured with a RNTI for a DCI format that provides TPC commands and does not schedule a PDSCH reception or a PUSCH transmission from the UE 116 and the UE 116 can apply the TPC commands for determining a power of both a PUSCH transmission and a PUCCH transmission. In some embodiments, the UE 116 can also apply the TPC commands for determining a power of an SRS transmission.

Figure 14:
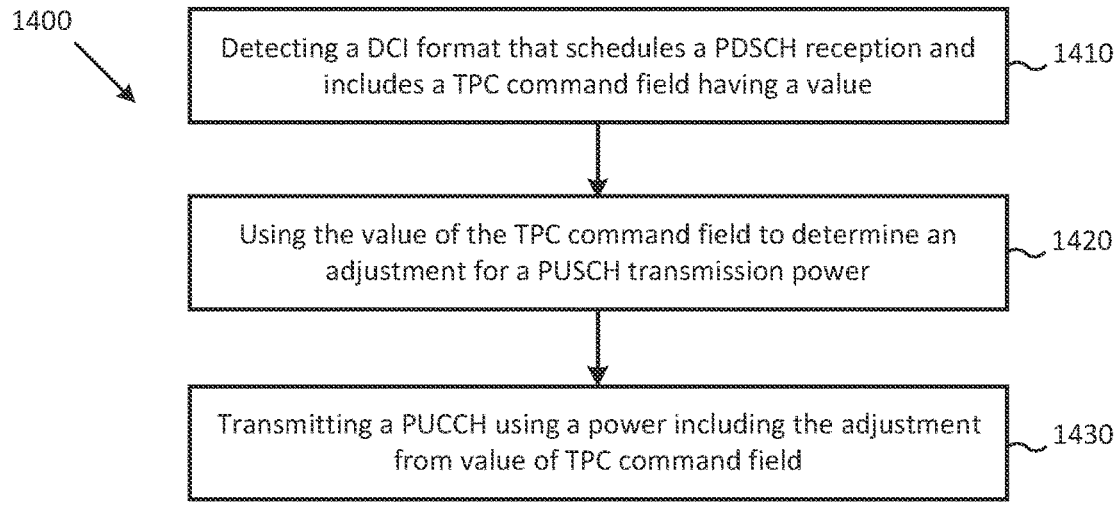
FIG. 14 illustrates a method of adjusting a power of a PUSCH transmission according to various embodiments of the present disclosure.

FIG. 14 illustrates a method of adjusting a power of a PUSCH transmission according to various embodiments of the present disclosure. More particularly, FIG. 14 illustrates a method 1400 of applying a TPC command value if a DCI format scheduling a PDSCH reception to adjust a power of a PUSCH transmission according to various embodiments of the present disclosure. Although described herein as being implemented by the UE 116, the method 1400 illustrated in FIG. 14 can be implemented in one or more of the UEs 111-116 and a corresponding method can be performed by one or more of the gNBs 101-103 described in FIG. 1. Other embodiments can be used without departing from the scope of the present disclosure.

In operation 1410, the UE 116 detects a DCI format that schedules a PDSCH reception and includes a TPC command field having a value. In operation 1420, the UE 116 determines an adjustment for a PUSCH transmission power using the value of the TPC command field detected in operation 1410. In operation 1430, the transceiver 310 transmits a PUCCH using the adjusted power determined in operation 1420.

In some embodiments, the UE 116 can be configured with multiple resources for a PUCCH transmission that provides a SR. Each resource can be associated with a different power for the PUCCH transmission providing the SR. The power for each resource can be determined as an offset relative to a value of an open loop power control component that the UE 116 uses to determine a PUCCH transmission power and the offset can be included in the resource configuration for the PUCCH transmission. The UE 116 can select a resource from the multiple resources according to a power that the UE 116 determines for a PUCCH transmission that includes the SR. For example, the UE 116 can select a resource that is associated with a power of a PUCCH transmission with the SR that has the smallest difference from a power that the UE 116 determines for the transmission of the PUCCH with the SR. For example, the UE 116 can select a resource that is associated with a power of a PUCCH transmission that is the next larger power than the power the IE 116 determines for the PUCCH transmission with the SR.

The UE 116 can further provide additional information in a PUCCH transmission with a SR. For example, the UE 116 can indicate whether a power for a PUSCH transmission that the UE 116 expects to be scheduled in response to the SR transmission needs to be larger or smaller than a power determined according to the values of the open loop power control parameters for the PUSCH transmission. When the UE 116 transmits one additional bit together with the SR in a PUCCH, the UE 116 can indicate whether the power of the PUSCH transmission needs to be larger or smaller than the power determined according to the values of the open loop power control parameters for the PUSCH transmission.

The amount of increase or decrease in the PUSCH transmission power, relative to the power determined according to the values of the open loop power control parameters for the PUSCH transmission, can be provided to the UE 116 by a serving gNB 102 through higher layer signaling. For example, the UE 116 can indicate an increase in power if the power determined according to the values of the open loop power control parameters for the PUSCH transmission is smaller than a power that the UE 116 determines for the PUSCH transmission by at least half of the indicated increase (the exact amount can also be configured to the UE 116 by the gNB 102). When the UE 116 transmits more than one additional bit together with the SR in a PUCCH, the UE 116 can indicate one of multiple values, provided to the UE 116 by a serving gNB 102 through higher layer signaling, for an increase or decrease in a PUSCH transmission power relative to a power determined according to the values of the open loop power control parameters for the PUSCH transmission.

Various embodiments of the present disclosure enable a UE to use TPC command values to adjust a transmission power in response to intra-cell interference. For example, a PUSCH transmission from a first UE, such as the UE 116, on a serving cell can be subjected to interference from a transmission from a second UE, such as the UE 115, on the serving cell. A gNB, such as the gNB 102, scheduling the PUSCH transmission from the first UE 116 is aware of the interference from the second UE 115 and can accordingly adjust a power of the PUSCH transmission using a value of a TPC command field in a DCI format scheduling the PUSCH transmission.

A PUSCH transmission from a UE on a serving cell and an SRS transmission from the UE on the serving cell can use a same closed loop power control component to enable a serving gNB to use SRS transmissions from the UE to perform link adaptation for PUSCH transmissions from the UE. When a TPC command in a DCI format scheduling a PUSCH transmission is also used to account for inter-UE interference on a serving cell, in addition to accounting for channel fading variations, the TPC command can be inaccurate for an SRS transmission that is not typically subjected to inter-UE interference or may experience different inter-UE interference than a PUSCH transmission from the UE. Accordingly, various embodiments of the present disclosure enable a transmission power adjustment to avoid the intra-cell interference.

To enable the power adjustment for a PUSCH transmission that accounts for inter-UE interference while allowing a same closed loop power control component to be used for determining a power of a PUSCH transmission and an SRS transmission, the present disclosure recognizes that, for a DCI format scheduling a PUSCH transmission, a TPC command field for adjusting a power of the PUSCH transmission according to a level of inter-UE interference is separate from a TPC command field for adjusting a power of the PUSCH transmission according to channel fading variations. Equivalently, a same TPC command field can be used and first bits of the TPC command field apply for indicating a first adjustment for a PUSCH transmission power without the first adjustment being incorporated in the closed loop power control component and second bits of the TPC command field apply for indicating a second adjustment for the PUSCH transmission power with the second adjustment being incorporated in the closed loop power control component.

Figure 15:
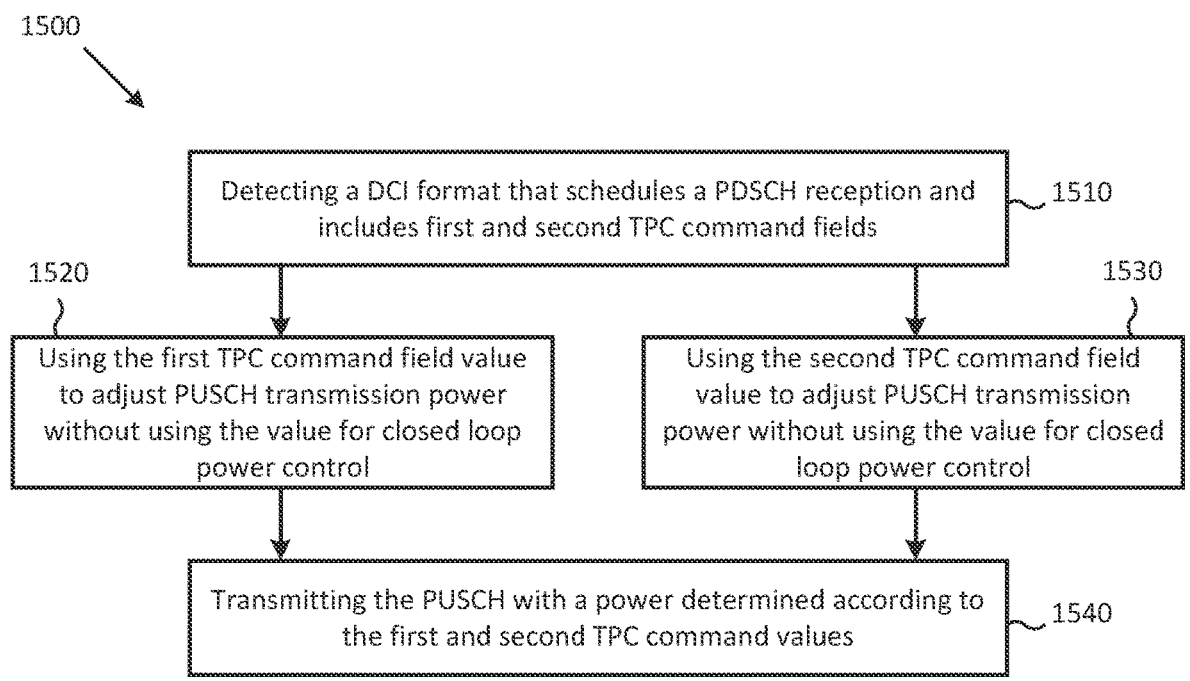
FIG. 15 illustrates a method of adjusting a power of a PUSCH transmission according to various embodiments of the present disclosure.

For example, FIG. 15 illustrates a method of adjusting a power of a PUSCH transmission according to various embodiments of the present disclosure. More particularly, FIG. 15 illustrates a method 1500 of using two TPC command fields in a DCI format scheduling a PUSCH transmission for adjusting a power of the PUSCH transmission according to various embodiments of the present disclosure. Although described herein as being implemented by the UE 116, the method illustrated in FIG. 15 can be implemented in one or more of the UEs 111-116 and a corresponding method can be performed by one or more of the gNBs 101-103 described in FIG. 1. Other embodiments can be used without departing from the scope of the present disclosure.

In operation 1510, the UE 116 detects a DCI format that schedules a PUSCH transmission. The DCI format includes a first TPC command field and a second TPC command field.

In operation 1520, the UE 116 adjusts a PUSCH transmission power using the value of the first TPC command field. Further, the UE 116 does not use the value of the first TPC command field to update a closed loop power control component that accumulates values of TPC commands. In operation 1530, the UE 116 adjusts a PUSCH transmission power using the value of the second TPC command field. Further, the UE 116 does not use the value of the second TPC command field to update a closed loop power control component that accumulates values of TPC commands. In some embodiments, the UE 116 can perform operations 1520 and 1530 in sequence. In other embodiments, the UE 116 can perform operations 1520 and 1530 simultaneously.

In operation 1540, based on the adjusted PUSCH transmission power using the first TPC command field value and the second TPC command field value, the transceiver 310 transmits the PUSCH with the determined, adjusted transmission power.

Various embodiments of the present disclosure enable the determination of a power of a PUCCH transmission that includes multiple UCI types. For example, a gNB, such as the gNB 102, can provide a UE, such as the UE 116, with a power offset for a PUCCH transmission according to a UCI type that is included in the PUCCH transmission. For example, the gNB 102 can target a first BLER, such as 1%, for a PUCCH transmission that includes HARQ-ACK information or SR and target a second BLER, such as 5%, for a PUCCH transmission that includes CSI. For example, a PUCCH transmission with CSI can include a first predetermined number of information bits and, therefore, be associated with a first coding gain while an SR transmission can include a second predetermined number of information bits, such as 1 bit, and, therefore, be associated with a second coding gain. Then, even when a target BLER is same for the CSI and the SR, a different transmission power is required to account for the different coding gain.

The UE 116 can multiplex different UCI types having different settings for a PUCCH transmission power. The UE 116 can further use the setting that results in the largest PUCCH transmission power in order to achieve the BLER for the UCI type requiring the lowest BLER. For example, the UE 116 can multiplex HARQ-ACK information and CSI in a PUCCH transmission where the PUCCH transmission requires a first power to achieve a first target BLER when it includes only HARQ-ACK information and the PUCCH transmission requires a second power to achieve a second target BLER when it includes only CSI. When the first power is larger than the second power, the UE 116 can transmit the PUCCH using the power control settings, such as the open loop power control parameters and any UCI-specific power offset, for the first power.

Figure 16:
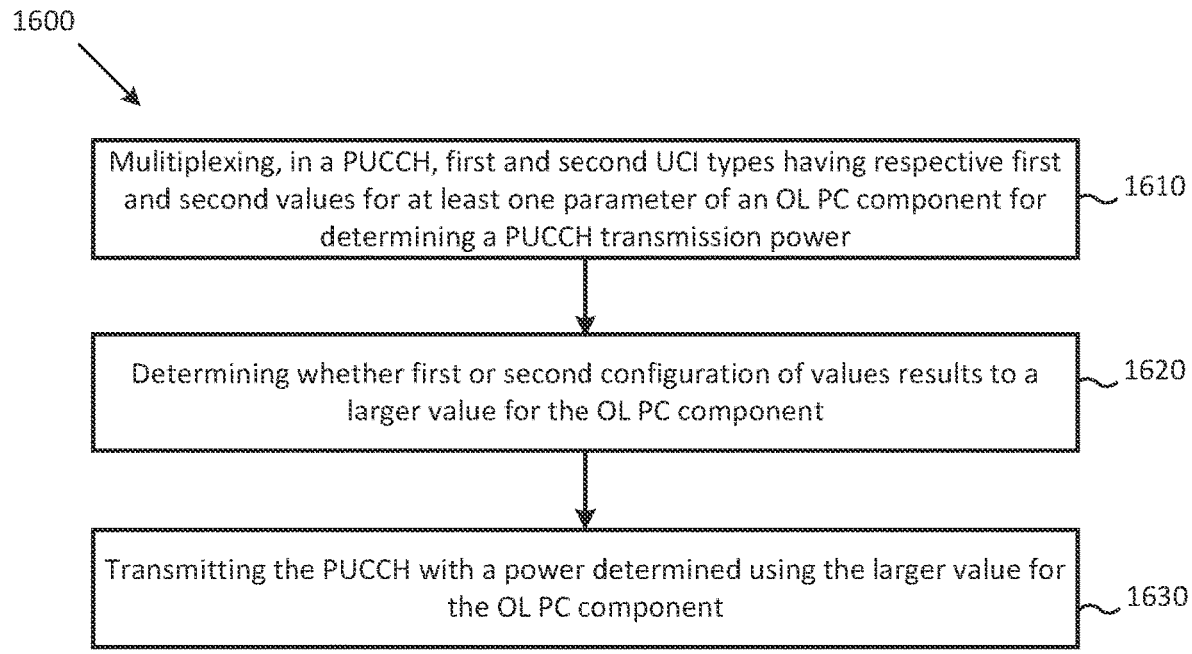
FIG. 16 illustrates a method of adjusting a power of a PUCCH transmission according to various embodiments of the present disclosure.

For example, FIG. 16 illustrates a method of adjusting a power of a PUCCH transmission according to various embodiments of the present disclosure. More particularly, FIG. 16 illustrates a method 1600 of applying a TPC command value if a DCI format scheduling a PDCCH reception to adjust a power of a PUCCH transmission according to various embodiments of the present disclosure. Although described herein as being implemented by the UE 116, the method illustrated in FIG. 16 can be implemented in one or more of the UEs 111-116 and a corresponding method can be performed by one or more of the gNBs 101-103 described in FIG. 1. Other embodiments can be used without departing from the scope of the present disclosure.

In operation 1610, the UE 116 multiplexes, in a PUCCH, a first UCI type and a second UCI type. The first UCI type includes a first configuration of values for at least one parameter of an open loop power control (OL PC) component for determining a PUCCH transmission power. The second UCI type includes a second configuration of values for the at least one parameter.

In operation 1620, the UE 116 determines whether the first configuration of values or the second configuration of values results in a larger value for the OL PC component. In operation 1630, the transceiver 310 transmits the PUCCH with a power that is determined by using the larger value for the OL. PC component that is determined in operation 1620.

As described herein, a UE can transmit a scheduling request (SR) to indicate to a serving gNB that the UE has data in its buffer for transmission to the gNB. The UE transmits the SR with parameters the UE is provided by the gNB, such as a PUCCH resource configuration or a time periodicity for PUCCH transmissions providing a SR. In some embodiments, the parameters can be unique for each UE. Upon detecting an SR, the gNB can identify which UE has transmitted the SR and subsequently schedule the UE for a PUSCH transmission where the UE can provide more information for the buffer status of the UE through a buffer status report (BSR).

Various embodiments of the present disclosure recognize that for unpaired spectrum operation, such as in frequency bands designated for time domain duplexing (TDD), some, including none or all, symbols of a slot can be used for receptions by a UE, some symbols of the slot can be used for transmissions by the UE, and some symbols can have flexible directions and can be used either for receptions by the UE or for transmissions by the UE depending on a corresponding configuration by higher layers or depending on a corresponding scheduling in a DCI format provided by a PDCCH. For example, the UE can be provided by a higher layer parameter tdd-UL-DL-ConfigurationCommon a slot format per slot over a number of slots as indicated by tdd-UL-DL-ConfigurationCommon. The UE can also be provided higher layer parameter tdd-UL-DL-ConfigDedicated that overrides only flexible symbols per slot over the number of slots as provided by tdd-UL-DL-Configuration-Common.

In some embodiments, a UE can also be configured to monitor a DCI format, such as DCI format 2_0, to obtain a slot format indicator (SFI) and determine whether a flexible symbol in a slot is a DL symbol or an UL symbol. For a flexible symbol of a slot that is indicated by the SFI as a DL one, the UE cancels a periodic SRS transmission only on the flexible symbol or cancels a PUSCH/PUCCH/PRACH transmission in symbols that include the symbol, that is, the UE completely cancels the PUSCH/PUCCH/PRACH transmission subject to a corresponding processing timeline. For example, for a flexible symbol of a slot that is indicated by the SFI as an UL symbol, the UE can cancel a periodic CSI-RS reception or a PDSCH/PDCCH reception in symbols that include the symbol.

As described herein, URLLC services can be sporadic and use a lower latency than MBB services. Data reception can be accompanied by a subsequent transmission of HARQ-ACK information in a PUCCH from the UE to indicate whether or not the UE correctly detected an associated TB. Data transmission can be enabled by an SR transmission from the UE and a subsequent detection of an UL DCI format (UL grant) scheduling an associated PUSCH transmission from the UE (grant-based PUSCH or GB-PUSCH) or can enabled by a configured grant (CG-PUSCH) where the UE can transmit a PUSCH using one from a set of one or more resource configurations that were previously provided to the UE by the gNB. A TB or a UCI can be immediately transmitted once available at the physical layer.

Various embodiments of the present disclosure recognize the challenges for URLLC of operations in unpaired spectrums. Not all symbols of a slot, or even one or more of next slots, can be available for a PDCCH/PDSCH reception or for a PUCCH/PUSCH transmission. For example, when a gNB needs to schedule a PDSCH transmission with URLLC data to a UE in a slot, an additional delay occurs when the first symbols of the slot where the PDSCH transmission can happen are indicated as UL symbols by tdd-UL-DL-ConfigurationCommon. Similar, when the gNB schedules a PUSCH transmission with URLLC data from the UE in a slot, an additional delay for the PUSCH transmission occurs when the first symbols of the slot where the PUSCH transmission can occur are indicated as DL symbols by tdd-UL-DL-ConfigurationCommon.

A timing indication for a PUCCH transmission with HARQ-ACK information from the UE in response to a TB reception by the UE can be provided by a value of a PDSCH-to-HARQ_feedback timing-indicator field in a DCI format scheduling the PDSCH reception. For services with low latency requirements, such as for a URLLC, a granularity of the value is provided in a number of symbols of a slot instead of a slot. For operation in unpaired spectrum, the timing indication can have a reduced range, as not all symbols in a number of symbols of a slot are indicated as flexible symbols or UL symbols by tdd-UL-DL-ConfigurationCommon, unless a size of the PDSCH-to-HARQ_feedback timing-indicator field is increased.

When a gNB adapts, on a cell, a direction of a flexible symbol to a DL symbol or to an UL symbol, using, for example, a corresponding SFI field in a DCI format 2_0, a UE with a transmission or reception that is configured by higher layer signaling monitors PDCCH candidates associated with DCI format 2_0. The UE monitors the PDCCH candidates to detect a DCI format 2_0 and obtain a slot format, including DL symbols, UL symbols, and flexible/reserved symbols of a slot, based on a value of the SFI field in DCI format 2_0. For a transmission from or a reception by the UE that is configured by higher layers on a serving cell, the UE can cancel the transmission or the reception when a value of the SFI field for the serving cell in a DCI format 2_0 indicates at least one respective symbol to be a DL symbol or an UL symbol, respectively, or a flexible/reserved symbol (a symbol indicated as flexible by tdd-UL-DL-ConfigurationCommon is considered as unavailable/reserved if it is also indicated as flexible by a value of a SFI field). For an SRS transmission, the UE can cancel the SRS transmission only in symbols that are indicated as DL or flexible by the SFI field in DCI format 2_0 for the serving cell. However, for a CG-PUSCH transmission with low latency requirements, a cancelation can result in a failure in meeting the latency requirements.

For a PUSCH transmission scheduled by a DCI format (GB-PUSCH transmission), a time domain resource allocation (TDRA) field value in the DCI format is not expected to include symbols indicated as DL symbols by tdd-UL-DL-ConfigurationCommon. However, for a GB-PUSCH transmission with low latency requirements, it is possible that first available UL symbols for the GB-PUSCH can be after several DL symbols and the low latency requirement for the GB-PUSCH transmission may not be met.

For a GB-PUSCH transmission with low latency requirements, all frequency resources in a BWP of the GB-PUSCH transmission can used by ongoing transmissions from other UEs, such as from UEs with PUSCH transmissions associated with MBB service types, or for other UL transmissions such as SRS, PUCCH, or PRACH. Similar, for a PDSCH reception with low latency requirements, all immediately available symbols of a slot can be used by ongoing UL transmissions. To cancel ongoing UL transmissions, a serving gNB can transmit a DCI format, such as a UE-group common DCI format in a PDCCH with a location determined according to a CSS, that is for brevity referred to as DCI format 2_4, that includes an UL cancelation indicator field that provides information for time (symbols) and frequency (RBs) resources where UEs need to cancel respective ongoing transmissions. However, as DCI format 2_4 is intended to support PDSCH receptions or PUSCH transmissions with low latency requirements, a gNB may need to transmit a PDCCH with DCI format 2_4 with a periodicity that is smaller than one slot. Accordingly, a UE can consume power for DL receptions in every slot where the UE has an UL transmission.

Accordingly, various embodiments of the present disclosure acknowledge the need for an indication of a timing for a PUCCH transmission with HARQ-ACK information from a UE for operation in an unpaired spectrum without increasing a size of a PDSCH-to-HARQ_feedback timing-indicator field in a DCI format scheduling a corresponding PDSCH reception by the UE. Various embodiments of the present disclosure further acknowledge the need for a UE to transmit a CG-PUSCH in a slot when some symbols of the slot are indicated by a SFI field value in a DCI format 2_0 to be DL symbols or flexible symbols, and to enhance a probability that the UE can transmit a CG-PUSCH in a slot for unpaired spectrum operation.

Further, various embodiments of the present disclosure acknowledge the need for a gNB to schedule a GB-PUSCH transmission from a UE in a slot while meeting latency requirements for the GB-PUSCH transmission when some symbols of the slot are configured by higher layers as DL symbols, and to enable a gNB to configure a UE to monitor PDCCH for DCI format 24 depending on the type of communication that the UE has with the gNB.

As described herein, a DCI format scheduling a PDSCH reception or a SPS PDSCH release by a UE can be referred to as DL DCI format. A DCI format scheduling a PUSCH transmission from a UE can be referred to as UL DCI format. A DL DCI format can schedule a PDSCH reception or indicate a SPS PDSCH release. While the present disclosure describes a PDSCH reception, the embodiments can also apply to a SPS PDSCH release.

Similar, as described herein, higher layer parameter tdd-UL-DL-ConfigurationCommon is referred to below but higher layer parameter tdd-UL-DL-ConfigurationDedicated can also apply. A first DCI format scheduling a first PDSCH reception or a first PUSCH transmission associated with a TB requiring low latency (first priority) can be differentiated from a second DCI format scheduling a second PDSCH reception or a second PUSCH transmission associated with a TB with relaxed latency (second priority) using, for example, a flag, a different RNTI, or a different size.

In some embodiments, values for a priority field in a DCI format scheduling a PDSCH reception can be mapped to a HARQ_feedback timing-indicator field in the DCI format scheduling the PDSCH reception that indicates a transmission time for a PUCCH that includes HARQ-ACK information in response to the PDSCH reception. For a PDSCH reception that is associated with a service type that has a low latency requirement, a UE, such as the UE 116, needs to provide corresponding HARQ-ACK information to a serving gNB, such as the gNB 102, that also has a low latency in order to enable the gNB 102 to retransmit the PDSCH when needed. In some embodiments, this is referred to as negative acknowledgement. A time granularity for a PDSCH-to-HARQ_feedback timing indicator field in a DCI format scheduling a PDSCH reception can therefore be provided in a unit of a number of symbols rather than a unit of a slot such as when a PDSCH reception associated with a service having relaxed latency requirements. For example, when the PDSCH reception is associated with a service having relaxed latency requirements, the number of symbols can be provided to the UE 116 by the gNB 102 through higher layer signaling. As described below, the number of symbols is denoted as N where N≥1.

For a PDSCH-to-HARQ_feedback timing indicator field that includes, for example, 3 bits, a total of 8 successive periods of N symbols can be indicated for a PUCCH transmission within a period of N symbols. For operation in unpaired spectrum, a slot format, or slot structure, can include DL symbols, UL symbols, and flexible (F) symbols. Therefore, several of the 8 successive periods of N symbols can include only DL symbols or include a mixture of DL, UL, and flexible symbols. Moreover, when N is small, such as 2 or 4, a reception reliability of HARQ-ACK information in a PUCCH can be materially degraded when even 1 symbol is not available, for example due to the 1 symbol being indicated as DL symbol in a corresponding slot by tdd-UL-DL-ConfigurationCommon. A PDSCH-to-HARQ feedback timing indicator field is assumed to include M bits in a DCI format and indicate one of $2^M$ periods of N symbols, starting either from a period of N symbols that overlaps with a last symbol of an associated PDSCH reception or from the period of N symbols that follows a period of N symbols that overlaps with a last symbol of an associated PDSCH reception. According, various embodiments of the present disclosure are directed to improving a reception reliability for HARQ-ACK information or increasing an applicability for values of a PDSCH-to-HARQ feedback timing indicator field.

For example, when a PUCCH resource indicator field in the DCI format scheduling the PDSCH reception indicates a PUCCH resource in a slot that includes symbols indicated as DL symbols by tdd-UL-DL-ConfigurationCommon, the UE 116 can assume that the PUCCH resource indicator field overrides the indication by tdd-UL-DL-ConfigurationCommon. Then, the UE 116 transmits the PUCCH in the indicated resource. The gNB 102 can suspend transmission at least in the DL symbols that are included in the indicated PUCCH resource. An exception can be DL symbols where the UE 116 is also indicated transmission of SS/PBCH blocks. In DL symbols where the UE 116 is indicated transmission of SS/PBCH blocks, the UE 116 can assume that the indicated PUCCH resource is invalid and drops the PUCCH transmission. For example, a UE can assume that a PUCCH resource indicator field does not indicate a number of contiguous symbols but instead indicates only UL symbols, or only UL and flexible symbols, as provided by tdd-UL-DL-ConfigurationCommon.

In some embodiments, a PUCCH transmission from the UE 116 can be transmitted either in response to a configuration by higher layers or in response to a PDSCH reception scheduled by another DCI format, such as a DCI format associated with a service that has relaxed latency requirements. In these embodiments, the UE 116 can drop the PUCCH transmission when a number of corresponding symbols, in a period of N symbols, includes DL symbols or includes symbols that are indicated as flexible by a SFI field in a DCI format 2_0.

Figure 17:
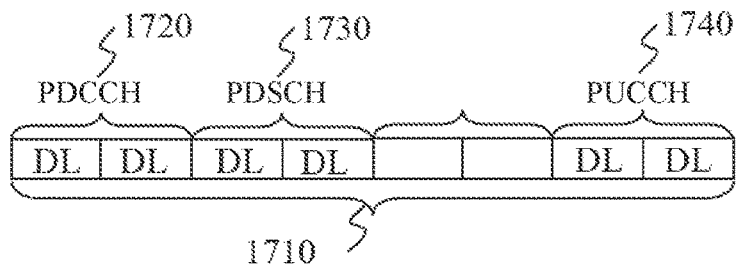
FIG. 17 illustrates a procedure of transmitting a PUCCH according to various embodiments of the present disclosure.

For example, FIG. 17 illustrates a procedure of transmitting a PUCCH according to various embodiments of the present disclosure. Although described herein as being implemented by the UE 116, the procedure illustrated in FIG. 17 can be implemented in one or more of the UEs 111-116 and a corresponding procedure can be performed by one or more of the gNBs 101-103 described in FIG. 1. Other embodiments can be used without departing from the scope of the present disclosure.

A UE, such as the UE 116, can be provided with a format for a number of slots and obtains a direction (DL, UL, F) for a number of symbols 1710. In some embodiments, the UE 116 can be provided with the format by a higher layer parameter such as tdd-UL-DL-ConfigurationCommon received from a gNB, such as the gNB 102. The format can be stored in the memory 360. The UE 116 can receive a PDCCH 1720 and detects a DCI format scheduling a PDSCH reception 1730. For example, the UE 116 can receive the PDCCH 1720 from a gNB, such as the gNB 102. The DCI format can include a PDSCH-to-HARQ_feedback timing indicator field indicating, to the UE 116, to transmit a PUCCH 1740 with HARQ-ACK information for a TB in the PDSCH reception.

The UE 116 can transmit the PUCCH, although the symbols of the PUCCH transmission are indicated as DL ones by tdd-UL-DL-ConfigurationCommon. In some embodiments, the gNB 102 does not transmit in the symbols of the PUCCH transmission from the UE 116 and also does not transmit in at least one previous symbol in order to provide a gap for DL-to-UL switching and combat cross-link interference due to multipath propagation of signals.

In another embodiment, a PUCCH resource indicator field in the DCI format can indicate a PUCCH resource that includes symbols indicated as DL symbols or as flexible (F) symbols by tdd-UL-DL-ConfigurationCommon. In this embodiment, the UE 116 can assume the PUCCH resource includes the same parameters as the indicated PUCCH resource, except that a number of corresponding symbols is reduced to avoid symbols that are indicated as DL ones by tdd-UL-DL-ConfigurationCommon. The number of symbols can be additionally reduced in order to provide a switching gap by a number that can be provided to the UE 116, such as by the serving gNB 102 through higher layer signaling.

In some embodiments, for the UE 116 to determine a reduced number of symbols for a PUCCH transmission, the UE 116 first determines that the symbols are consecutive. In some embodiments, for the UE 116 to determine a reduced number of symbols for a PUCCH transmission, the UE 116 is also configured with another PUCCH resource that includes a same number of symbols. The same conditions can apply for a PUCCH transmission from the UE 116 that responds to a configuration by higher layers.

In some embodiments, the UE 116 can determine a number of consecutive UL symbols for a PUCCH transmission in a period of N symbols based on the higher layer parameter tdd-UL-DL-ConfigurationCommon without relying on a slot format indicated by a SFI field in DCI format 2_0. This embodiment lowers the likelihood of errors that can result from the UE 116 failing to detect DCI format 2_0 and then transmitting PUCCH in different symbols than expected by the serving gNB 102. This embodiment can also lower the likelihood of causality issues, for example when a DCI format associated with the PUCCH transmission, such as when the PUCCH transmission includes HARQ-ACK information, is received by the UE 116 prior to a DCI format 2_0 indicating a slot format, by indicating as DL, F, or UL some of the symbols configured as F by tdd-UL-DL-ConfigurationCommon.

Figure 18:
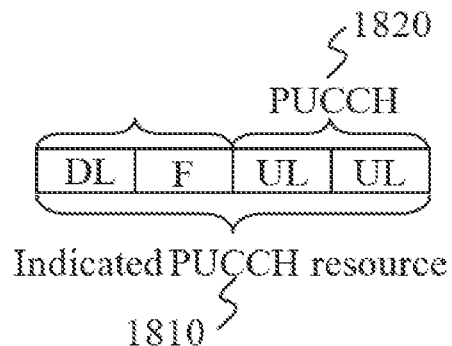
FIG. 18 illustrates a procedure for a UE to transmit a PUCCH according to various embodiments of the present disclosure.

For example, FIG. 18 illustrates a procedure for a UE to transmit a PUCCH according to various embodiments of the present disclosure. Although described herein as being implemented by the UE 116, the procedure illustrated in FIG. 18 can be implemented in one or more of the UEs 111-116 and a corresponding procedure can be performed by one or more of the gNBs 101-103 described in FIG. 1. Other embodiments can be used without departing from the scope of the present disclosure.

A UE, such as the UE 116, is provided a classification for four symbols as DL, F, and UL 1810. The UE 116 can be provided the classification by a higher layer parameter tdd-UL-DL-ConfigurationCommon received from a gNB, such as the gNB 102. The classification can be stored in the memory 360. The UE 116 detects a DCI format that schedules a PDSCH reception and includes a PDSCH-to-HARQ_feedback timing indicator field. The timing indicator field has a value that indicates to the UE 116 to transmit a PUCCH in a period of symbols that includes the four symbols and also includes a PUCCH resource indicator field that indicates to the UE 116 a PUCCH resource that includes the four symbols. The UE 116 reduces a number of symbols for the PUCCH transmission to the last two UL symbols 1820.

In another embodiment, periods of N symbols that can be indicated by a value of the PDSCH-to-HARQ feedback timing indicator field exclude ones that do not have a valid PUCCH resource. For example, based on a slot format for a number of slots indicated by tdd-UL-DL-Configuration-Common and on a set of PUCCH resources provided to the UE 116 by the serving gNB 102 through higher layer signaling, the UE 116 can exclude slots that do not include a number of consecutive UL or flexible symbols that is at least equal to a smallest number of symbols for a PUCCH resource in the set of PUCCH resources. For example, when a smallest number of symbols for a PUCCH resource in the set of PUCCH resources is 2, the UE 116 can exclude periods of N symbols that include only DL symbols or do not include at least 2 consecutive UL or at least 2 consecutive flexible and UL symbols. The UE 116 can assume that such slots are not included for possible indication by a value of the PDSCH-to-HARQ feedback timing indicator field.

For example, a starting period of N symbols, that can be indicated by a value of the PDSCH-to-HARQ feedback timing indicator field, can have an index of zero. The PDSCH-to-HARQ feedback timing indicator field can indicate one of 8 periods of N symbols and a period of N symbols with index 2 does not include a number of consecutive UL or flexible symbols that is at least equal to a smallest number of symbols for a PUCCH resource in the set of PUCCH resources. Accordingly, the UE 116 can assume that the 8 values of the PDSCH-to-HARQ feedback timing indicator field indicate periods of N symbols with indexes 0, 1, 3, 4, 5, 6, 7, 8, and 9, because the period of N symbols with index 2 is excluded.

Figure 19:
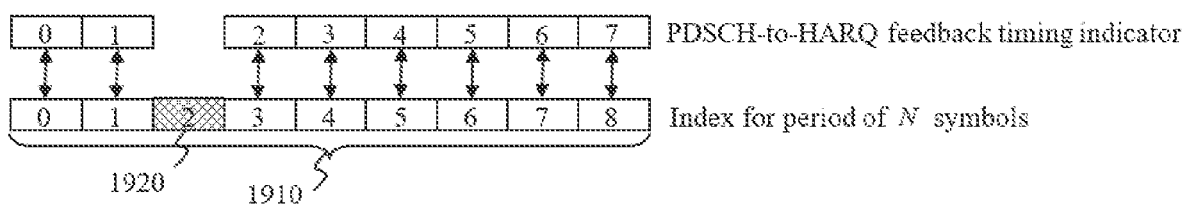
FIG. 19 illustrates a procedure for a UE to transmit a PUCCH according to various embodiments of the present disclosure.

For example, FIG. 19 illustrates a procedure for a UE to transmit a PUCCH according to various embodiments of the present disclosure. Although described herein as being implemented by the UE 116, the procedure illustrated in FIG. 19 can be implemented in one or more of the UEs 111-116 and a corresponding procedure can be performed by one or more of the gNBs 101-103 described in FIG. 1. Other embodiments can be used without departing from the scope of the present disclosure.

A UE, such as the UE 116, can obtain a format for 9 periods of N symbols 1910 indexed as 0, 1, 2, 3, 4, 5, 6, 7, 8 and a set of PUCCH resources. The UE 116 can obtain the format and set of PUCCH resources from a higher layer parameter tdd-UL-DL-ConfigurationCommon received from a gNB, such as the gNB 102. The format can be stored in the memory 360. The UE can determine that the period 1920 with index 2 includes a number of consecutive UL symbols, or a number of consecutive flexible and UL symbols, that is smaller than the smallest number of symbols of a PUCCH resource in the set of PUCCH resources. The UE 116 can consider the period 1920 with index 2 as being inapplicable for PUCCH transmissions. For a DCI format that schedules a PDSCH reception to the UE 116 and includes a PDSCH-to-HARQ feedback timing indicator field with a value indicating a period of N symbols for a PUCCH transmission with HARQ-ACK information in response to a reception of a TB in the PUSCH, the UE 116 can interpret the values of 0, 1, 2, 3, 4, 5, 6, 7 of the PDSCH-to-HARQ feedback timing indicator field to respectively correspond to periods with indexes 0, 1, 3, 4, 5, 6, 7, 8.

In some embodiments, the UE 116 can repeat a PUCCH transmission in one or more additional periods of N symbols when a PUCCH resource in a first period of N symbols is over a first number of symbols $K_1$ that is smaller than a second number of symbols $K_2$ where, for example, $K_2$ is provided to the UE 116 by the serving gNB 102 through higher layer signaling. The duration, or the number of symbols, for each repetition of the PUCCH transmission can be the same and equal to the first number of symbols $K_1$. The number of repetitions can be determined as $\text{ceil}(K_2/K_1)$ where ceil( ) is the ceiling function that rounds a number to its next larger integer.

In other embodiments, when a PUCCH resource in a period of symbols includes $K_1$ symbols, the UE 116 can repeat the PUCCH transmission in a same PUCCH resource in the next $\text{ceil}(K_2/K_1)$ periods of N symbols where the UE 116 can transmit a PUCCH over $K_1$ symbols. In some embodiments, a number of repetitions can be directly provided to the UE 116 by the gNB 102 through higher layer signaling.

Figure 20:
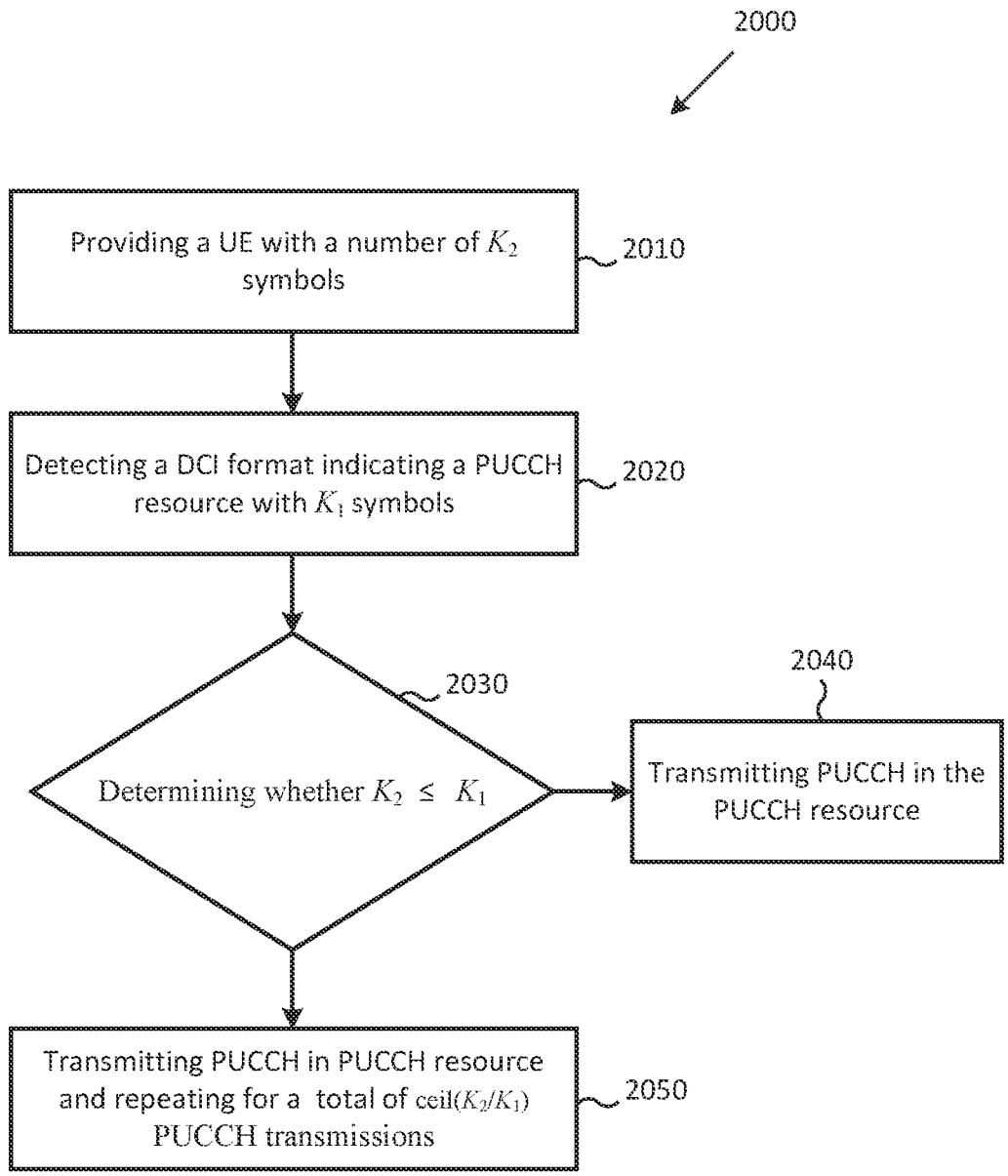
FIG. 20 illustrates a method of transmitting a PUCCH according to various embodiments of the present disclosure.

For example, FIG. 20 illustrates a method of transmitting a PUCCH according to various embodiments of the present disclosure. Although described herein as being implemented by the UE 116, the method 2000 illustrated in FIG. 20 can be implemented in one or more of the UEs 111-116 and a corresponding method can be performed by one or more of the gNBs 101-103 described in FIG. 1. Other embodiments can be used without departing from the scope of the present disclosure.

In operation 2010, a UE, such as the UE 116, is provided with a number of $K_2$ symbols. The UE 116 can receive the number of $K_2$ symbols from a gNB, such as the gNB 102, through higher layer signaling. The number of $K_2$ symbols can be stored in the memory 360.

In operation 2020, the UE 116 detects a DCI format that schedules a PDSCH reception. The DCI format includes a PUCCH resource indicator that provides a PUCCH resource with $K_1$ symbols for the UE 116 to transmit HARQ-ACK information is response to a TB reception in the PDSCH.

In operation 2030, the UE 116 determines whether $K_1$ is smaller than $K_2$. If $K_1$ is not smaller than $K_2$, the UE 116 proceeds to operation 2040. If $K_1$ is smaller than $K_2$, the UE 116 proceeds to operation 2050.

In operation 2040, in response to the UE 116 determining that $K_1$ is not smaller than $K_2$, the transceiver 310 transmits the PUCCH in the PUCCH resource detected in operation 2020.

In operation 2050, in response to the UE 116 determining that $K_1$ is smaller than $K_2$, the transceiver 310 transmits the PUCCH in the PUCCH resource detected in operation 2020 and repeats the PUCCH transmission for a total of $\text{ceil}(K_2/K_1)$ PUCCH transmissions. In some embodiments, the repetitions of the PUCCH transmission can be in periods of N symbols that include at least $K_1$ consecutive UL symbols. In some embodiments, in response to the UE 116 determining that $K_1$ is smaller than $K_2$, the UE 116 can increase the PUCCH transmission power by $10 \log 10(K_2/K_1)$ dB. In some embodiments, in response to the UE 116 determining that $K_1$ is smaller than $K_2$, the UE 116 can increase a number of RBs for the PUCCH transmission by $\text{ceil}(K_2/K_1)$.

In some embodiments, a number of repetitions for a PUCCH transmission with HARQ-ACK information can be provided to the UE 116 by a field in a DCI format scheduling a PDSCH reception associated with the PUCCH transmission. In these embodiments, instead of using higher layer signaling for the UE 116 to determine whether or not to repeat a PUCCH transmission, the UE 116 directly receives the DCI format associated with the PUCCH transmission.

Various embodiments of the present disclosure reduce an inability of a UE to transmit a CG-PUSCH. In some embodiments, for unpaired spectrum operation, a gNB may not be able to provide a number of UL symbols in each slot equal to the number of symbols for the CG-PUSCH transmission. In some embodiments, for both paired and unpaired spectrum operation, a serving gNB may support multiple traffic types where other UEs may be transmitting to a serving gNB in resources that a UE is configured for a CG-PUSCH transmission to the gNB.

For example, a gNB, such as the gNB 102, can provide to a UE, such as the UE 116, multiple resources in multiple cells for a CG-PUSCH transmission. A configuration for a CG-PUSCH transmission can be common to all cells or can be separately provided to the UE 116 by the gNB 102 for each cell. In embodiments where the cells are associated with different frequency bands, the gNB 102 can use different slot formats on different cells. For example, for a slot where a set of symbols includes only DL symbols on a first cell, the set of symbols on a second cell can include a number of UL symbols that is at least equal to the number of symbols for the CG-PUSCH transmission on a second cell. Accordingly, the UE 116 can select the second cell for the CG-PUSCH transmission. In embodiments where the UE 116 can have resources on more than one cell to transmit a CG-PUSCH, the UE 116 can select the cell with the smallest index.

In some embodiments, the gNB 102 can configure the LIE with multiple resources for a CG-PUSCH transmission on a cell. In particular, each configuration can be separate and specific to the particular cell. The UE 116 can determine the direction of each symbol in the set of symbols, including DL, F, and UL, on a cell based on higher layer parameter tdd-UL-DL-ConfigurationCommon for the cell, or additionally based on higher layer parameter tdd-UL-DL-ConfigurationDedicated, or based on the slot format indicated by a SFI field in DCI format 2_0 for the cell.

Figure 21:
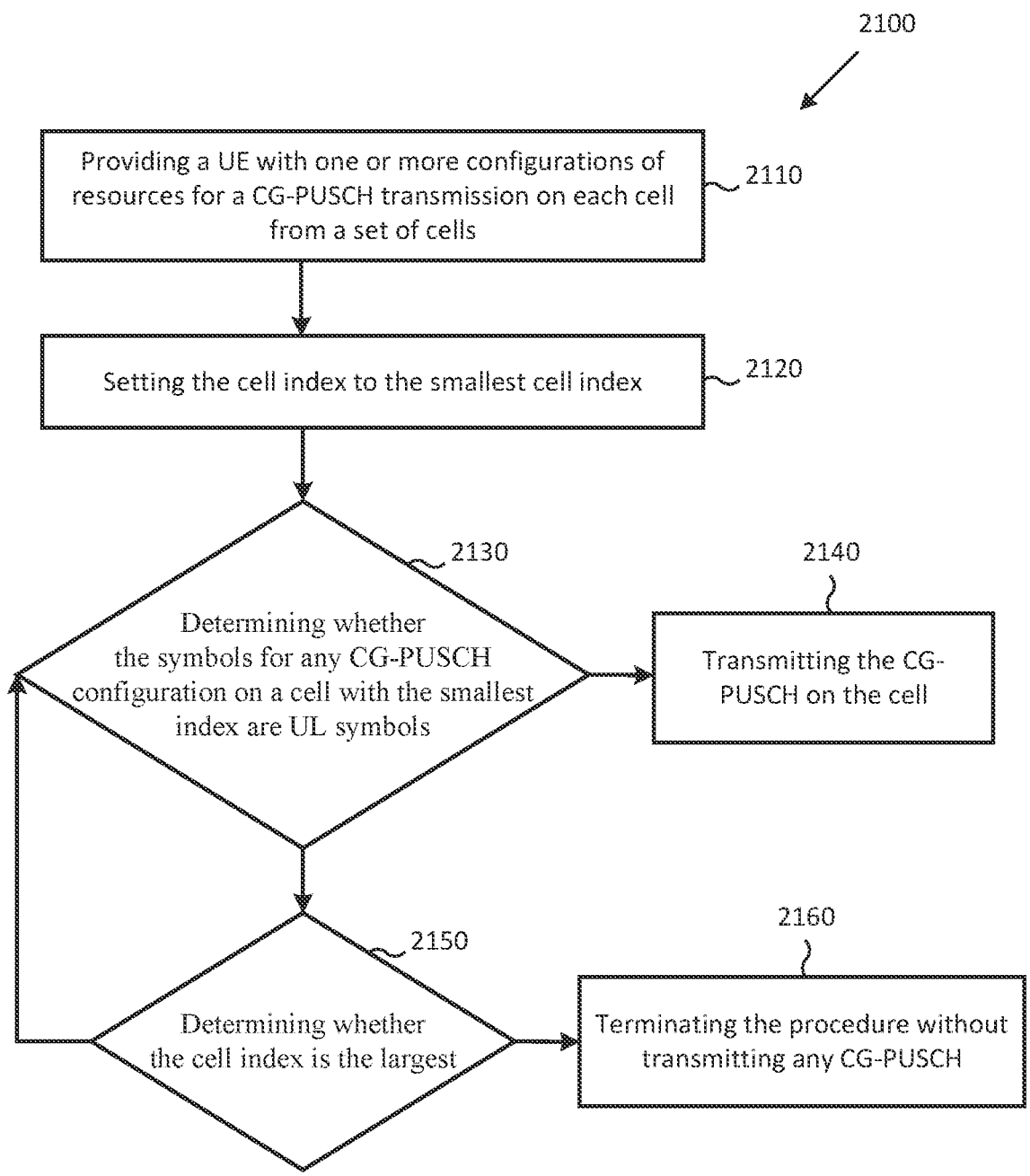
FIG. 21 illustrates a method for determining a cell to transmit a CG-PUSCH according to various embodiments of the present disclosure.

FIG. 21 illustrates a method for determining a cell to transmit a CG-PUSCH according to various embodiments of the present disclosure. Although described herein as being implemented by the UE 116, the method 2100 illustrated in FIG. 21 can be implemented in one or more of the UEs 111-116 and a corresponding method can be performed by one or more of the gNBs 101-103 described in FIG. 1. Other embodiments can be used without departing from the scope of the present disclosure.

In operation 2110, a UE, such as the UE 116, is provided with one or more configurations of resources for a CG-PUSCH transmission on each cell from a set of cells. The UE 116 can be provided with the one or more configurations of resources by a gNB, such as the gNB 102, by higher layer signaling. The one or more configurations of resources can be stored in the memory 360. For each configuration of a CG-PUSCH transmission, the UE 116 can also be provided with a corresponding cell index. In operation 2120, the UE 116 sets a cell index to the smallest index of cells in the set of cells.

In operation 2130, the UE 116 determines whether the symbols for any of the one or more configurations of a CG-PUSCH transmission on the cell with the smallest index are UL symbols. In some embodiments, for example when indicated by tdd-UL-DL-ConfigurationCommon, the UE 116 can determine whether the symbols for any of the one or more configurations of a CG-PUSCH transmission on the cell with the index are UL symbols (or UL symbols and flexible symbols). In various embodiments, the UE 116 can make the determination of operation 2130 per slot or per number of symbols, such as per period of N symbols when a configuration for a CG-PUSCH transmission is applicable per period of N symbols. When the symbols configured for a CG-PUSCH transmission are UL symbols on the cell with the smallest index, the UE 116 proceeds to operation 2140. When the symbols configured for a CG-PUSCH transmission are not UL symbols on the cell with the smallest index, the UE 116 proceeds to operation 2150.

In operation 2140, the transceiver 310 transmits the CG-PUSCH on the symbols on the cell with the smallest index.

In operation 2150, the UE 116 determines whether the cell index is the largest index for cells in the set of cells. When the index is the largest index for cells in the set of cells, the method 2100 can terminate in operation 2160. When the method 2100 terminates, the UE 116 does not transmit any CG-PUSCH or the UE 116 may repeat the procedure by autonomously reducing, for example each time by one, a number of symbols for the CG-PUSCH transmission relative to the number of symbols in each configuration for a CG-PUSCH transmission until the UE determines a cell where the number of UL symbols for the CG-PUSCH transmission is the largest. For example, the UE 116 may consider that the CG-PUSCH transmission starts at a second symbol of a configured resource or ends at a second to last symbol of a configured resource.

When the UE 116 determines the index is not the largest index for cells in the set of cells, the UE 116 returns to operation 2130.

Various embodiments of the present disclosure provide a UE with improved reception reliability of a TB in a CG-PUSCH. In these embodiments, a UE with UL CA capability can transmit a same TB in a CG-PUSCH on multiple cells using corresponding configurations for the CG-PUSCH transmission. The UE can transmit the same TB when the symbols for a CG-PUSCH transmission on each cell from the multiple cells are UL symbols (or UL symbols and flexible symbols) when the symbols are determined, for example, based on tdd-UL-DL-ConfigurationCommon. Similar embodiments provide a UE with improved reception reliability of a TB in a GB-PUSCH.

A single DCI format can schedule multiple GB-PUSCH transmissions on multiple cells for a same TB, or multiple DCI formats can schedule respective multiple GB-PUSCH transmissions on respective multiple cells for a same TB. In embodiments where a single DCI format is used, the one or more cells where the UE transmits respective one or more CG-PUSCHs that can be configured to the IE by the gNB through higher layer signaling or can be indicated in the DCI format scheduling the CG-PUSCH transmissions on the cells. For example, the DCI format can include a field of 2 bits that can indicate a set of cells, from four sets of cells that the UE is configured by the gNB, for a GB-PUSCH transmission on each cell from the set of cells. The single DCI format can also include other separate fields for GB-PUSCH transmission on each cell from the set of cells, such as a separate indication for a TPC command or for a precoding indication, or for a modulation and coding scheme (MCS). Other fields, such as for a HARQ process number, or for redundancy version, or for a NDI, can be included only once in the DCI format and be common for all indicated cells for a CG-PUSCH transmission. A frequency domain resource allocation (FDRA) field or a time domain resource allocation (TDRA) field may also be common for all indicated cells. Other fields, such as a BWP indicator, may not be applicable when a DCI format is used to schedule a CG-PUSCH transmission on multiple cells.

Figure 22:
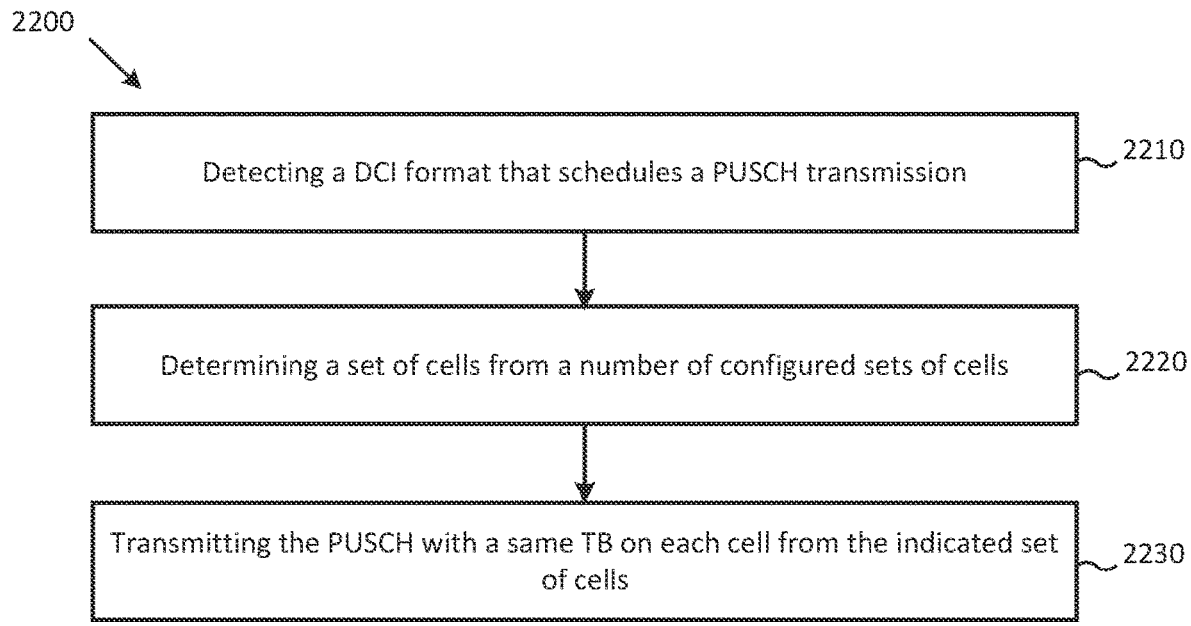
FIG. 22 illustrates a method of transmitting multiple CG-PUSCHs with a same TB on multiple cells according to various embodiments of the present disclosure.

For example, FIG. 22 illustrates a method of transmitting multiple CG-PUSCHs with a same TB on multiple cells according to various embodiments of the present disclosure. Although described herein as being implemented by the UE 116, the method 2200 illustrated in FIG. 22 can be implemented in one or more of the UEs 111-116 and a corresponding method can be performed by one or more of the gNBs 101-103 described in FIG. 1. Other embodiments can be used without departing from the scope of the present disclosure.

In operation 2210, a UE, such as the UE 116, detects a DCI format scheduling a PUSCH transmission. In operation 2220, the UE 116 determines a set of cells, from a number of configured sets of cells, based on an indication in the DCI format that is detected in operation 2210. In operation 2230, based on the set of cells determined in operation 2220, the transceiver 310 transmits a PUSCH with a same TB on each cell from the indicated set of cells.

In some embodiments, a gNB can use a DCI format 2_0 to provide a SFI field value that adapts formats for one or more slots. In these embodiments, the SFI can identify flexible symbols (F) to be DL symbols or UL symbols or to remain flexible symbol that are then interpreted as unavailable for either DL reception or UL transmission. When a CG-PUSCH resource includes symbols that are indicated as flexible symbols, for example according to tdd-UL-DL-ConfigurationCommon, and indicated as DL symbols or flexible symbols by an SFI field value in a DCI format 2_0, the CG-PUSCH resource can become invalid because a CG-PUSCH transmission cannot occur in DL symbols or symbols indicated as unavailable. Accordingly, in order to avoid having to drop a CG-PUSCH transmission when a corresponding configured resource includes flexible symbols that become unavailable due to an adaptation of a slot format by a SFI value in a DCI format 2_0, a UE can adapt the configured CG-PUSCH resource to exclude flexible symbols when they become unavailable. In addition, in order to provide a DL-UL switching gap, the UE can transmit the CG-PUSCH on a number of symbols, such as one symbol, after a last DL symbol that is determined based on the slot format. To compensate for the reduction in a number of REs for a CG-PUSCH transmission due a reduction in a number of symbols, the UE can increase a CG-PUSCH transmission power, due to a corresponding increase in the BPRE, or can increase a number of RBs so that a total number of REs for the CG-PUSCH transmission remains substantially same as without a reduction in a number of symbols. For example, the UE can include additional RBs for the CG-PUSCH transmission in an ascending RB index continuing from a last RB of the configured resource for the CG-PUSCH transmission.

Figure 23:
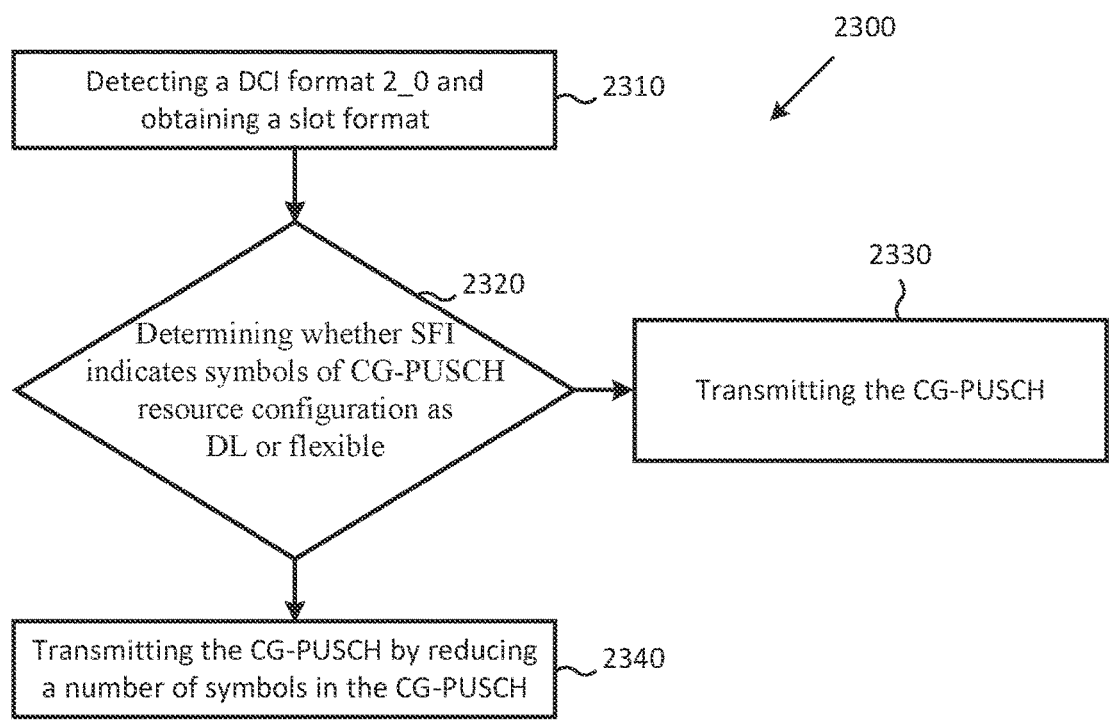
FIG. 23 illustrates a method of adapting a number of symbols for a CG-PUSCH transmission according to various embodiments of the present disclosure.

For example, FIG. 23 illustrates a method of adapting a number of symbols for a CG-PUSCH transmission according to various embodiments of the present disclosure. Although described herein as being implemented by the UE 116, the method 2300 illustrated in FIG. 23 can be implemented in one or more of the UEs 111-116 and a corresponding method can be performed by one or more of the gNBs 101-103 described in FIG. 1. Other embodiments can be used without departing from the scope of the present disclosure.

In operation 2310, a UE, such as the UE 116, detects a DCI format 2_0 and obtains a slot format from a value of an SFI field in the DCI format 2_0.

In operation 2320, the UE 116 determines whether the SFI field value indicates there are any symbols of a resource configuration for a CG-PUSCH transmission that are DL symbols or flexible symbols. When the UE 116 determines there are no symbols, the processor proceeds to operation 2330. When the UE 116 determines there are symbols, the processor proceeds to operation 2340.

In operation 2330, based on the UE 116 determining there are no symbols of CG-PUSCH resource configuration that are DL symbols or flexible symbols, the transceiver 310 transmits the CG-PUSCH.

In operation 2340, based on the UE 116 determining there are symbols of CG-PUSCH resource configuration that are DL symbols or flexible symbols, the transceiver 310 transmits the CG-PUSCH by reducing the number of symbols for the resource. For example, the UE 116 can discard a number of first symbols for the resource that are indicated as DL symbols or as flexible symbols. The UE 116 can also discard a number of consecutive UL symbols when the previous symbol to the number of UL symbols in a DL symbol. Further, the UE can increase a power and/or a number of RBs for the CG-PUSCH transmission.

In some embodiments, a PUSCH transmission from the UE 116 can be scheduled by a DCI format in a PDCCH (GB-PUSCH). In these embodiments, the serving gNB 102 can indicate a time-domain resource allocation (TDRA) field for the PUSCH transmission symbols that the gNB 102 previously indicated, for example by higher layer parameter tdd-UL-DL-ConfigurationCommon, to be DL symbols or by a slot format provided by an SFI value to be DL symbols or flexible symbols. Accordingly, the gNB 102 can meet a latency requirement for the GB-PUSCH transmission without waiting to schedule the PUSCH transmission in symbols after DL symbols or also after flexible symbols.

In these embodiments, the UE 116 can treat the DCI format as valid and transmit the GB-PUSCH in symbols indicated by tdd-UL-DL-ConfigurationCommon to be DL symbols or by a slot format provided by an SFR value to be DL symbols or flexible symbols. To avoid cross-link interference, the gNB 102 can avoid transmission in symbols that the gNB 102 indicates to the UE 116 for a GB-PUSCH transmission. One example of an exception can be for symbols indicated to the UE 116 for receptions of SS/PBCH blocks. When the UE 116 detects a DCI format scheduling a PUSCH transmission in symbols that include symbols for receptions of SS/PBCH blocks, the UE 116 can consider the DCI format to be invalid. The gNB 102 can configure the behavior of the UE 116 on whether to consider the DCI format as valid or invalid with respect to the SS/PBCH blocks.

Figure 24:
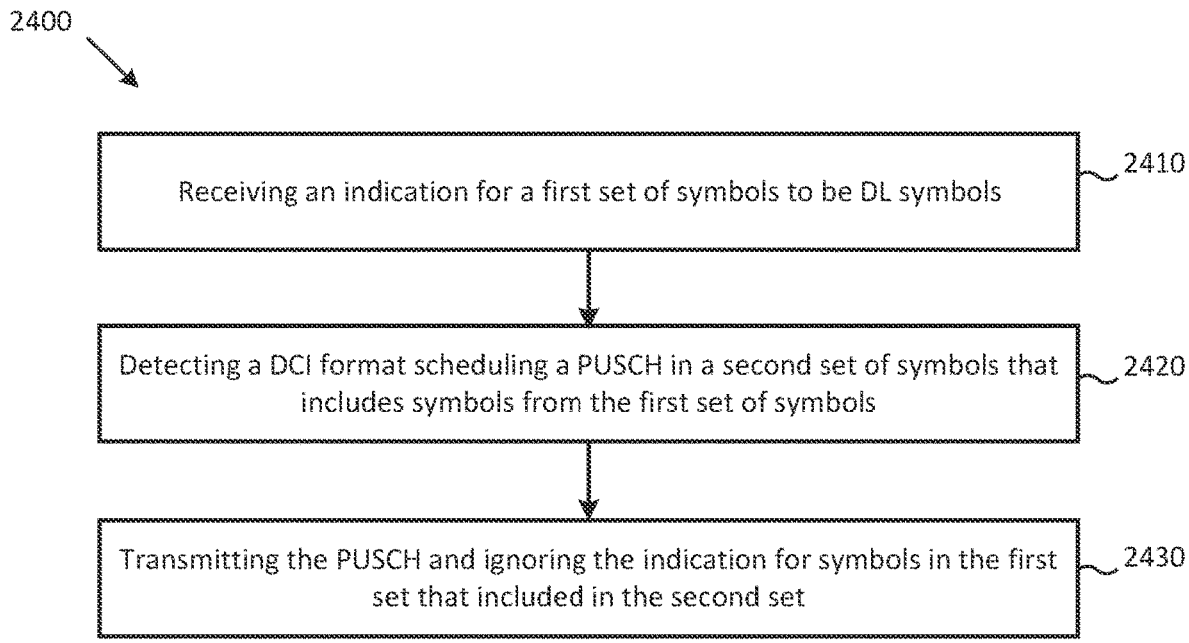
FIG. 24 illustrates a method for transmitting a GB-PUSCH in symbols that were indicated as DL symbols according to various embodiments of the present disclosure.

For example, FIG. 24 illustrates a method for transmitting a GB-PUSCH in symbols that were indicated as DL symbols according to various embodiments of the present disclosure. Although described herein as being implemented by the UE 116, the method 2400 illustrated in FIG. 24 can be implemented in one or more of the UEs 111-116 and a corresponding method can be performed by one or more of the gNBs 101-103 described in FIG. 1. Other embodiments can be used without departing from the scope of the present disclosure.

In operation 2410, a UE, such as the UE 116, receives a higher layer parameter tdd-UL-DL-ConfigurationCommon or a value of an SF field in a DCI format 2_0 that indicates a first set of symbols as DL symbols.

In operation 2420, the UE 116 detects a DCI format scheduling a PUSCH transmission in a second set of symbols. The second set of symbols includes symbols from the first set of symbols indicated in operation 2410.

In operation 2430, the transceiver 310 transmits the PUSCH. Based on the detected DCI format in operation 2420, the UE 116 considers the DCI format to be valid and ignores the indication provided by tdd-UL-DL-ConfigurationCommon or the value of the SFI field.

In some embodiments, a slot format provided by tdd-UL-DL-ConfigurationCommon over a number of slots can be aperiodic within the number of slots. Therefore, a periodic configuration of a CG-PUSCH resource within the number of slots can result in the CG-PUSCH being unavailable in a slot as a corresponding symbol can be DL symbols in the slot. In order to avoid unavailability of CG-PUSCH resources in some slots over a number of slots, various embodiments separately provide a configuration of CG-PUSCH resources for each slot over the number of slots. In these embodiments, the configuration for each slot can be periodic with a period equal to the number of slots.

Various embodiments of the present disclosure enable the cancelation of transmissions in order to avoid interference on a GB-PUSCH transmission from other transmissions on a same BWP of a cell to a same serving gNB. For example, the gNB is aware of ongoing transmission from one or more UEs. For a PUSCH transmission or a PDSCH reception with low latency requirements, some methods include the gNB transmitting a DCI format 2_4 to indicate to UEs with ongoing transmissions to cancel the transmissions and avoid inter-UE interference to the PUSCH transmission or the PDSCH reception. These methods require that all UEs with UL transmissions monitor PDCCH detect a DCI format 2_4 in one or more occasions during a slot. Therefore, the UEs cannot turn off the receiving part of the UE modems even when the UE knows there is no other reception for the UE in the slot, expect for potential PDCCH receptions at the beginning of the slot. Accordingly, various embodiments of the present disclosure enable the cancelation of transmissions in order to avoid interference.

In some embodiments, a UE, such as the UE 116, can always monitor a PDCCH for DCI format 2_4 when the UE 116 has any UL transmission in a slot.

In some embodiments, the UE 116 can selectively monitor a PDCCH for DCI format 2_4 in a slot depending on the type of UL transmissions the UE 116 has in the slot. For example, a receiver of the UE 116 can be provided with separate configurations that instruct whether or not to monitor PDCCH for DCI format 2_4 in a slot for each transmission type. For some transmission types, the UE 116 is always expected to monitor PDCCH for DCI format 2_4. For example, a UE that transmit SRS or PUSCH in a slot always monitors PDCCH for DCI format 2_4 in the slot and can therefore cancel the SRS or PUSCH transmission depending on an indication by DCI format 2_4 for corresponding resources of the SRS or PUSCH transmission, whereas a UE that transmits only PUCCH or PRACH in a slot does not monitor PDCCH for DCI format 2_4, or can be configured from the gNB 102 by higher layers whether or not to monitor PDCCH for DCI format 2_4 in the slot and therefore the UE does not cancel the PUCCH or PRACH transmission regardless of an indication by DCI format 2_4 for corresponding resources of the PUCCH or PRACH transmission. For example, the UE 116 can be configured from the gNB 102 by higher layers whether or not to monitor PDCCH for DCI format 2_4 in a slot separately for each transmission type such as separately for SRS, PUSCH, PRACH, PUCCH. Similar to cancelations of transmissions based on an indication of a symbol direction by a SFI, a UE completely cancels a PUSCH transmission if DCI format 2_4 indicates cancelation of transmission for any time-frequency resource of the PUSCH transmission and cancels a SRS transmission only in symbols that DCI format 2_4 indicates for cancelation of transmission.

For a same transmission type, the UE 116 can be separately configured whether or not to monitor PDCCH for DCI format 2_4 in a slot. Whether the UE 116 monitors PDCCH for DCI format 2_4 in the slot can depend on whether or not the transmission type of the UE 116 is a first priority type or a second priority type as indicated by a DCI format scheduling the transmission or by higher layer signaling configuring the transmission, or can depend on whether or not the transmission type occupies a number of RBs larger than a configured threshold number of RBs. For example, the UE 116 can monitor PDCCH for DCI format 2_4 if the UE 116 transmits a PUSCH scheduled by a DCI format that indicates a first priority type for the PUSCH transmission and may not monitor PDCCH for DCI format 2_4 if the UE 116 transmits a PUSCH scheduled by a DCI format that indicates a first priority type for the PUSCH transmission. For example, the UE 116 may not monitor PDCCH for DCI format 2_4 when the UE 116 transmits a PUSCH configured by higher layer signaling indicating a second priority type for the PUSCH transmission. For example, due to a large granularity of a set of time resources and of a set of frequency resources indicated for cancelation of transmission by DCI format 2_4, a UE can assume that a PRACH transmission or a PUCCH transmission does not need to be canceled even when the PRACH transmission or the PUCCH transmission includes time resources from the set of time resources and frequency resources from the set of frequency resources.

As another example, the UE 116 can monitor PDCCH for DCI format 2_4 when the UE 116 transmits a PUCCH over a number of RBs larger than a configured threshold number of RBs. When the UE 116 does not transmit a PUCCH over a number of RBs larger than a configured threshold number of RBs, the UE 116 may not monitor PDCCH for DCI format 2_4.

In some embodiments, in order to avoid CSI measurement errors, the UE 116 can also monitor PDCCH for DCI format 2_4 when the UE 116 receives CSI-RS. DCI format 2_4 can also indicate cancelation of receptions in indicated time-frequency resources. However, an exception can be the cancelation of receptions associated with SS/PBCH blocks that the UE 116 assumes are transmitted by the serving gNB 102 at occasions indicated by higher layer signaling, for example through higher layer parameter ssb-PositionsInBurst.

Figure 25:
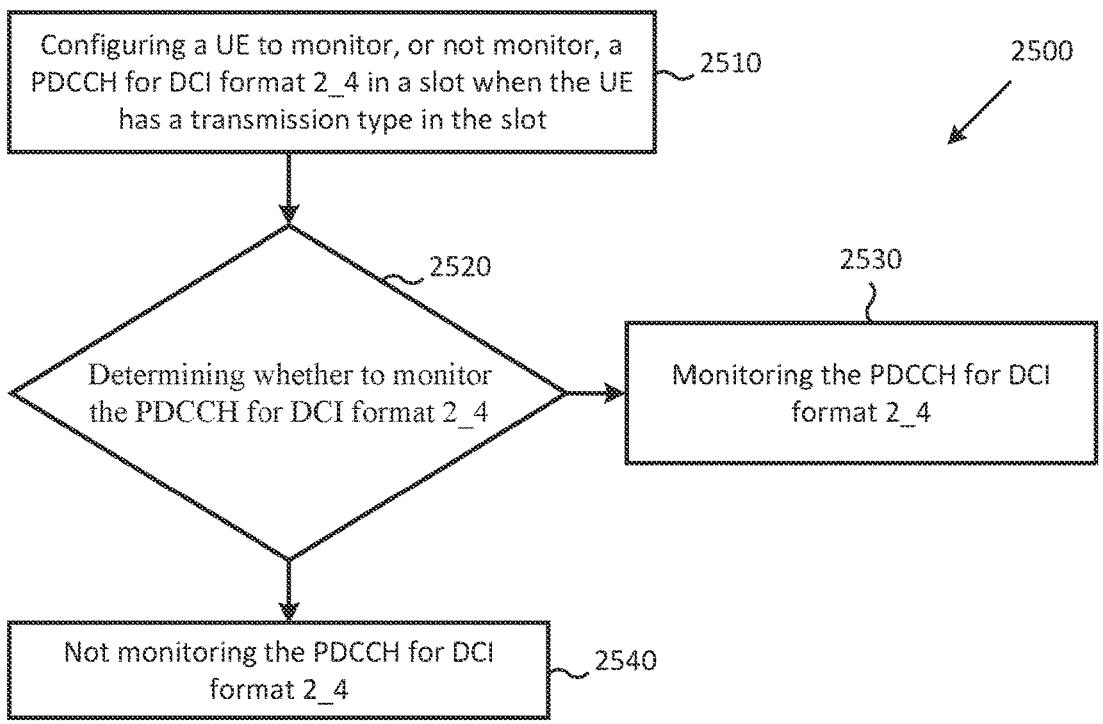
FIG. 25 illustrates a method for determining whether to monitor PDCCH for a DCI format 2_4 in a slot according to various embodiments of the present disclosure.

For example, FIG. 25 illustrates a method for determining whether to monitor PDCCH for a DCI format 2_4 in a slot according to various embodiments of the present disclosure. Although described herein as being implemented by the UE 116, the method 2500 illustrated in FIG. 25 can be implemented in one or more of the UEs 111-116 and a corresponding method can be performed by one or more of the gNBs 101-103 described in FIG. 1. Other embodiments can be used without departing from the scope of the present disclosure.

In operation 2510, a UE, such as the UE 116, is configured to monitor, or not monitor, a PDCCH for a DCI format 2_4 in a slot when the UE 116 has a transmission type in the slot. The UE 116 can receive a signal from a gNB, such as the gNB 102. The configuration can be stored in the memory 360.

In operation 2520, the UE 116 determines whether the UE 116 is configured to monitor PDCCH for DCI format 2_4 in a slot where the UE 116 has the transmission type and does not have another transmission type. When the UE 116 determines the UE 116 is configured to monitor the PDCCH, the UE 116 proceeds to operation 2530. When the UE 116 determines the UE 116 is not configured to monitor the PDCCH, the UE 116 proceeds to operation 2540.

In operation 2530, based on the UE 116 determining the UE 116 is configured to monitor the PDCCH, the processor monitors the PDCCH for detection of DCI format 2_4. In operation 2540, based on the UE 116 determining the UE 116 is not configured to monitor the PDCCH, the UE 116 does not monitor the PDCCH for DCI format 2_4.

In some embodiments, the DCI format 2_4 can provide information for cancelation of transmissions on a set of more than one cells. As cancelation of the transmission is an infrequent event, an inclusion in DCI format 2_4 of information for each cell in the set of more than one cells increases the DCI format 24 size while only a subset of cells are usually indicated when a PDCCH with DCI format 2_4 is transmitted. Instead of DCI format 24 providing information separately for each cell in a set of cells, the information can be common to each cell in the set of cells. Further, a subset of cells in the set of cells for which the transmission cancelation information is applicable can be indicated by a separate field in DCI format 2_4. For example, for a set of 4 cells, a 3-bit field in DCI format 2_4 can indicate an applicability of the indication information for cancelation of transmissions for {Cell 0}, {Cell 1}, {Cell 2}, {Cell 3}, {Cell 0 and Cell 1}, {Cell 2 and Cell 3}, {Cell 0, Cell 1, Cell 2, Cell 3}. The mapping of values of the field to cells in the set of cells can be provided to the UE 116 by the serving gNB 102 through higher layer signaling.

Although the present disclosure has been described with various example embodiments, various changes and modifications can be suggested by or to one skilled in the art. It is intended that the present disclosure encompass such changes and modifications as fall within the scope of the appended claims.

What is claimed:

1. A method for transmitting physical uplink shared channels (PUSCHs) on a set of cells, the method comprising:
   receiving:
      information for a number of sets of cells, and
      a first physical downlink control channel (PDCCH) providing a first DCI format, wherein the first DCI format includes:
         a first field indicating a set of cells from the number of sets of cells, and
         second fields indicating values of parameters for PUSCH transmissions on the set of cells;
   identifying:
      a value for a first parameter based on a third field from the second fields, wherein the value is common for the PUSCH transmissions on the set of cells, and
      values for a second parameter based on a fourth field from the second fields, wherein the values have a one-to-one mapping with the PUSCH transmissions on the set of cells; and
   transmitting the PUSCHs on the set of cells according to the corresponding values of the first and second parameters.

2. The method of claim 1, wherein the third field is a frequency domain resource allocation (FDRA) field.

3. The method of claim 1, wherein the third field is a time domain resource allocation (TDRA) field.

4. The method of claim 1, further comprising:
   receiving a second PDCCH providing a second DCI format, wherein:
      the second DCI format schedules a PUSCH transmission on a single cell,
      the second DCI format includes a bandwidth part (BWP) indicator field that indicates a BWP for the PUSCH transmission, and
      the first DCI format does not include the BWP indicator field.

5. The method of claim 1, wherein the fourth field is a modulation and coding scheme (MCS) field.

6. The method of claim 1, wherein the fourth field is a transmit power control (TPC) command field.

7. The method of claim 1, wherein the fourth field is a precoding information field.

8. A user equipment (UE) comprising:
   a transceiver configured to receive:
      information for a number of sets of cells, and
      a first physical downlink control channel (PDCCH) providing a first DCI format, wherein the first DCI format includes:
         a first field indicating a set of cells from the number of sets of cells, and
         second fields indicating values of parameters for PUSCH transmissions on the set of cells; and
   a processor operably coupled to the transceiver, the processor configured to identify:
      a value for a first parameter based on a third field from the second fields, wherein the value is common for the PUSCH transmissions on the set of cells, and
      values for a second parameter based on a fourth field from the second fields, wherein the values have a one-to-one mapping with the PUSCH transmissions on the set of cells,
   wherein the transceiver is further configured to transmit PUSCHs on the set of cells according to the corresponding values of the first and second parameters.

9. The UE of claim 8, wherein the third field is a frequency domain resource allocation (FDRA) field.

10. The UE of claim 8, wherein the third field is a time domain resource allocation (TDRA) field.

11. The UE of claim 8, wherein:
   the transceiver is further configured to receive a second PDCCH providing a second DCI format,
   the second DCI format schedules a PUSCH transmission on a single cell,
   the second DCI format includes a bandwidth part (BWP) indicator field that indicates a BWP for the PUSCH transmission, and
   the first DCI format does not include the BWP indicator field.

12. The UE of claim 8, wherein the fourth field is a modulation and coding scheme (MCS) field.

13. The UE of claim 8, wherein the fourth field is a transmit power control (TPC) command field.

14. The UE of claim 8, wherein the fourth field is a precoding information field.

15. A base station comprising:
   a transceiver configured to transmit:
      information for a number of sets of cells, and
      a first physical downlink control channel (PDCCH) providing a first DCI format, wherein the first DCI format includes:
         a first field indicating a set of cells from the number of sets of cells, and
         second fields indicating values of parameters for physical uplink shared channel (PUSCH) receptions on the set of cells; and
   a processor operably coupled to the transceiver, the processor configured to identify:

a value for a first parameter based on a third field from the second fields, wherein the value is common for the PUSCH receptions on the set of cells, and values for a second parameter based on a fourth field from the second fields, wherein the values have a one-to-one mapping with the PUSCH receptions on the set of cells, wherein the transceiver is further configured to receive PUSCHs on the set of cells according to the corresponding values of the first and second parameters.

16. The base station of claim 15, wherein the third field is a frequency domain resource allocation (FDRA) field.

17. The base station of claim 15, wherein the third field is a time domain resource allocation (TDRA) field.

18. The base station of claim 15, wherein:

the transceiver is further configured to transmit a second PDCCH providing a second DCI format, the second DCI format schedules a PUSCH reception on a single cell, the second DCI format includes a bandwidth part (BWP) indicator field that indicates a BWP for the PUSCH reception, and the first DCI format does not include the BWP indicator field.

19. The base station of claim 15, wherein the fourth field is a modulation and coding scheme (MCS) field.

20. The base station of claim 15, wherein the fourth field is a precoding information field.

* * * * *